US010861247B2

(12) United States Patent
Milbert et al.

(10) Patent No.: US 10,861,247 B2
(45) Date of Patent: Dec. 8, 2020

(54) ROOF REPORT GENERATION

(71) Applicant: NEARMAP US, INC., South Jordan, UT (US)

(72) Inventors: Randy Milbert, Edina, MN (US); Andreas Robinson, St. Paul, MN (US)

(73) Assignee: NEARMAP US, INC., South Jordan, UT (US)

(*) Notice: Subject to any disclaimer, the term of this patent is extended or adjusted under 35 U.S.C. 154(b) by 11 days.

(21) Appl. No.: 16/136,585

(22) Filed: Sep. 20, 2018

(65) Prior Publication Data

US 2019/0088032 A1 Mar. 21, 2019

Related U.S. Application Data

(60) Provisional application No. 62/561,299, filed on Sep. 21, 2017, provisional application No. 62/651,997, filed on Apr. 3, 2018.

(51) Int. Cl.
*G06T 19/20* (2011.01)
*G06F 3/0484* (2013.01)
(Continued)

(52) U.S. Cl.
CPC ............ *G06T 19/20* (2013.01); *G06F 3/0482* (2013.01); *G06F 3/0483* (2013.01);
(Continued)

(58) Field of Classification Search
CPC ................... G06T 19/20; G06T 15/005; G06T 2219/2016; G06F 3/04815; G06F 3/0482;
(Continued)

(56) References Cited

U.S. PATENT DOCUMENTS 8,078,436 B2 12/2011 Pershing et al.
8,145,578 B2 3/2012 Pershing et al.
(Continued)

OTHER PUBLICATIONS

"How do I calculate the area of a 2d polygon?", Stack Overflow, [Online]. [Accessed Jun. 28, 2019]. Retrieved from the Internet: URL: https: web.archive.org web 20161205201409 https: stackoverflow.com questions 451426 how-do-i-calculate-the-area-of-a-2d-polygon, 6 pgs.
(Continued)

*Primary Examiner* — King Y Poon
*Assistant Examiner* — Vincent Peren
(74) *Attorney, Agent, or Firm* — Oblon, McClelland, Maier & Neustadt, L.L.P.

(57) ABSTRACT

A computer-implemented method for generating roof reports. In one embodiment, a user begins by entering an address into an application and clicking a "request" button. A 3D model of the structure at the address is prepared. The application may then proceed with manual or automatic roof extraction. For manual roof extraction, an analyst may outline roof facets to create a roof model. For automatic roof extraction, the application may use machine learning or another technique to automatically extract and then simplify roof facets. In either case, the application may then present the roof model to a reviewer for inspection. The reviewer may then accept or reject the roof model. If the reviewer rejects the roof model, an analyst may correct the roof model and resuming it for review. Once the roof model passes a review, the application may then proceed with converting the roof model into a roof report.

20 Claims, 59 Drawing Sheets

Flowchart: Overview

(51) Int. Cl.

| | |
|---|---|
| ***G06F 3/0486*** | (2013.01) |
| ***G06F 3/0481*** | (2013.01) |
| ***G06F 3/0483*** | (2013.01) |
| ***G06N 3/08*** | (2006.01) |
| ***G06T 15/00*** | (2011.01) |
| ***G06F 3/0482*** | (2013.01) |

(52) U.S. Cl.
CPC ........ *G06F 3/0486* (2013.01); *G06F 3/04815* (2013.01); *G06F 3/04845* (2013.01); *G06N 3/08* (2013.01); *G06T 15/005* (2013.01); *G06T 2210/04* (2013.01); *G06T 2219/2004* (2013.01); *G06T 2219/2016* (2013.01)

(58) Field of Classification Search
CPC .. G06F 3/0483; G06F 3/04845; G06F 3/0486; G06N 3/08
USPC .......................................................... 345/419
See application file for complete search history.

(56) References Cited

U.S. PATENT DOCUMENTS

| | | | | |
|---|---|---|---|---|
| 8,170,840 | B2 | 5/2012 | Pershing | |
| 8,209,152 | B2 | 6/2012 | Pershing | |
| 8,401,222 | B2 | 3/2013 | Thornberry et al. | |
| 8,731,234 | B1 | 5/2014 | Ciarcia et al. | |
| 9,183,538 | B2 | 11/2015 | Thornberry et al. | |
| 2010/0110074 | A1* | 5/2010 | Pershing | G06F 17/5004 345/423 |
| 2011/0033110 | A1* | 2/2011 | Shimamura | G01C 11/06 382/173 |
| 2011/0187713 | A1* | 8/2011 | Pershing | G06T 17/20 345/420 |
| 2014/0200861 | A1* | 7/2014 | DeVito | G06F 17/5004 703/1 |
| 2015/0324690 | A1* | 11/2015 | Chilimbi | G06N 3/08 706/25 |
| 2017/0206648 | A1* | 7/2017 | Marra | B64C 39/024 |

OTHER PUBLICATIONS

Agafonkin, Vladimir, “A new algorithm for finding a visual center of a polygon”, Mapbox, [Online]. [Accessed Jun. 28, 2019]. Retrieved from the Internet: URL: https: blog.mapbox.com a-new-algorithm-for-finding-a-visual-center-of-a-polygon-7c77e6492fbc, (Aug. 14, 2016), 8 pgs.

* cited by examiner

System Diagram

Flowchart: Overview

Pages

| /api/addtiles | 400 |
|---|---|
| Url : String | |

| /api/getreport | 402 |
|---|---|
| Report Id : Long | |

| /api/notifyanalysts | 404 |
|---|---|
| Level : Integer | |

| /api/requestreport | 406 |
|---|---|
| Address : String<br>Email : String<br>Latitude : Double<br>Longitude : Double | |

| /api/savereport | 408 |
|---|---|
| Content : String<br>Obstructed : Boolean<br>Report Id : Long<br>Review : Boolean | |

| /api/savereview | 410 |
|---|---|
| Comment : String<br>Report Id : Long | |

| /api/sendreport | 412 |
|---|---|
| Report Id : Long | |

| /api/setreportsize | 414 |
|---|---|
| Report Id : Long<br>Size : Integer | |

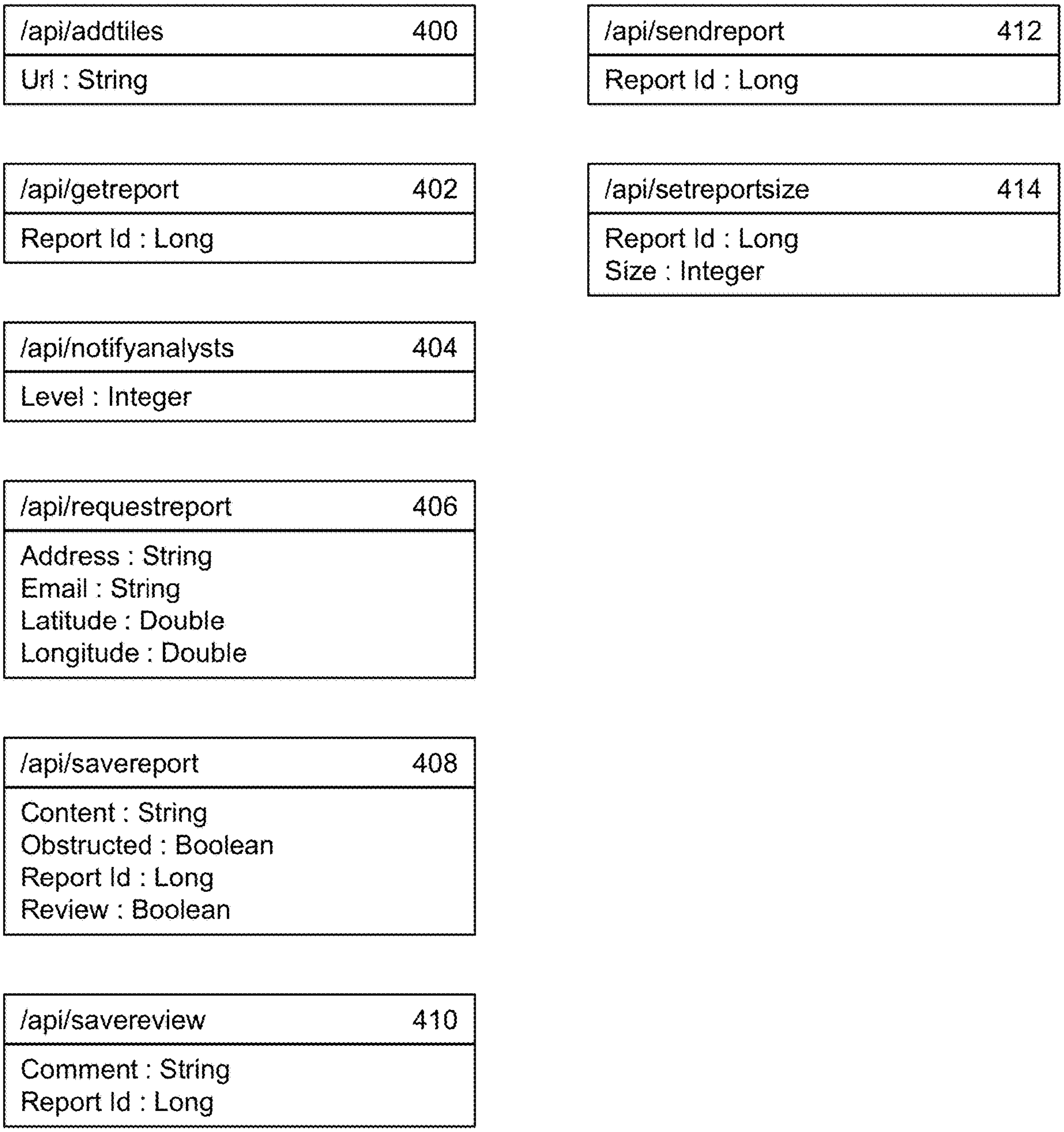

Fig. 4
Services

| Comment | 500 |
|---|---|
| Analyst Id : String | |
| Created : Date | |
| Id : Long | |
| Reviewer Id : String | |
| Text : String | |

| Tile | 506 |
|---|---|
| East : Double | |
| Id : Long | |
| North : Double | |
| South : Double | |
| Url : String | |
| West : Double | |

| Report | 502 |
|---|---|
| Address : String | |
| Analyst Id : String | |
| Comments : List<Comment> | |
| Content : String | |
| End : Date | |
| Id : Long | |
| Latitude : Double | |
| Longitude : Double | |
| Obstructed : Boolean | |
| Reviewer Id : String | |
| Start : Date | |
| Status : Integer | |
| Size : Integer | |
| Tiles : List<Tile> | |
| Training : Boolean | |

| User | 508 |
|---|---|
| Email : String | |
| Id : String | |
| Level : Integer | |
| Name : String | |
| Phone : String | |

| Request | 504 |
|---|---|
| Email : String | |
| End : Date | |
| Id : Long | |
| Report Id : Long | |
| Start : Date | |

Fig. 5
Models

Flowchart: Requesting a Roof Report

Flowchart: Calculating an Average Response Time

Flowchart: Listing Pending Reports

Flowchart: Listing Completed Reports

Flowchart: Generating a Roof Model Manually

Flowchart: Drawing Guides

Flowchart: Outlining Facets

Flowchart: Adjusting Elevations

Flowchart: Automatically Dropping Facets

Flowchart: Getting a Facet's Average Drop Plane

Flowchart: Getting a Facet's Drop Planes

Flowchart: Determining if a Facet is Planar

Flowchart: Reviewing a Roof Model

Flowchart: Adding Tiles

Flowchart: Getting a Report

Flowchart: Notifying Analysts

Flowchart: Recording a Roof Report Request

Flowchart: Preparing a 3D Model from Existing Models

Flowchart: Preparing a 3D Model from Imagery

Flowchart: Saving a Report

Flowchart: Saving a Review

Flowchart: Sending a Report

Flowchart: Setting Report Size

Flowchart: Training an Automatic Roof Model Extractor

Flowchart: Using the Automatic Roof Model Extractor

Flowchart: Generating a Roof Report

Flowchart: Determining Edge Types

Flowchart: Determining if an Edge is Convex

Flowchart: Determining Facet Pitches

Flowchart: Determining Facet Areas

Flowchart: Determining Edge Lengths

ROOF REPORT GENERATION

CROSS-REFERENCE TO RELATED APPLICATIONS

This application claims priority to U.S. Provisional application No. 62/561,299, titled "Roof Report Generation," filed Sep. 21, 2017 and U.S. Provisional application No. 62/651,997, titled "Roof Report Generation," filed Apr. 3, 2018, each of which the entire content is hereby incorporated herein by reference.

FIELD OF THE INVENTION

The present disclosure relates to estimating construction projects. Particularly, the present disclosure relates to determining roof measurements using imagery.

BACKGROUND OF THE INVENTION

The background description provided herein is for generally presenting the context of the disclosure. Work of the presently named inventors, to the extent it is described in this background section, as well as aspects of the description that may not otherwise qualify as prior art at the time of filing, are neither expressly nor implied admitted as prior art against the present disclosure.

When it comes time to replace a roof, a homeowner will often search on line or through other search methods for a suitable roofing contractor. The homeowner contacts some of these contractors and makes appointments for the contractors to visit the home. Each contractor typically discusses desired roofing style with the homeowner and then uses a ladder and tape measure to measure the roof. The contractor also inspects the area surrounding the house to answer access and cleanup questions. The contractor then prepares an estimate for the job and submits it to the homeowner. After receiving several quotes from different contractors, the homeowner selects one and the contractor gets underway.

For the roofing contractor, providing estimates can be an expensive and time-consuming process. When the homeowner initially contacts the contractor, someone must respond in a timely manner. The contractor and homeowner must coordinate to schedule an appointment. The contractor must drive to the home and typically meet with the owner. The contractor must bring along ladders and safety equipment. The contractor must carefully measure all roof facets to get an accurate estimate. All of this can take hours of the contractor's time and the contractor may only win a fraction of the business for which it submits bids.

To reduce costs and turnaround time, many contractors have switched from on site estimation to one based on roof reports generated by various companies that leverage aerial imagery. These companies rely on overhead and oblique imagery of a home to create a roof model and then create a roof report based on this model. The roof report may provide information such as the overall roof area, the area and pitch of each roof facet, the length of all ridges and valleys, etc. There are several roof report generation patents including U.S. Pat. Nos. 8,078,436; 8,145,578; 8,170,840; 8,209,152; 8,401,222; 8,731,234; and 9,183,538. With these approaches, there is no need to visit the home or manually measure the roof. As a result, roofing contractors can quickly provide accurate and detailed estimates that help them win business. In addition, these roof reports significantly lower estimation costs, which enables contractors to charge lower prices and beat the competition.

Even with this improved approach of generating estimates from roof reports instead of manual measurement, however, there is room for improvement. The current workflows for generating roof reports involve several manual steps including image compilation, roof model construction, lean correction, and pitch determination. What is needed is a more automated process to further reduce costs and turnaround time for roof report generation.

BRIEF SUMMARY OF THE INVENTION

The following presents a simplified summary of one or more embodiments of the present disclosure to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, is a computer-implemented method for fulfilling roof report requests. In one embodiment, a user begins by opening a web page. The application may display instructions and an average response time. The application may also display an email textbox, an address textbox, and a "request" button. The user may enter an email. The user may start typing an address. The application may suggest matching addresses as the user types. The user may click a suggested address to select it. The application may use a geocoder to convert the address to a latitude and longitude. The application may present a map with a marker at the specified location. The user may drag the marker if needed to center it on the desired structure. The user may then click a "request" button. The application may then display a message indicating that it will generate a roof report and email it to the user. The application may then add the roof report request to a queue and begin preparing a 3D model of the structure. Once the 3D model is available, the application may proceed with manual or automatic roof extraction. For manual roof extraction, an analyst may outline roof facets to create a roof model. For automatic roof extraction, the application may use machine learning or another technique to automatically extract and then simplify roof facets. In either case, the application may then present the roof model to a reviewer for inspection. The reviewer may then accept or reject the roof model. If the reviewer rejects the roof model, the application may prompt the reviewer for a comment. An analyst may then correct the roof model and resuming it for review. Once the roof model passes a review, the application may then proceed with converting the roof model into a roof report. This may include analyzing the roof model to identify valleys, ridges, hips, eaves, and rakes. It may include measuring edge lengths and facet areas. It may include counting roof facets. It may include measuring the pitch of each facet and determining a predominant pitch. It may include gathering overhead and oblique images of the structure. It may then involve compiling this information into a report. Once the roof report is ready, the application may send it to the requesting user.

The present disclosure, in another embodiment, is a computer-implemented method of identifying roof features and generating a roof report. The method may include obtaining a digital 3D model of a structure, providing an electronic interface enabling a user to generate a roof model based on the structure model, and using computer processing components to generate an electronically viewable roof report based on the roof model. Obtaining a digital 3D model of a structure may include constructing a 3D model from imagery of the structure. The electronic interface may enable a user to outline roof facets. Additionally, the electronic interface may enable a user to automatically adjust facet vertex elevations based on the structure model or to adjust facet vertex elevations manually. In some embodiments, facet vertices may snap to the structure model's surface, other facet vertices, or facet edges. The electronic interface may indicate whether a facet is planar or nearly planar. In some embodiments, the electronic interface may identify right-angle corners of the roof model. The electronic interface may also enable a user to draw guide lines. In some embodiments, facet vertices may snap to guide lines and/or guide line intersections. A roof report may include a roof model rendering, data regarding one or more edge lengths, data regarding one or more edge types, data regarding one or more facet areas, data regarding one or more facet pitches, data regarding roof area, data regarding a predominant pitch, overhead imagery, oblique imagery, and/or an estimate for replacing a roof of the structure. An electronic interface may be provided to enable a user to review a roof model.

The present disclosure, in still another embodiment, is a computer-implemented method of identifying roof features and generating a roof report, the method including obtaining a digital 3D model of a structure, using computer processing components to automatically extract roof features from the 3D model to create a roof model; and using computer processing components to generate an electronically viewable roof report based on the roof model. Obtaining a digital 3D model of a structure may involve constructing a 3D model from imagery of the structure. The method may further include providing an electronic interface enabling a user to manually edit an automatically generated roof model. In such cases, the electronic interface for editing a roof model may enable a user to add, remove, and modify facets, edges, and vertices. An electronic interface may also be provided for enabling a user to review a roof model. A roof report of the present disclosure may include a roof model rendering, data regarding one or more edge lengths, data regarding one or more edge types, data regarding one or more facet areas, data regarding one or more facet pitches, data regarding roof area, data regarding a predominant pitch, overhead imagery, oblique imagery, and/or an estimate for replacing a roof of the structure. In some embodiments, using computer processing components to automatically extract roof features from the 3D model to create a roof model may include applying a convolutional neural network to the 3D model. A training set of the neural network may be automatically augmented by randomizing the translation, scale, and/or rotation of training models. In some embodiments, the method may include training the neural network using stochastic gradient descent with cross-entropy loss to optimize network weights.

The present disclosure has several advantages over existing workflows. Due to higher automation and other factors, roof models extracted from 3D models may be more accurate than roof models extracted via other methods. Also, the process may be faster and cheaper because there is no need for manual steps including image compilation, roof model construction, lean correction, and pitch determination. By estimating a response time, the present disclosure may assist roofing contractors in notifying customers when they can expect to receive a full estimate. By including product-specific estimates in the roof report, the present disclosure may simplify and accelerate the contractor's estimate workflow.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 4 is a listing of services in an embodiment of the present disclosure.

FIG. 5 is a listing of models in an embodiment of the present disclosure.

DETAILED DESCRIPTION

The present disclosure relates to novel and advantageous systems and methods for estimating construction projects. In particular, the present disclosure relates to novel and advantageous system and methods for determining roof measurements using imagery.

Figure 1:
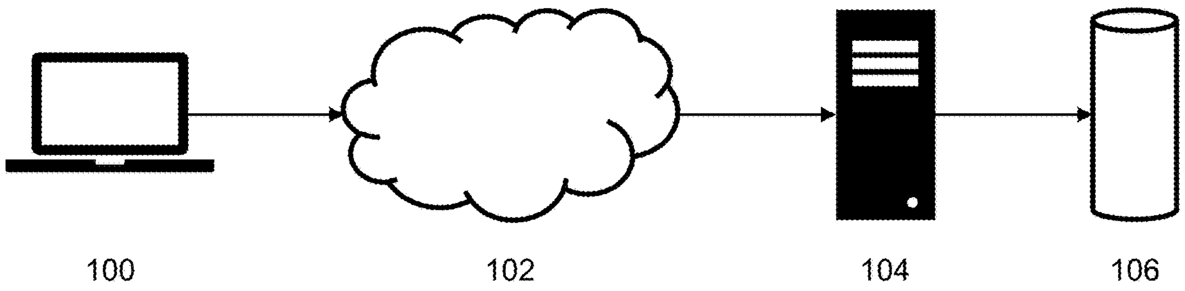
FIG. 1 is a diagram of a system for determining roof measurements using imagery, according to an embodiment of the present disclosure.

FIG. 1 is a system diagram illustrating an embodiment of the present disclosure. In it, a client 100 may connect via a network 102 to a server 104 which has access to a database 106. The client 100 may be a computer, tablet, phone, etc. The network 102 may be a local area network, wide area network, etc. The server 104 may be on-premises, on cloud computing architecture ("the cloud"), etc. The database 106 may be any kind of database or database architecture (e.g., but not limited to, Amazon SimpleDB, Google Cloud Datastore, MongoDB, Oracle, PostgreSQL, etc.). The client 100 may run an application that is desktop-based, web-based, etc. The database 106 may contain 3D models, imagery, request information, roof models, roof reports, user information, any other data described herein as created, received, or used by part of the systems or during the methods described herein, etc. The imagery may include overhead, oblique, and ground-based imagery. The imagery may have been captured by airplanes, drones, satellites, etc. The imagery data may include telemetry data and/or camera models to facilitate 3D model construction. Not to be limited by the foregoing, any one or more of the hardware and software components of the present disclosure may be integral portions of a single computer, server, or controller, or may be connected parts of a computer network. The hardware and software components may be located within a single location or, in other embodiments, portions of the hardware and software components may be divided among a plurality of locations and connected directly or through a global computer information network, such as the network 102, above, or the internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

Figure 2:
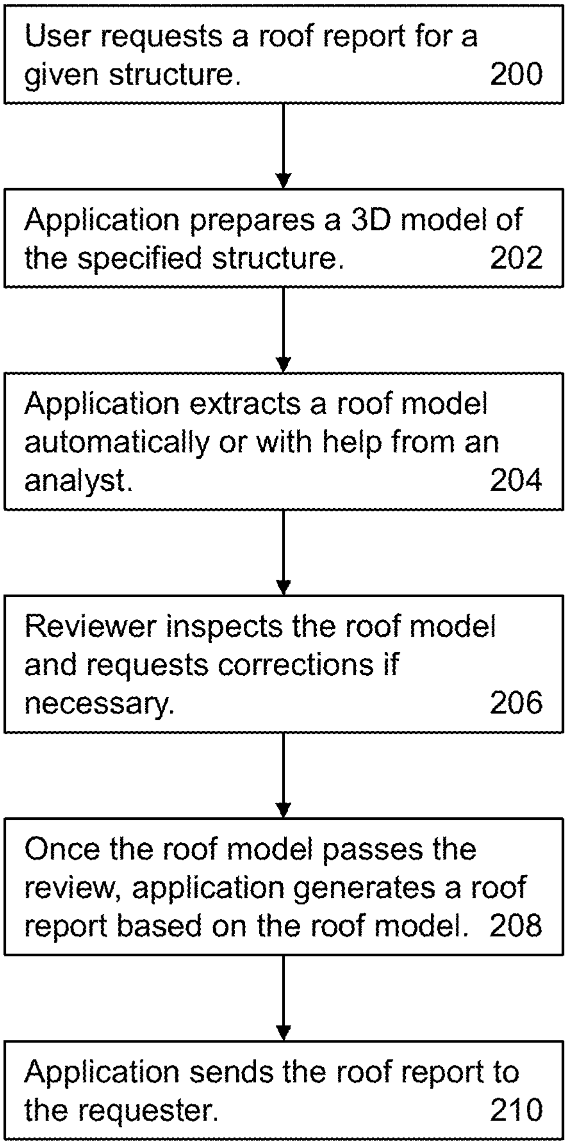
FIG. 2 is a general overview flowchart for a method of determining roof measurements using imagery, according to an embodiment of the present disclosure.

FIG. 2 is a nonlimiting overview flowchart for a method of an embodiment of the present disclosure. In general, a user may begin at step 200 by requesting a roof report for a given structure (e.g. a single-family home, multifamily home, or commercial building). At step 202, the application may prepare a 3D model for the specified structure. At step 204, the application may extract a roof model automatically or with help from an analyst. At step 206, a reviewer may inspect the roof model and request corrections if necessary. At step 208, once the roof model passes the review, the application may generate a roof report based on the roof model. At step 210, the application may send the roof report to the requesting user.

Figure 3:
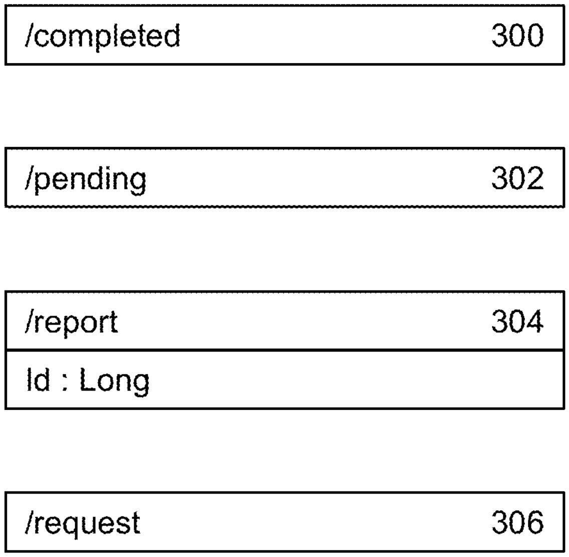
FIG. 3 is a listing of pages of an embodiment of the present disclosure.

FIG. 3 lists pages or screens that may be present in an embodiment of the disclosure. A /completed page 300 may enable a user to view completed roof report requests. A /pending page 302 may enable a user to view pending roof report requests. A /report page 304 may enable a user to generate, review, or edit a roof model. It may accept a report identifier parameter to facilitate loading the relevant report. A /request page 306 may enable a user to request a roof report. The pages or screens identified in FIG. 3 are not limiting in that fewer or greater pages or screens may be used for any embodiment of the present disclosure. Likewise, any given page or screen may be divided or sub-divided into multiple of pages or screens, and the functionality of any plurality of pages or screens may alternatively be combined into a single page or screen.

FIG. 4 lists services that may be present in an embodiment of the disclosure. An /api/addtiles service 400 may facilitate adding 3D tiles to the database 106. It may accept a URL parameter for the root tile. An /api/getreport service 402 may facilitate retrieving a roof model. It may accept a report identifier parameter. An /api/notifyanalysts service 404 may facilitate notifying analysts that there are pending roof report requests. It may accept a user level parameter (e.g., 0 for new, 1 for trainee, 2 for analyst, 3 for reviewer, or 4 for administrator). An /api/requestreport service 406 may facilitate adding a roof report request to the database 106. It may accept address, email, latitude, and longitude parameters. An /api/savereport service 408 may facilitate saving a roof model. It may accept content (e.g., a JSON string representing the roof model including facets and guides), obstructed (a value indicating whether the roof is too obstructed by vegetation to generate a roof report), report identifier, and review (a value indicating whether the user is submitting the roof model for review) parameters. An /api/savereview service 410 may facilitate saving the results of a roof model review. It may accept comment (provided by a reviewer if he or she rejects a roof model) and report identifier parameters. An /api/sendreport service 412 may facilitate sending a roof report to a requester. It may accept a report identifier parameter. An /api/setreportsize service 414 may facilitate setting the size of the area of interest for a given report. It may accept report identifier and size parameters. The services identified in FIG. 4 are not limiting in that fewer or greater services may be used for any embodiment of the present disclosure. Likewise, any given service may be divided or sub-divided into multiple of services, and the functionality of any plurality of services may alternatively be combined into a single service.

FIG. 5 lists data models or objects that may be present in an embodiment of the disclosure. These models may be stored in the database 106. A comment model 500 may include, but is not limited to, one or more of an analyst identifier, created date, identifier, review identifier, and text. A report model 502 may include, but is not limited to, one or more of an address, analyst identifier, comment list, content string, end date, identifier, latitude, longitude, obstructed value, reviewer identifier, start date, status (e.g., 0 for new, 1 for analyzing, 2 for analyzed, 3 for reviewing, or 4 for done), size, tile list (a list of 3D mesh tiles surrounding the report location), and training value (a value indicating whether this a training or production report). A request model 504 may include, but is not limited to, one or more of an email, end date, identifier, report identifier, and start date. A tile model 506 may include, but is not limited to, one or more of an east value, identifier, north value, south value, URL, and west value. A user model 508 may include, but is not limited to, one or more of an email, identifier, level, name, and phone. The data models or objects identified in FIG. 5 are not limiting in that fewer or greater data models or objects may be used for any embodiment of the present disclosure. Likewise, any given data model or object may be divided or sub-divided into multiple of data models or objects, and the functionality of any plurality of data models or objects may alternatively be combined into a data model or object.

Figure 6:
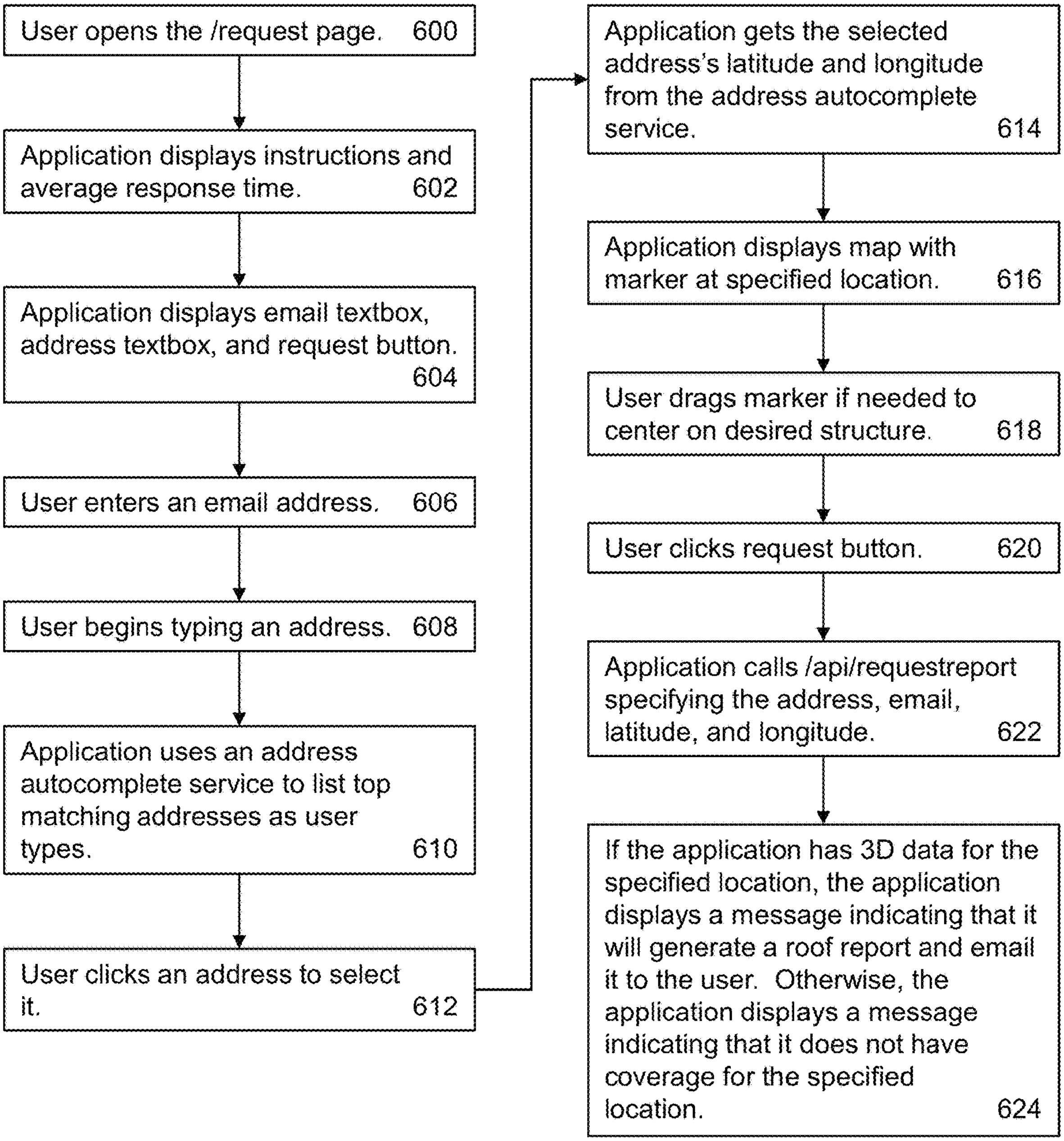
FIG. 6 is a flowchart for requesting a roof report in an embodiment of the present disclosure.

Expanding on step 200 of the general overview in FIG. 2, FIG. 6 is a flowchart for a method of how a user may request a roof report. In it, a user may begin at step 600 by opening the/request page 306. At step 602, the application may display instructions for how to request a roof report and an average response time indicating how soon the user might expect to receive a response to the request. At step 604, the application may display an email textbox, an address textbox, and a "request" button or the like. At step 606, the user may enter an email address in the email textbox, the email address corresponding to an email account the user would like to be contacted through, such as to receive the roof report being requested. While use of email is described herein, other suitable forms of communication may also be used. At step 608, the user may begin typing an address in the address textbox, the address corresponding to the building or structure for which the user would like a roofing estimate or roof report. At step 610, the application may use an address autocomplete service (e.g., but not limited to, from Bing Maps or Google Maps) to list top matching addresses as the user types. At step 612, the user may click an address to select it. At step 614, the application may get the selected address's latitude and longitude from the address autocomplete service. At step 616, the application may display a map with a marker at the specified location (e.g., but not limited to, using Bing Maps or Google Maps). At step 618, the user may drag the marker if needed to center it on the desired structure. At step 620, the user may click a "request" button or the like to submit the request. At step 622, the application may call the /api/requestreport service 406 specifying one or more of the address, email, latitude, and longitude. At step 624, if the application has 3D data for the specified location, the application may display a message indicating that it will generate a roof report and email it or otherwise send or provide it to the user. Otherwise, the application may display a message indicating that it does not have coverage for the specified location.

Figure 7:
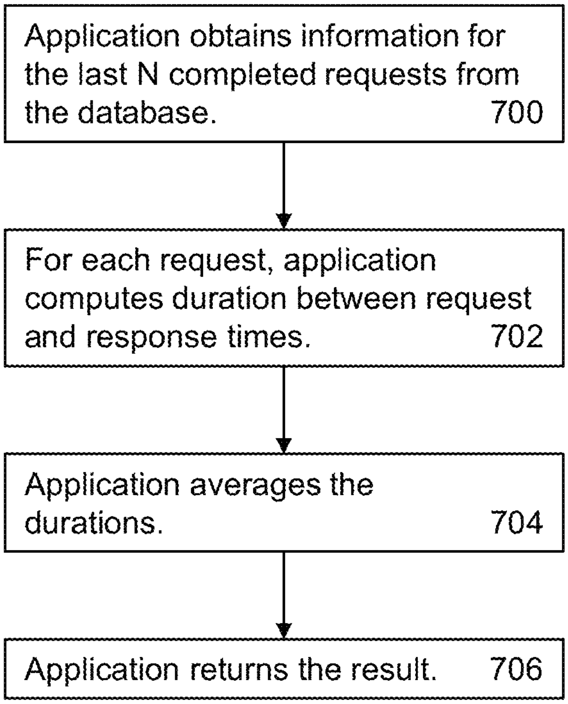
FIG. 7 is a flowchart for calculating an average response time in an embodiment of the present disclosure.

FIG. 7 is a flowchart for a method of how the application may calculate an average response time. In it, the application may start at step 700 by obtaining information for the last N (e.g., but not limited to, 10, 50, 100, or other suitable amount) completed requests from the database 106. At step 702, for each request, the application may retrieve or compute a duration between request and response times. At step 704, the application may average the durations. At step 706, the application may return the result as the estimated or average response time.

Figure 8:
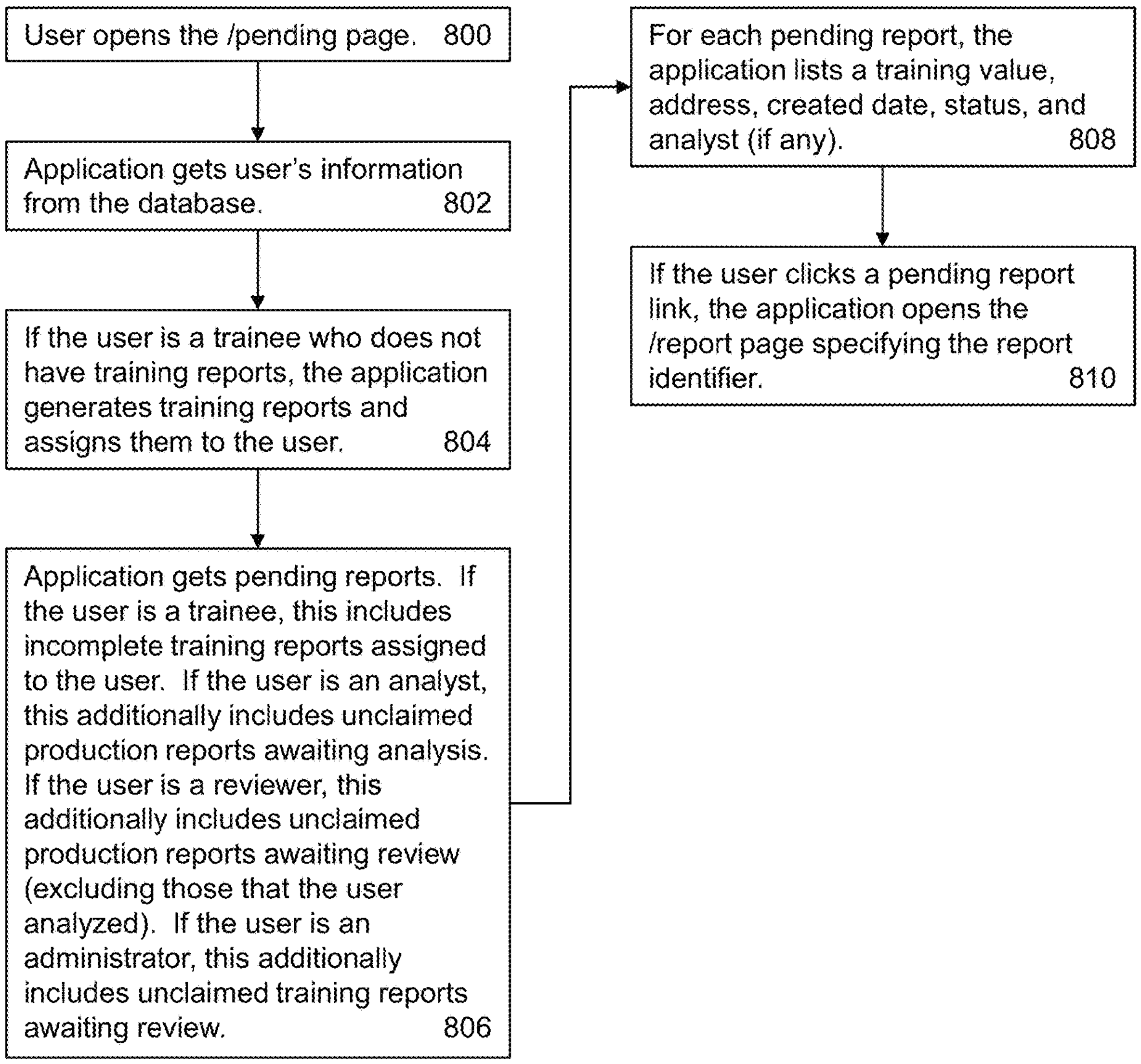
FIG. 8 is a flowchart for listing pending reports in an embodiment of the present disclosure.

FIG. 8 is a flowchart for a method of how the application may list pending reports. A pending roof report is one that someone has requested, but for which a roof model has not yet been generated. In it, a user may start at step 800 by opening the /pending page 302. Although it need not be, the user will typically be a user different than that of the user(s) who requested the roof report(s). At step 802, the application may get the user's information, such as but not limited to, the user's level and identifier from the database 106. At step 804, if the user is a trainee who does not have training reports (reports intended for training new users versus those requested by customers), the application may generate training reports and assigns them to the user. At step 806, the application may get pending reports and/or information about pending reports. If the user is a trainee, this may include incomplete training reports assigned to the user. If the user is an analyst, this may additionally include unclaimed production reports (reports requested by customers) awaiting analysis. If the user is a reviewer, this may additionally include unclaimed production reports awaiting review (typically excluding those that the user analyzed). If the user is an administrator, this may additionally include unclaimed training reports awaiting review. At step 808, for each pending report, the application may list, but is not limited to listing, one or more of a training value (indicating whether this is a training or production report), address, created date, status, analyst (if any), and a link to access the report. At step 810, if the user clicks a pending report link, the application may open the /report page 304 specifying the report identifier.

Figure 9:
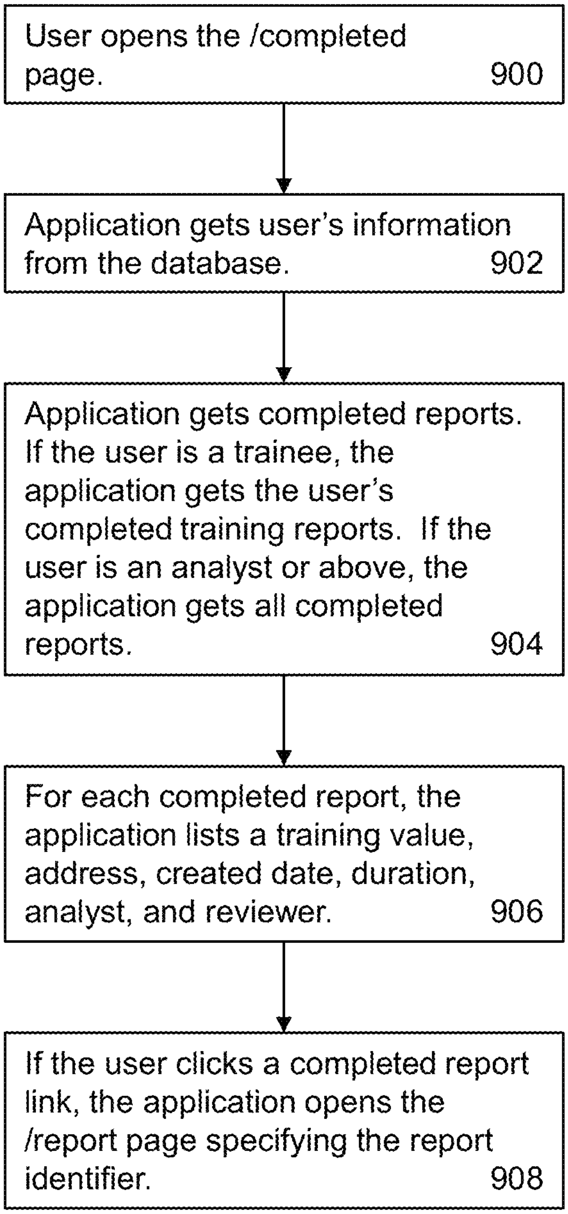
FIG. 9 is a flowchart for listing completed reports in an embodiment of the present disclosure.

FIG. 9 is a flowchart for a method of how the application may list completed reports (reports where a roof model was generated and the system sent a roof report to the person who requested it). In it, a user may start at step 900 by opening the /completed page 300. Although it need not be, the user will typically be a user different than that of the user(s) who requested the roof report(s). At step 902, the application may get the user's information from the database 106. At step 904, the application may get completed reports and/or information about completed reports. If the user is a trainee, the application may get the user's completed training reports. If the user is an analyst or higher level user type, the application may generally get all completed reports. At step 906, for each completed report, the application may list, but is not limited to listing, one or more of a training value, address, created date, duration, analyst (if any), reviewer (if any), and a link to access the report. At step 908, if the user clicks a completed report link, the application may open the /report page 304 specifying the report identifier.

Figure 10:
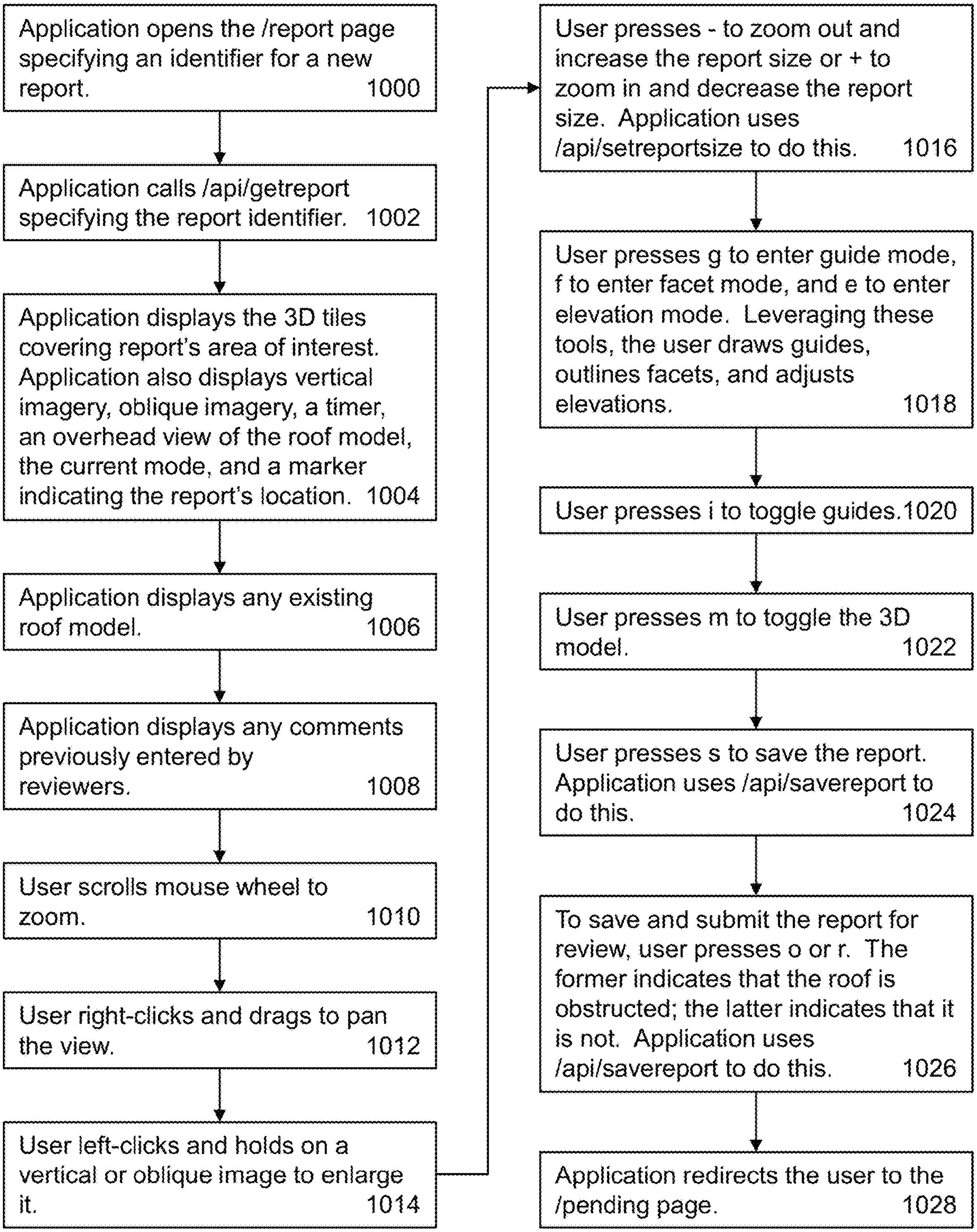
FIG. 10 is a flowchart for generating a roof model manually in an embodiment of the present disclosure.

Expanding on step 204 of the general overview in FIG. 2, the following discussion describes how a roof model may be extracted. FIG. 10 is a flowchart for a method of how a user may extract a roof model and generate a report manually. In it, the application may begin at step 1000 by opening the /report page 304 corresponding to a report identifier. At step 1002, the application may call the /api/getreport service 402 specifying the report identifier. At step 1004, the application may display the 3D tiles (tiles from a 3D mesh surrounding the report location) covering the report's area of interest (an area surrounding the report's location). The application may also display one or more of vertical imagery, oblique imagery, a timer, an overhead view of the roof model, the current mode (described further below), and a marker indicating the location corresponding to the report. At step 1006, the application may display any existing roof model. At step 1008, the application may display any comments previously entered by reviewers. At step 1010, the user may scroll the mouse wheel to zoom. At step 1012, the user may right-click and drag to pan the view. At step 1014, the user may left-click and hold on a vertical or oblique image to enlarge it. At step 1016, the user may press "−" to zoom out and increase the report size or "+" to zoom in and decrease the report size. The application may use the /api/setreportsize service 414 to do this. At step 1018, the user may press "g" to enter guide mode, "f" to enter facet mode, or "e" to enter elevation mode. Leveraging these tools, the user may draw guides (described below), outline facets, and adjust elevations, respectively. At step 1020, the user may press "i" to toggle guides. At step 1022, the user may press "m" to toggle the 3D model's visibility. At step 1024, the user may press "s" to save the report. The application may use the /api/savereport service 408 to do this. At step 1026, to save and submit the report for review, the user may press "o" or "r." The former indicates that the roof is obstructed; the latter indicates that it is not. The application may use the /api/savereport service 408 to do this. At step 1028, the application may redirect the user to the pending page 302. While certain methods of interfacing with the application, such as to switch between modes, toggle guides, save the report, etc., are described herein, these are just example methods of interfacing with the application and other known or to be developed methods of interfacing with an application may be used to accomplish the same tasks.

Figure 11:
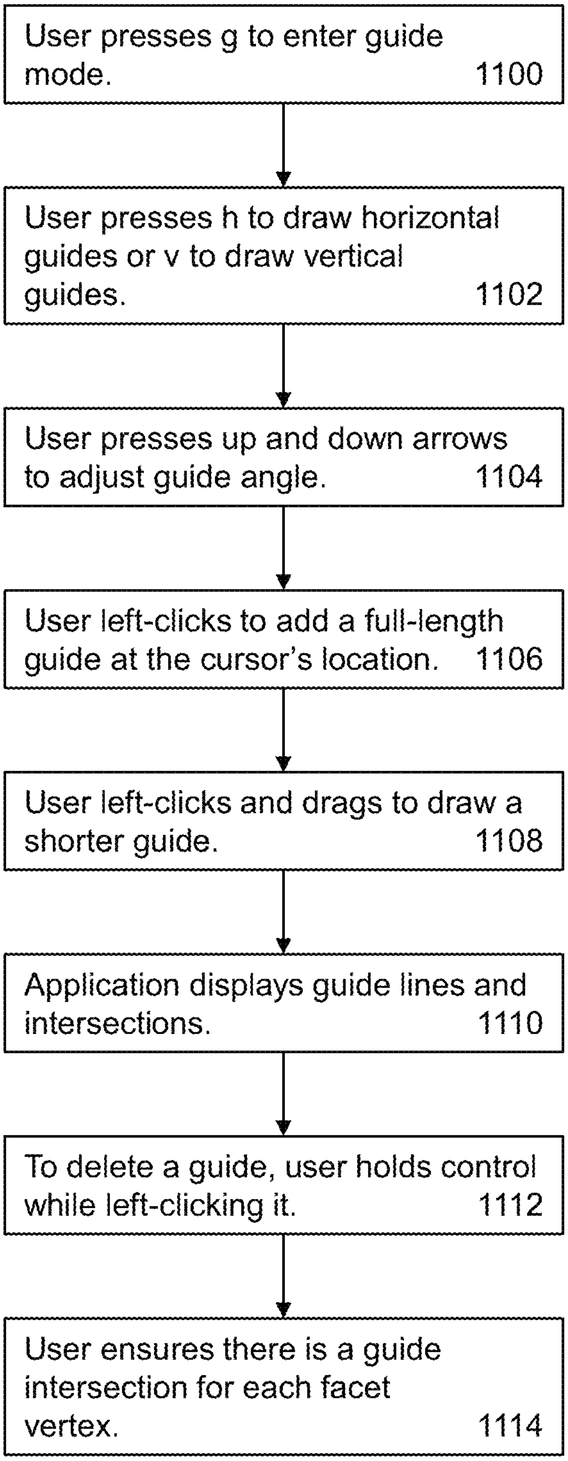
FIG. 11 is a flowchart for drawing guides in an embodiment of the present disclosure.

FIG. 11 is a flowchart for a method of how a user may draw guides. Guides are lines that the cursor snaps to when an analyst manually outlines roof facets. By default, guides are horizontal or vertical, but an analyst may adjust the angle of the guides to reflect the dominant angles of the structure. Guides are useful for drawing parallel lines and square corners. They facilitate generating accurate and aesthetically pleasing roof reports. In it, the user may start at step 1100 by pressing "g" to enter guide mode. At step 1102, the user may press "h" to draw horizontal guides or "v" to draw vertical guides. At step 1104, the user may press up and down arrows to adjust the guide angle. At step 1106, the user may left-click to add a full-length guide at the cursor's location. At step 1108, the user may left-click and drag to draw a shorter guide. At step 1110, the application may display guide lines and intersections. At step 1112, to delete a guide, a user may hold control while left-clicking it. At step 1114, a user may ensure there is a guide intersection for each facet vertex. Again, while certain methods of interfacing with the application, such as to draw guides, adjust the guide angle, delete a guide, etc., are described herein, these are just example methods of interfacing with the application and other known or to be developed methods of interfacing with an application may be used to accomplish the same tasks.

Figure 12:
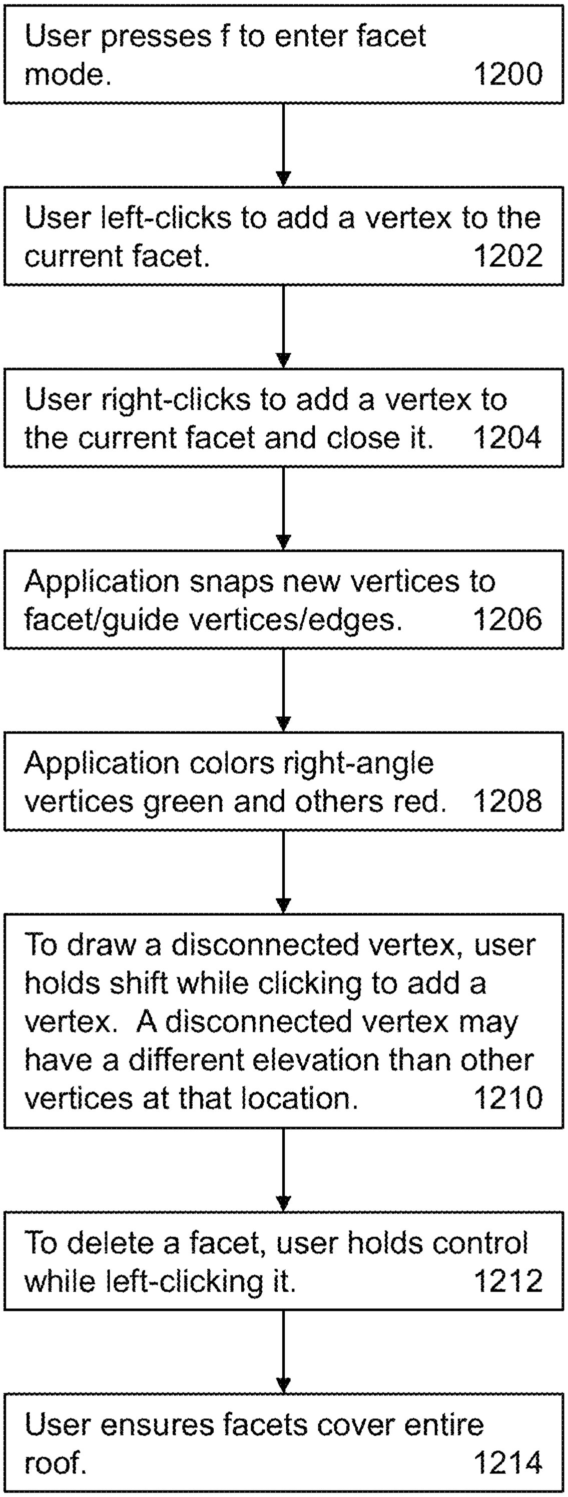
FIG. 12 is a flowchart for outlining facets in an embodiment of the present disclosure.

FIG. 12 is a flowchart for a method of how a user may outline facets. In it, the user may start at step 1200, by pressing "f" to enter facet mode. At step 1202, the user may left-click to add a vertex to the current facet. At step 1204, the user may right-click to add a vertex to the current facet and close it. At step 1206, the application may snap new vertices to facet/guide vertices/edges. At step 1208, the application may color right-angle vertices (as viewed, for example, from above) green and others red, or other suitable colors. At step 1210, to draw a disconnected vertex, a user may hold shift while clicking to add a vertex. A disconnected vertex may have a different elevation than other vertices at that location (as viewed from above). At step 1212, to delete a facet, a user may hold control while left-clicking it. At step 1214, a user may ensure that facets cover the entire roof. Again, while certain methods of interfacing with the application, such as to add a vertex, snap vertices, delete a facet, etc., are described herein, these are just example methods of interfacing with the application and other known or to be developed methods of interfacing with an application may be used to accomplish the same tasks.

Figure 13:
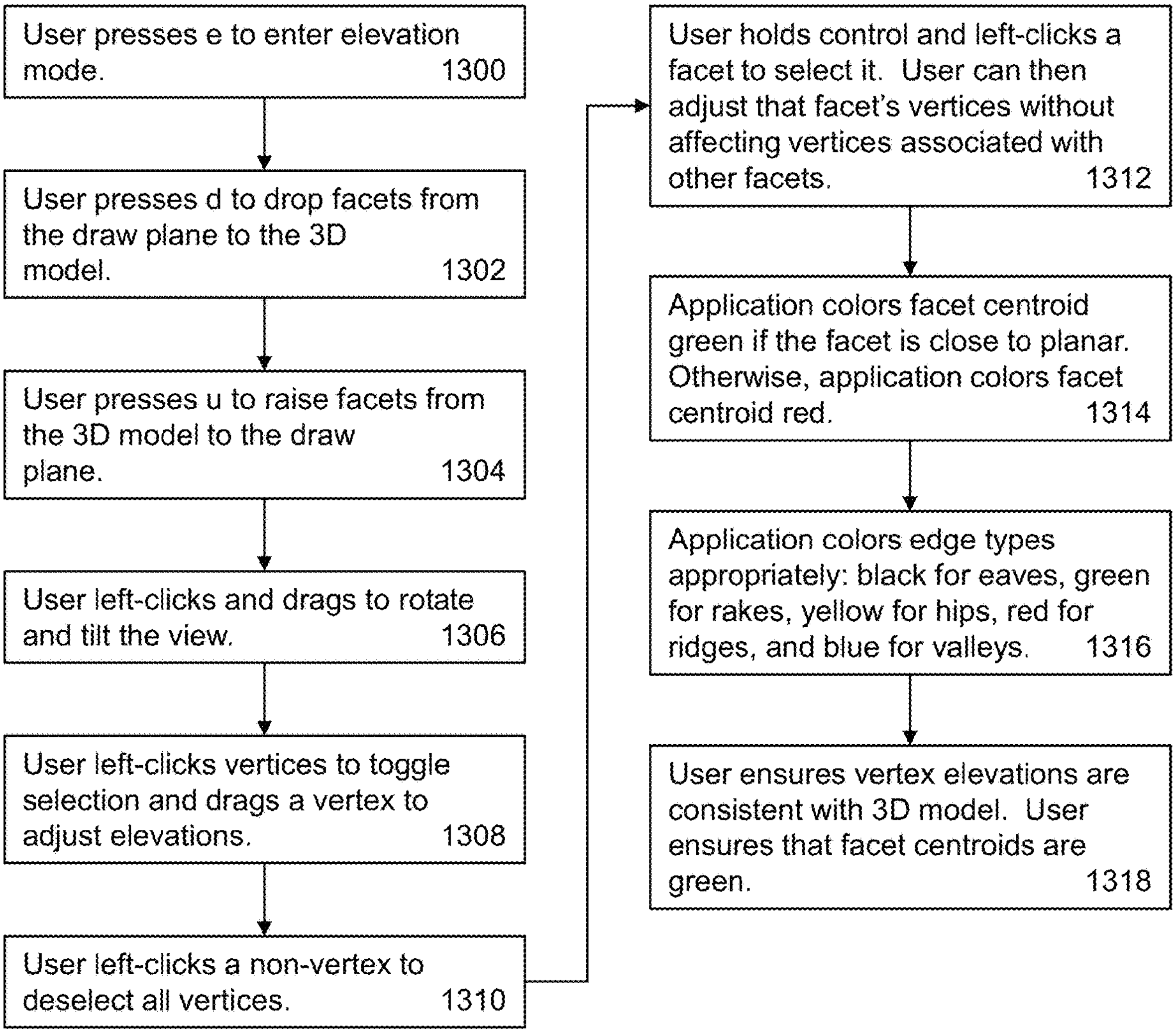
FIG. 13 is a flowchart for adjusting elevations in an embodiment of the present disclosure.

FIG. 13 is a flowchart for a method of how a user may adjust facet vertex elevations. In it, the user may start at step 1300 by pressing "e" to enter elevation mode. At step 1302, the user may press "d" to drop facets from the draw plane to the 3D model. The draw plane may be a plane that is parallel to the ground and above the structure's 3D model. When an analyst draws facets, they may be initially confined to this draw plane. At step 1304, the user may press "u" to raise facets from the 3D model to the draw plane. At step 1306, the user may left-click and drag to rotate and tilt the view. At step 1308, the user may left-click vertices to toggle the selection and drag a vertex to adjust elevations. At step 1310, the user may left-click a non-vertex to deselect all vertices. At step 1312, the user may hold control and left-click a facet to select it. This may enable a user to adjust that facet's vertices without affecting connected vertices associated with other facets. At step 1314, the application may color a facet centroid green or other suitable color if the facet is close to planar. Otherwise, the application may color the facet centroid red or other suitable color. At step 1316, the application may color edged based on type: for example, black or other suitable color for eaves, green or other suitable color for rakes, yellow or other suitable color for hips, red or other suitable color for ridges, and blue or other suitable color for valleys. At step 1318, the user may ensure vertex elevations are consistent with the 3D model. The user may also ensure that facet centroids are green. Again, while certain methods of interfacing with the application, such as to drop facets, raise facets, rotate and tilt the view, drag a vertex, etc., are described herein, these are just example methods of interfacing with the application and other known or to be developed methods of interfacing with an application may be used to accomplish the same tasks.

Figure 14:
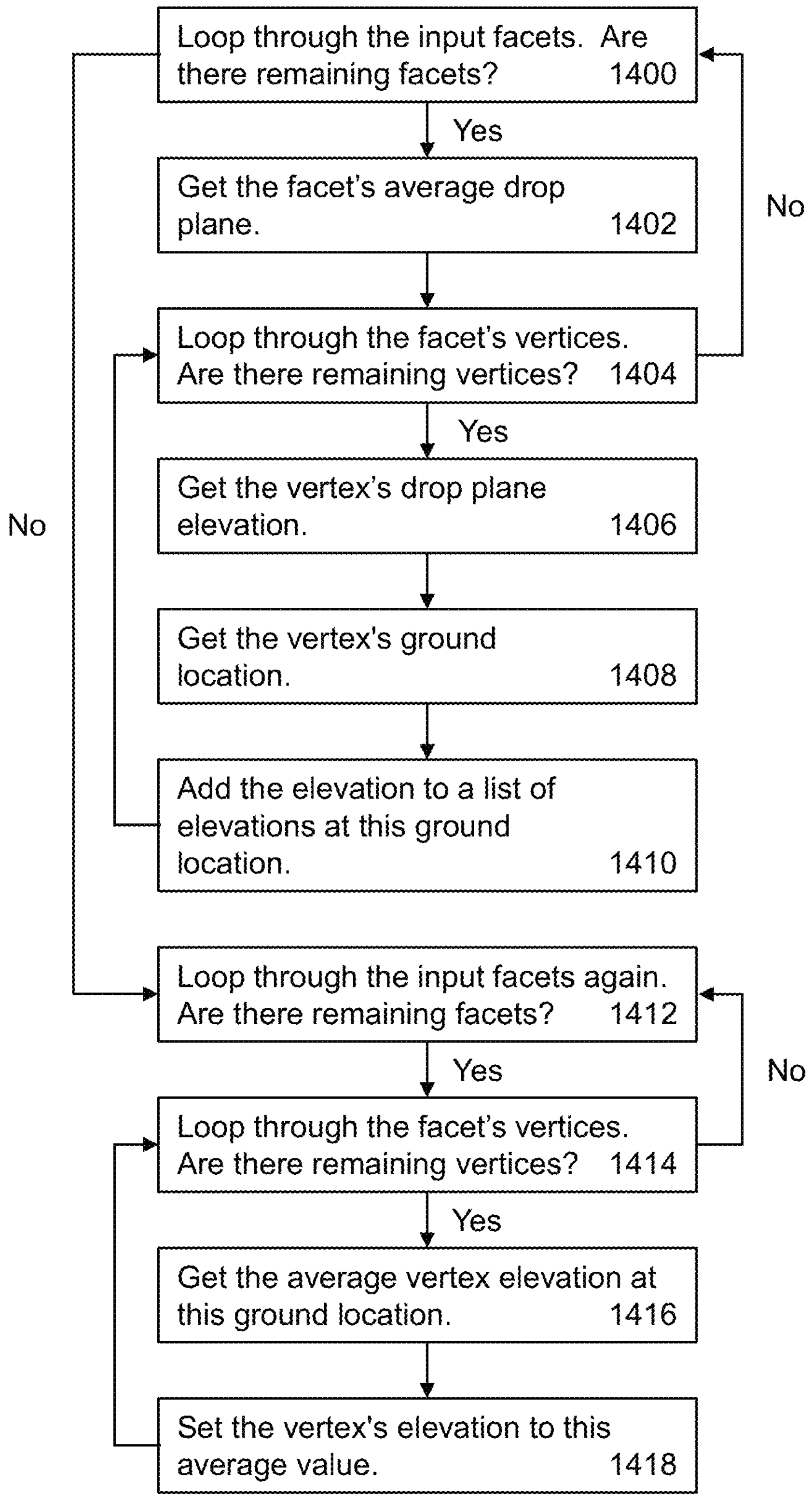
FIG. 14 is a flowchart for automatically dropping facets in an embodiment of the present disclosure.

FIG. 14 is an overview flowchart for a method of how the application may automatically drop facets from the draw plane to the 3D model while maintaining facet connectivity and ignoring noise such as overlapping vegetation. In it, the application may start at step 1400 by looping through the input facets. If there are remaining facets, the application may proceed to step 1402. Otherwise, the application may proceed to step 1412. At step 1402, the application may get the current facet's average drop plane (see FIG. 15). At step 1404, the application may begin looping through the facet's vertices. If there are remaining vertices, the application may proceed to step 1406. Otherwise, the application may return to step 1400. At step 1406, the application may get the vertex's drop plane elevation (by getting the closest point on the current facet's average drop plane to the vertex's current location). At step 1408, the application may get the current vertex's ground location (by setting the vertex's y component to zero). At step 1410, the application may add the elevation to a list of elevations at this ground location. The application may then return to step 1404. At step 1412, the application may begin looping through the input facets again. If there are remaining facets, the application may proceed to step 1414. At step 1414, the application may begin looping through the facet's vertices. If there are remaining vertices, the application may proceed to step 1416. Otherwise, the application may return to step 1412. At step 1416, the application may get the average vertex elevation at this ground location. At step 1418, the application may set the vertex's elevation to this average value. The application may then return to step 1414.

Figure 15:
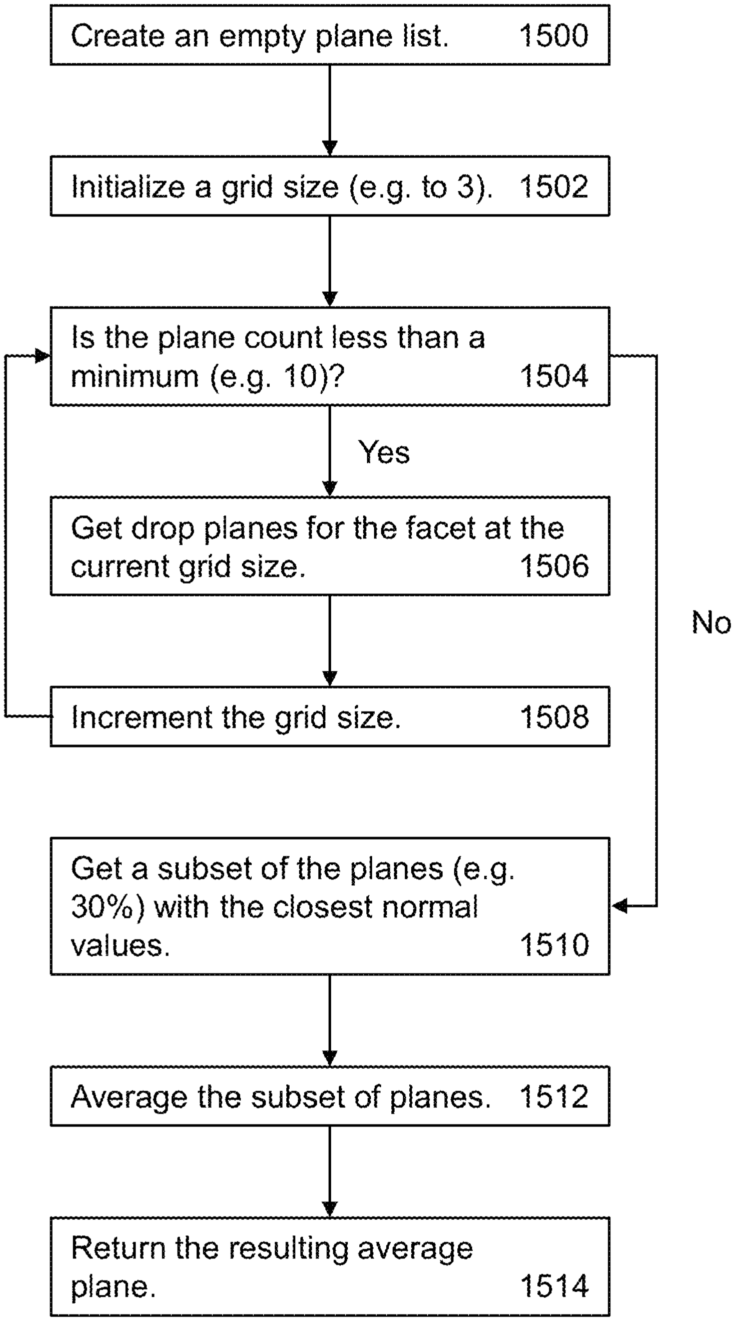
FIG. 15 is a flowchart for getting a facet's average drop plane in an embodiment of the present disclosure.

FIG. 15 is a flowchart for a method of how the application may get a facet's average drop plane in step 1402. The goal is to find a suitable plane to drop facet vertices onto when lowering them from the draw plane. The drop plane should be close to the actual plane that the roof facet represents, ignoring any obstructions like vegetation. The application may begin at step 1500 by creating an empty plane list. At step 1502, the application may initialize a grid size (e.g., to 3). A grid size of 3, for example, means that the application may overlay a 3 by 3 grid on the facet and determine actual elevations at those locations using the 3D model. At step 1504, the application may determine whether the plane count is less than a minimum (e.g., 10 or another suitable size/amount). If so, the application may proceed to step 1506. Otherwise, the application may proceed to step 1510. At step 1506, the application may get or determine drop planes (see FIG. 16) for the facet at the current grid size. At step 1508, the application may increment the grid size. The application may then return to step 1504. At step 1510, the application may get a subset of the planes (e.g., 30% or another suitable percentage) with the closest normal values (a normal is a vector perpendicular to a plane). At step 1512, the application may average the subset of planes. One can define a plane using a unit normal representing the plane's angle and a constant representing the plane's signed distance from the origin to the plane. To find an average plane, one can separately average the normal and constants for each of the input planes. At step 1514, the application may return the resulting average plane.

Figure 16:
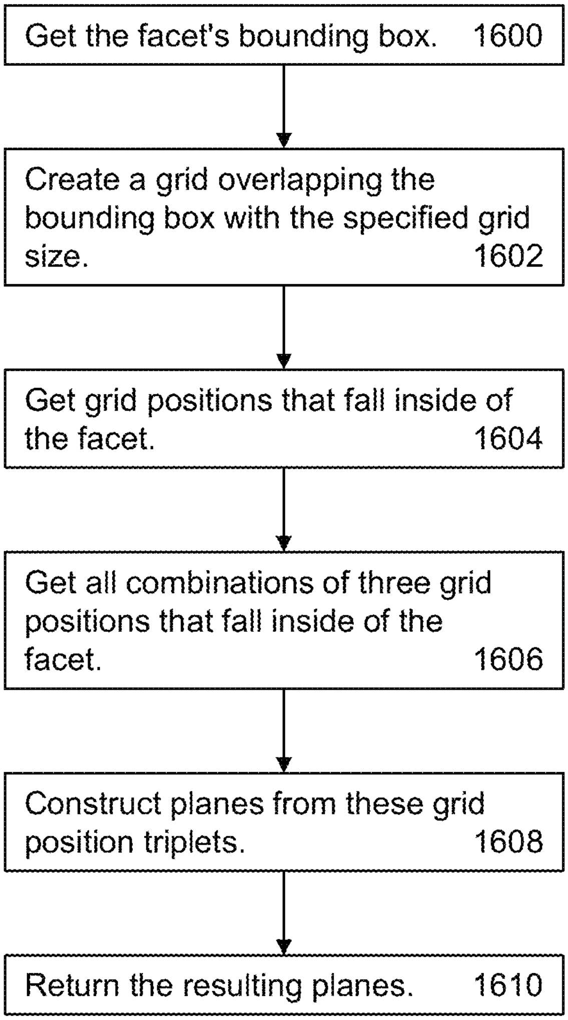
FIG. 16 is a flowchart for getting a facet's drop planes in an embodiment of the present disclosure.

FIG. 16 is a flowchart for a method of how the application may get or determine a facet's drop planes. In it, the application may begin at step 1600 by getting the facet's overhead bounding box (e.g., by getting the facet's minimum and maximum x and z values). At step 1602, the application may create a grid overlapping the bounding box with the specified grid size. At step 1604, the application may get grid positions that fall inside of the facet. At step 1606, the application may get or determine some or all combinations of three (or another suitable number) grid positions that fall inside of the facet. At step 1608, the application may construct planes from these grid position triplets. At step 1610, the application may return the resulting planes and/or information about the resulting planes.

Figure 17:
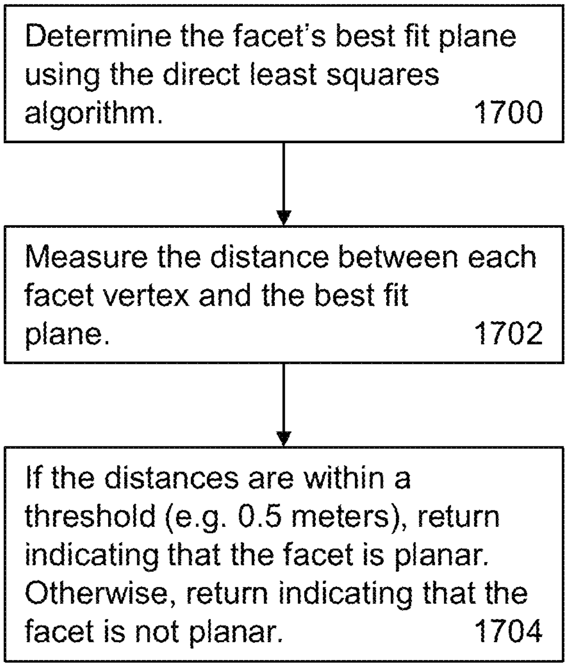
FIG. 17 is a flowchart for determining if a facet is planar in an embodiment of the present disclosure.

FIG. 17 is a flowchart for a method of how the application may determine if a facet is planar. In it, the application may begin at step 1700 by determining the facet's best fit plane using a direct least squares algorithm (see "Direct Least Squares Algorithm" by David Eberly at https://www.geometrictools.com/Documentation/LeastSquaresFitting.pdf). A best fit plane is a plane that best fits a list of 3D points. At step 1702, the application may measure the distance between each facet vertex and the best fit plane. At step 1704, if the distances are within a threshold (e.g. 0.5 meters or other suitable distance), the application may return indicating that the facet is planar. Otherwise, the application may return indicating that the facet is not planar.

Figure 18:
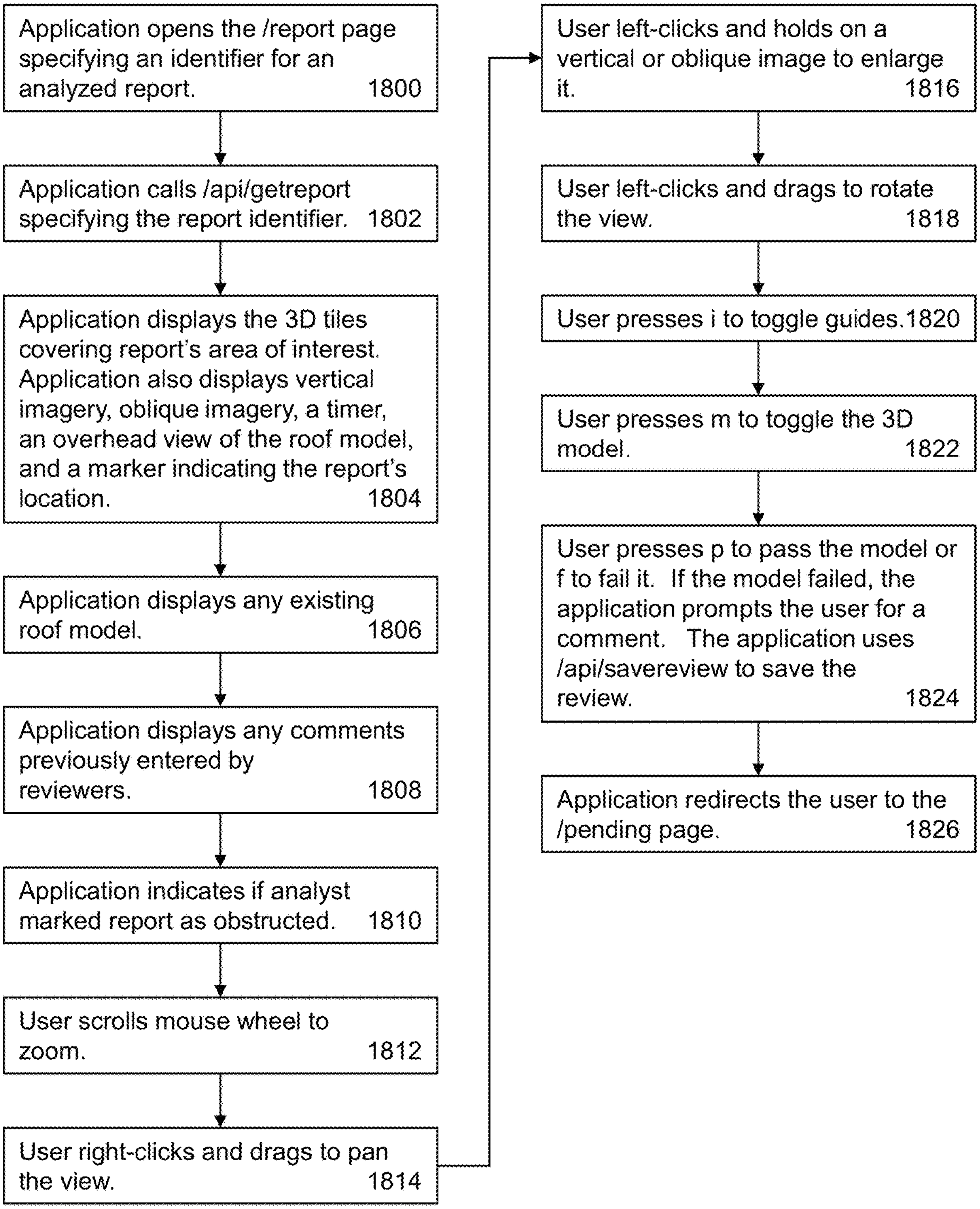
FIG. 18 is a flowchart for reviewing a roof model in an embodiment of the present disclosure.

Expanding on step 206 of the general overview in FIG. 2, FIG. 18 is a flowchart for a method of how the application may enable a user to review a roof model. In it, the application may begin at step 1800 by opening the /report page 304 corresponding to an identifier for an analyzed report. At step 1802, the application may call the /api/getreport service 402 specifying the report identifier. At step 1804, the application may display the 3D tiles covering the report's area of interest. The application may also display one or more of vertical imagery, oblique imagery, a timer, an overhead view of the roof model, and a marker indicating the location corresponding to the report. At step 1806, the application may display any existing roof model. At step 1808, the application may display any comments previously entered by reviewers. At step 1810, the application may indicate if the analyst marked the report as obstructed. At step 1812, the user may scroll the mouse wheel to zoom. At step 1814, the user may right-click and drag to pan the view. At step 1816, the user may left-click and hold on a vertical or oblique image to enlarge it. At step 1818, the user may left-click and drag to rotate and tilt the view. At step 1820, the user may press "i" to toggle the guides. At step 1822, the user may press "m" to toggle the 3D model's visibility. At step 1824, the user may press "p" to pass the model or "f" to fail it. If the model failed, the application may prompt the user for a comment. The application may use the /api/savereview service 410 to save the review. At step 1826, the application may redirect the user to the /pending page 302. Again, while certain methods of interfacing with the application, such as to pan the view, zoom, enlarge an image, rotate and tilt the view, toggle features, etc., are described herein, these are just example methods of interfacing with the application and other known or to be developed methods of interfacing with an application may be used to accomplish the same tasks.

Figure 19:
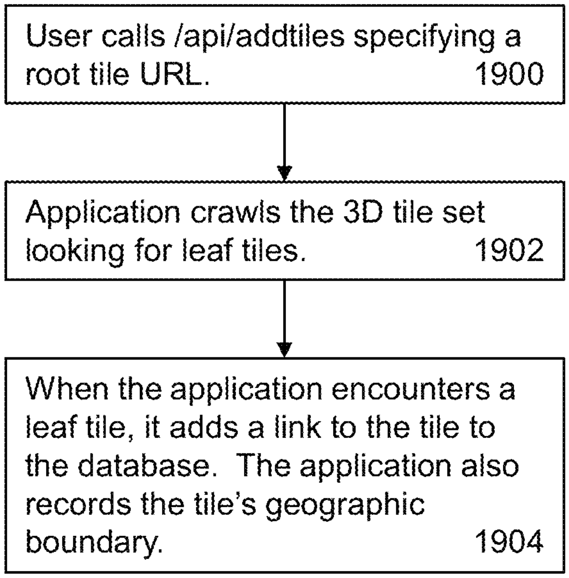
FIG. 19 is a flowchart for adding tiles in an embodiment of the present disclosure.

FIG. 19 is a flowchart for a method of how a user may add 3D tiles to the database 106. This may be done ahead of time so that 3D tiles are available to use when someone requests a roof report. In it, the user may start at step 1900 by calling the /api/addtiles service 400 specifying a root tile URL or other source. At step 1902, the application may crawl the 3D tile set looking for leaf tiles. 3D tile sets may include multiple resolutions of 3D data for a given location to facilitate smoothly zooming in and out. For the purposes of generating roof reports, however, we may only need the highest resolution meshes. We refer to these as leaf tiles. At step 1904, when the application encounters a leaf tile, it may add a link to the tile to the database 106. The application may also record the tile's geographic boundary.

Figure 20:
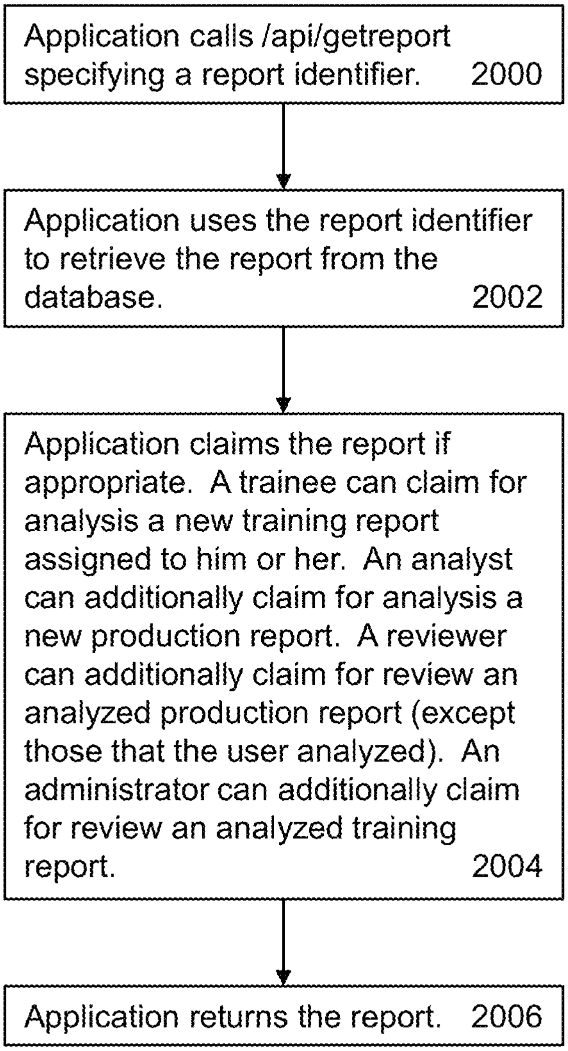
FIG. 20 is a flowchart for getting a report in an embodiment of the present disclosure.

FIG. 20 is a flowchart for a method of how the application may retrieve a report from the database 106 for viewing or editing, such as for review or edit by an analyst, reviewer, or administrator. In it, the application may start at step 2000 by calling the /api/getreport service 402 specifying a report identifier. At step 2002, the application may use the report identifier to retrieve the report from the database 106. At step 2004, the application may claim the report if appropriate. Claiming a report may prevent duplicate effort by preventing multiple analysts from generating roof models for the same request. A trainee may be able to claim for analysis a new training report assigned to him or her. An analyst may additionally be able to claim for analysis a new production report. A reviewer may additionally be able to claim for review an analyzed production report (except those that the user analyzed). An administrator may additionally be able to claim for review an analyzed training report. At step 2006, the application may return the report.

Figure 21:
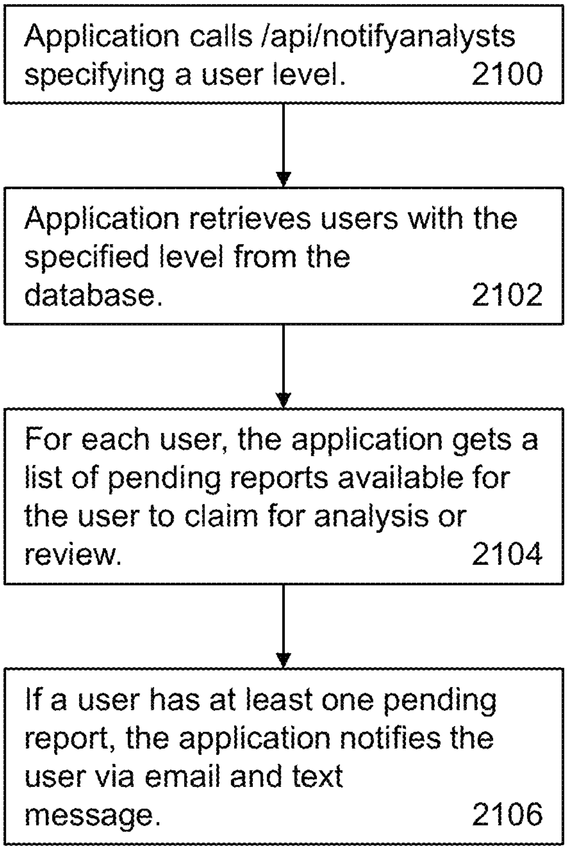
FIG. 21 is a flowchart for notifying analysts in an embodiment of the present disclosure.

FIG. 21 is a flowchart for a method of how the application may notify analysts when there are pending roof report requests. In it, the application may start at step 2100 by calling the /api/notifyanalysts service 404 specifying a user level. At step 2102, the application may retrieve users with the specified level from the database. At step 2104, for each user, the application may get a list of pending reports available for the user to claim for analysis or review. If a user has at least one pending report, the application may notify the user via email, text message, or any other suitable means of communication.

Figure 22:
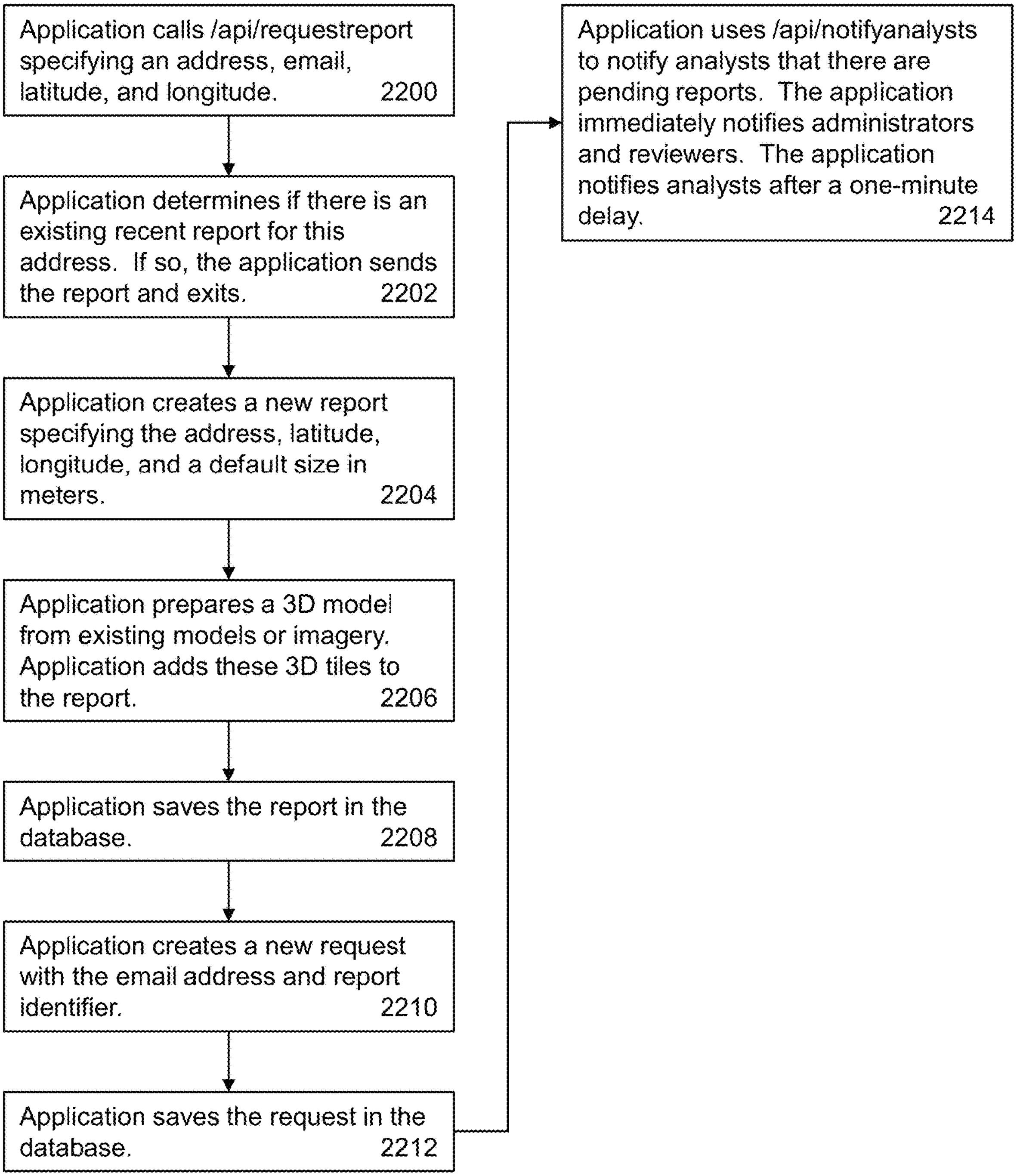
FIG. 22 is a flowchart for recording a roof report request in an embodiment of the present disclosure.

FIG. 22 is a flowchart for a method of how the application may record a roof request in the database 106. The application may start at step 2200 by calling the /api/requestreport service 406 specifying one or more of an address, email, latitude, and longitude corresponding to the requesting user and location of the building or structure for which a roofing estimate or roof report is being requested. At step 2202, the application may determine if there is an existing recent report for this address (e.g., one generated since the imagery was last updated at that location). If so, the application may send the report and exit. Otherwise, at step 2204, the application may create a new report specifying one or more of the address, latitude, longitude, and a default size in meters or other suitable scale. At step 2206, the application may prepare a 3D model from existing models or imagery. Application may add 3D tiles corresponding to the 3D model to the report. At step 2208, the application may save the report in the database 106. At step 2210, the application may create a new request with the email address and a report identifier. At step 2212, the application may save the request in the database 106. At step 2214, the application may use the /api/notifyanalysts service 404 to notify analysts that there are pending reports. In some embodiments, the application may immediately notify administrators and reviewers, and may notify analysts after a one-minute delay or other suitable delay.

Figure 23:
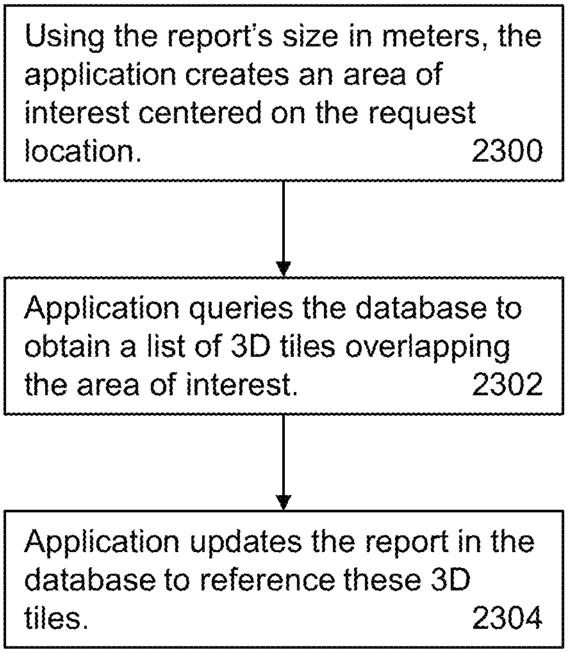
FIG. 23 is a flowchart for preparing a 3D model from existing models in an embodiment of the present disclosure.

Expanding on step 2206 of FIG. 22, FIG. 23 is a flowchart for a method of how the application may prepare a 3D model from existing models. Using the report's size in meters or other suitable scale, the application may start at step 2300 by creating an area of interest centered on the request location. At step 2302, the application may query the database 106 to obtain a list of 3D tiles overlapping the area of interest. It does this by querying the database for 3D tiles with bounding boxes that overlap the area of interest. At step 2304, the application may update the report in the database 106 to reference these 3D tiles.

Figure 24:
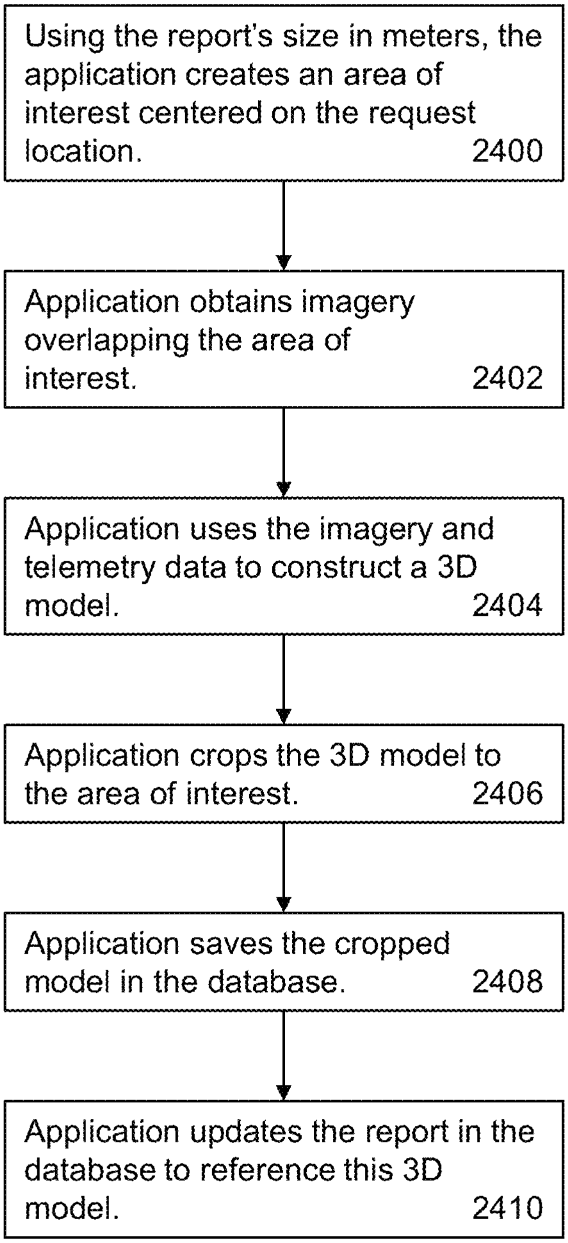
FIG. 24 is a flowchart for preparing a 3D model from imagery in an embodiment of the present disclosure.

Also expanding on step 2206 of FIG. 22, FIG. 24 is a flowchart for a method of how the application may prepare a 3D model from imagery. Using the report's size in meters or other suitable scale, the application may start at step 2400 by creating an area of interest centered on the request location. At step 2402, the application may obtain imagery overlapping the area of interest. At step 2404, the application may use the imagery and telemetry data to construct a 3D model (e.g., but not limited to, using 3DSurvey, Agisoft Photoscan, Pix4Dmapper Pro, SURE, or other suitable 3D reconstruction software). At step 2406, the application may crop the 3D model to the area of interest. At step 2408, the application may save the cropped model in the database 106. At step 2410, the application may update the report in the database 106 to reference this 3D model.

Figure 25:
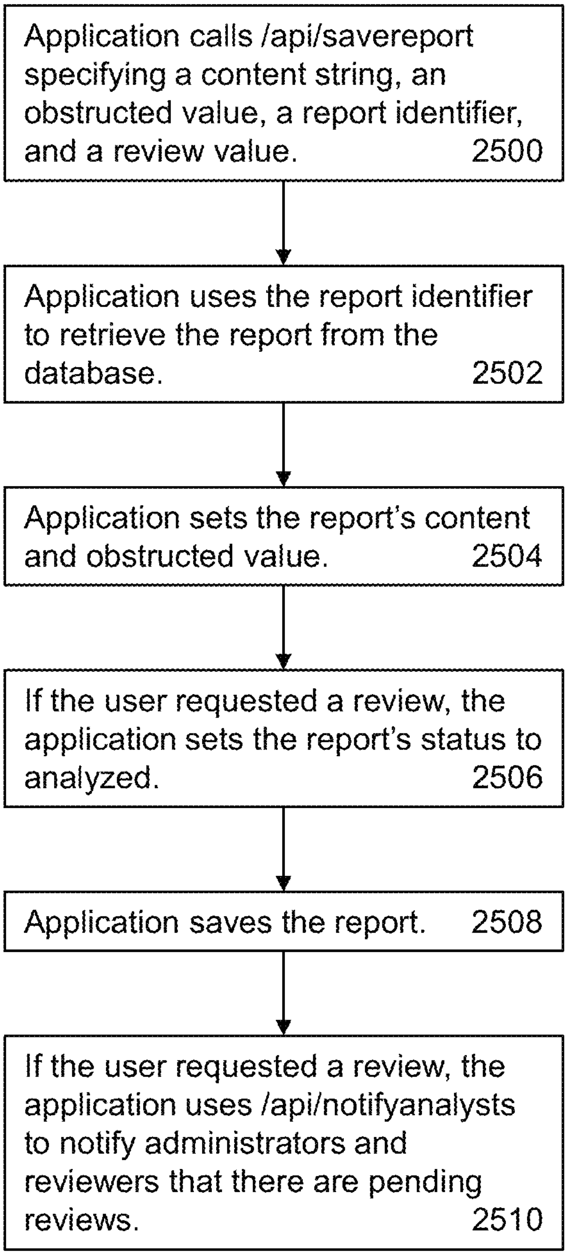
FIG. 25 is a flowchart for saving a report in an embodiment of the present disclosure.

Expanding on step 2208 of FIG. 22, FIG. 25 is a flowchart for a method of how the application may save a report. The application may begin at step 2500 by calling the /api/savereport service 408 specifying one or more of a content string, an obstructed value, a report identifier, and a review value. At step 2502, the application may use the report identifier to retrieve the report from the database 106. At step 2504, the application may set the report's content and obstructed value. At step 2506, if the user requested a review, the application may set the report's status to analyzed. At step 2508, the application may save the report in the database 106. At step 2510, if the user requested a review, the application may use the /api/notifyanalysts service 404 to notify administrators and reviewers that there are pending reviews.

Figure 26:
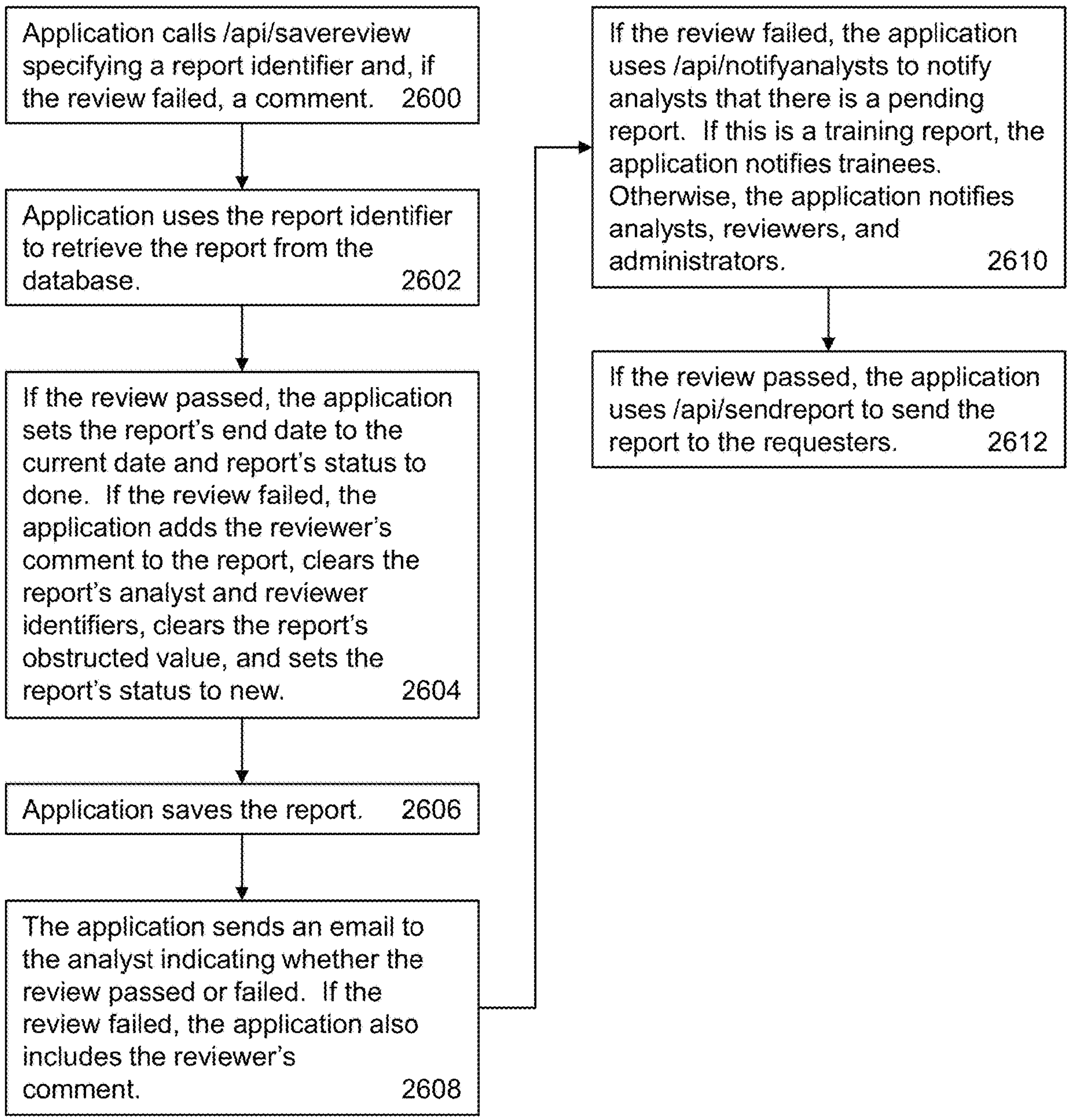
FIG. 26 is a flowchart for saving a review in an embodiment of the present disclosure.

FIG. 26 is a flowchart for a method of how the application may save a review. The application may begin at step 2600 by calling the /api/savereview service 410 specifying a report identifier and, if the review failed, a comment. At step 2602, the application may use the report identifier to retrieve the report from the database 106. At step 2604, if the review passed, the application may set the report's end date to the current date and report's status to "done" or other suitable status identifier. If the review failed, the application may add the reviewer's comment to the report, clear the report's analyst and reviewer identifiers, clear the report's obstructed value, and/or set the report's status to "new" or other suitable status identifier. At step 2606, the application may save the report in the database 106. At step 2608, the application may send an email to the analyst indicating whether the review passed or failed. If the review failed, the application may also include the reviewer's comment. At step 2610, if the review failed, the application may use the /api/notifyanalysts service 404 to notify analysts that there is a pending report. If this is a training report, the application may notify trainees. Otherwise, the application may notify analysts, reviewers, and administrators. At step 2612, if the review passed, the application may use the /api/sendreport service 412 to send the report to the requesters.

Figure 27:
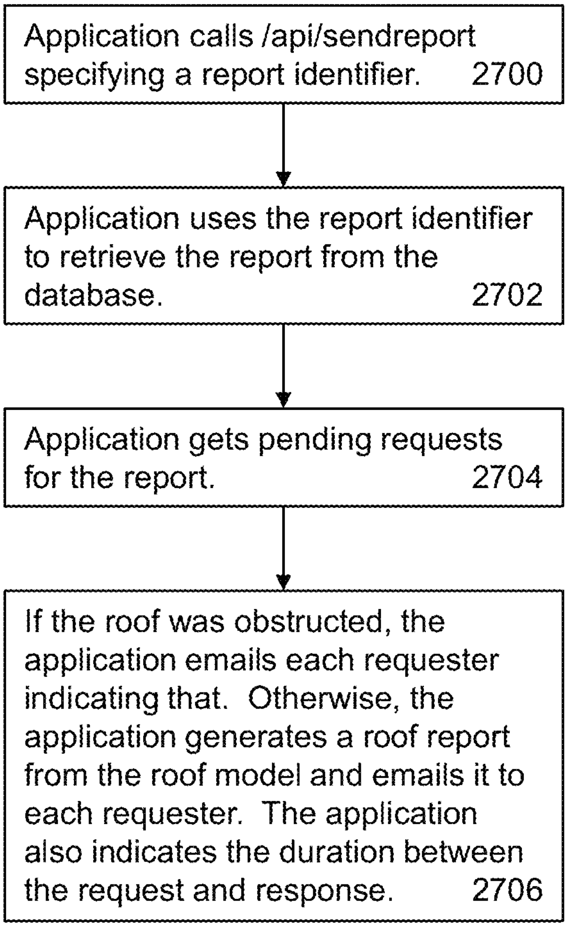
FIG. 27 is a flowchart for sending a report in an embodiment of the present disclosure.

Expanding on step 210 of the general overview in FIG. 2, FIG. 27 is a flowchart for a method of how the application may send a report. The application may begin at step 2700 by calling the /api/sendreport service 412 specifying a report identifier. At step 2702, the application may use the report identifier to retrieve the report from the database 106. At step 2704, the application may get pending requests for the report. At step 2706, if the roof was obstructed, the application may email each requester indicating that. Otherwise, the application may generate a roof report from the roof model and email it to each requester. The application may also indicate the duration between the request and response.

Figure 28:
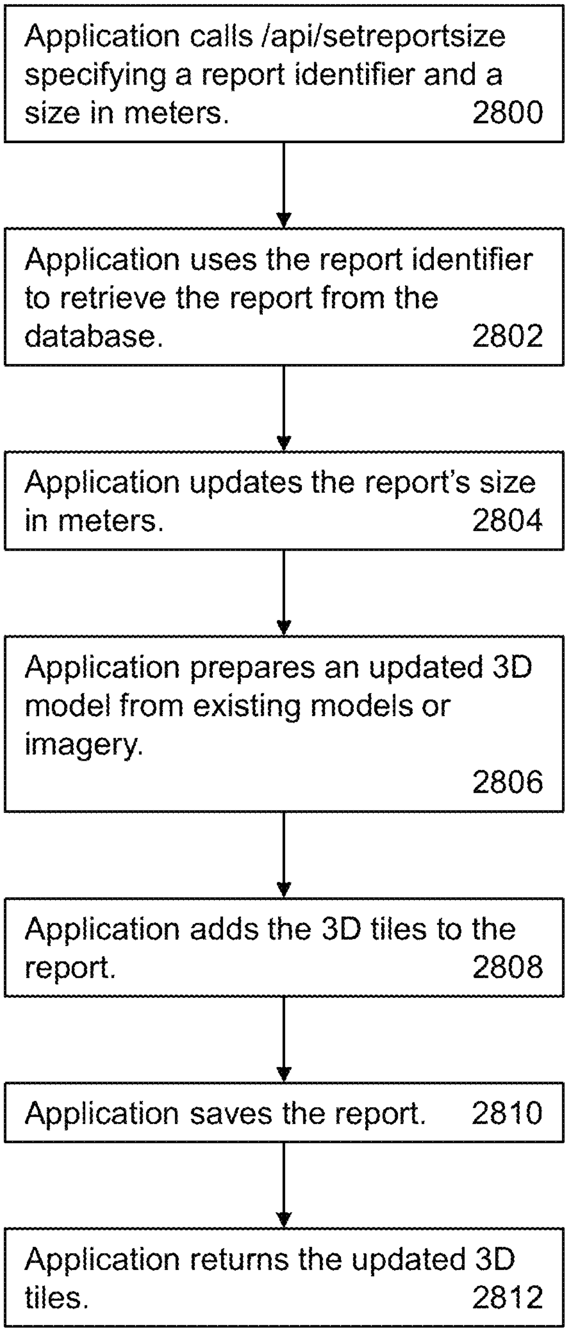
FIG. 28 is a flowchart for setting a report size in an embodiment of the present disclosure.

FIG. 28 is a flowchart for a method of how the application may set the report size. The application may set a default report size (e.g., 25 meters) when recording a new roof report request. The application may interpret this size as a radius. For example, if the report size is 25 meters, the area of interest surrounding the report location may be 50 by 50 meters. If this is too small (i.e., some of the target structure falls outside of this area), the analyst may zoom out and increase the report size (e.g., by pressing "−" as described in FIG. 10). The application may start at step 2800 by calling the /api/setreportsize service 414 specifying a report identifier and a size in meters or other suitable scale. At step 2802, the application may use the report identifier to retrieve the report from the database 106. At step 2804, the application may update the report's size. At step 2806, the application may prepare an updated 3D model from existing models or imagery. At step 2808, the application may add the 3D tiles to the report. At step 2810, the application may save the report in the database 106. At step 2812, the application may return the updated 3D tiles.

Figure 29:
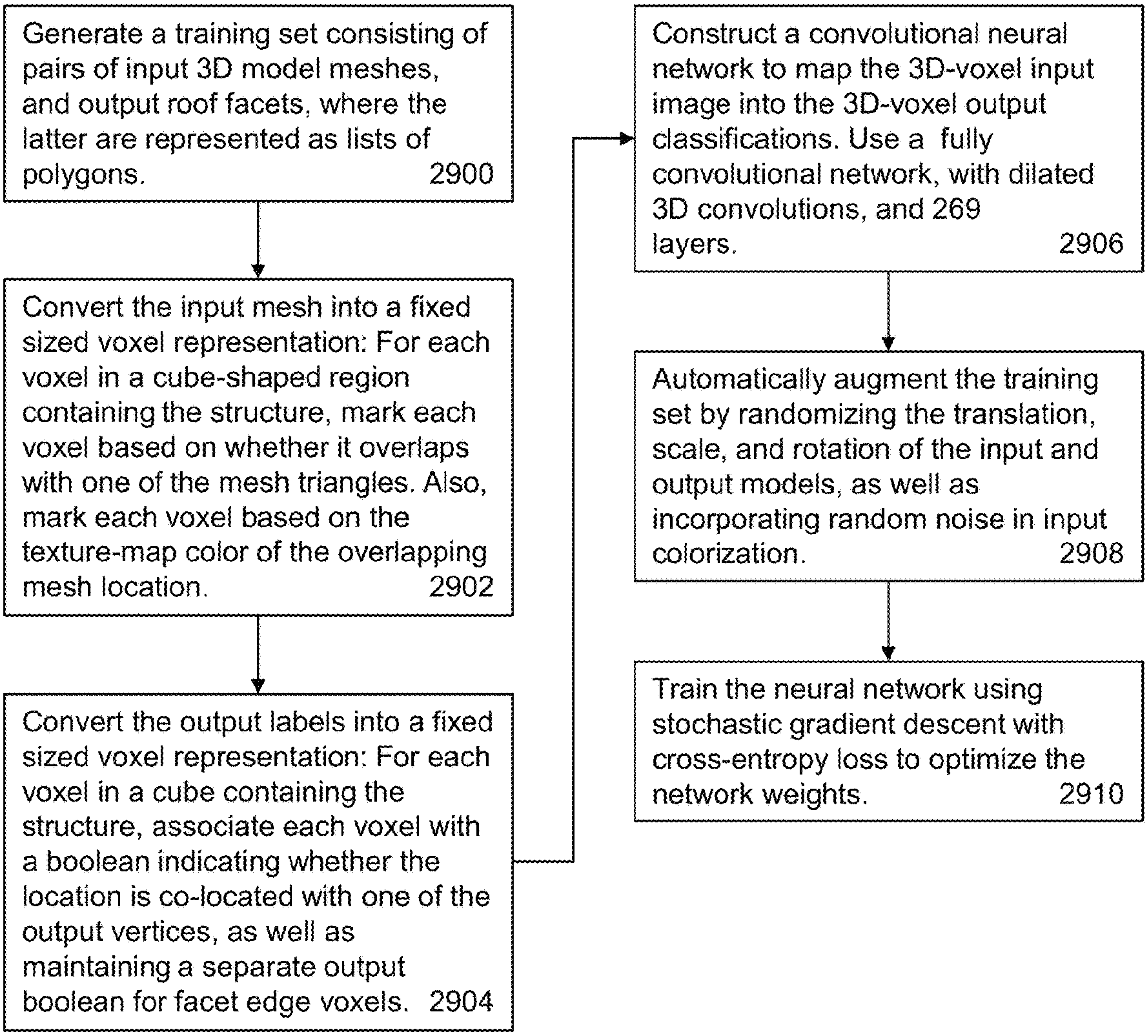
FIG. 29 is a flowchart for training an automatic roof model extractor in an embodiment of the present disclosure.

FIG. 29 is a flowchart for a method of how a user may train a machine learning module to automatically extract roof facets according to an embodiment of the present disclosure. In it, a user may begin at step 2900 by generating a training set consisting of pairs of input 3D model meshes, and output roof facets, where the latter are represented as lists of polygons. At step 2902, the application may convert the input mesh into a fixed sized voxel representation. For each voxel in a cube-shaped region containing the structure, the application may mark each voxel based on whether it overlaps with one of the mesh triangles. Also, the application may mark each voxel based on the texture-map color of the overlapping mesh location. At step 2904, the application may convert the output labels into a fixed sized voxel representation. For each voxel in a cube-shaped region containing the structure, the application may associate each voxel with a boolean indicating whether the location is co-located with one of the output vertices, as well as maintaining a separate output boolean for facet edge voxels. At step 2906, the application may construct a convolutional neural network to map the 3D-voxel input image into the 3D-voxel output classifications. The application may then construct a fully convolutional network, with dilated 3D convolutions, and 269 layers (or another suitable number of layers). This is just one possible network architecture—many others are possible and are contemplated by the present disclosure. At step 2908, the application may automatically augment the training set by randomizing the translation, scale, and/or rotation of the input and output models, as well as incorporating random noise in input colorization. At step 2910, the application may train the neural network using stochastic gradient descent with cross-entropy loss to optimize the network weights.

Figure 30:
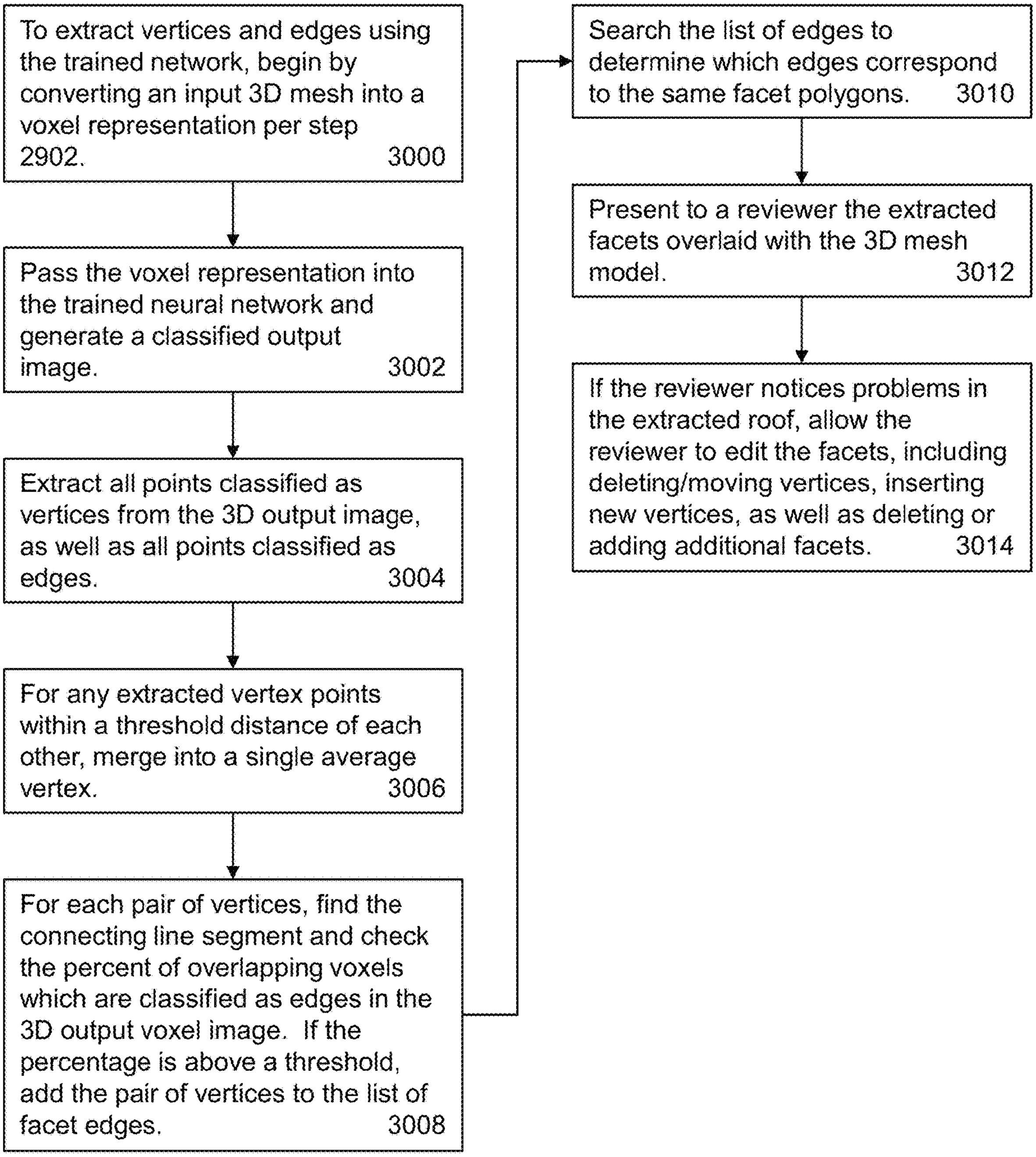
FIG. 30 is a flowchart for using the automatic roof model extractor in an embodiment of the present disclosure.

FIG. 30 is a flowchart for a method of how the application may use the trained machine learning module to automatically extract roof facets. In it, at step 3000, to extract vertices and edges using the trained network, the application may begin by converting an input 3D mesh of a structure into a voxel representation per step 2902. At step 3002, the application may pass the voxel representation into the trained neural network and generate a classified output image. At step 3004, the application may extract all points classified as vertices from the 3D output image, as well as all points classified as edges. At step 3006, for any extracted vertex points within a threshold distance of each other (e.g., 3 feet or other suitable distance), the application may merge them into a single average vertex. At step 3008, for each pair of vertices, the application may find the connecting line segment and check the percent of overlapping voxels which are classified as edges in the 3D output voxel image. If the percentage is above a threshold (e.g., 80% or other suitable percentage), the application may add the pair of vertices to the list of facet edges. At step 3010, the application may search the list of edges to determine which edges correspond to the same facet polygons. At step 3012, the application may present to a reviewer the extracted facets overlaid with the 3D mesh model. At step 3014, if the reviewer notices problems in the extracted roof, the application may allow the reviewer to edit the facets, including, for example but not limited to, deleting/moving vertices, inserting new vertices, as well as deleting or adding additional facets.

Figure 31:
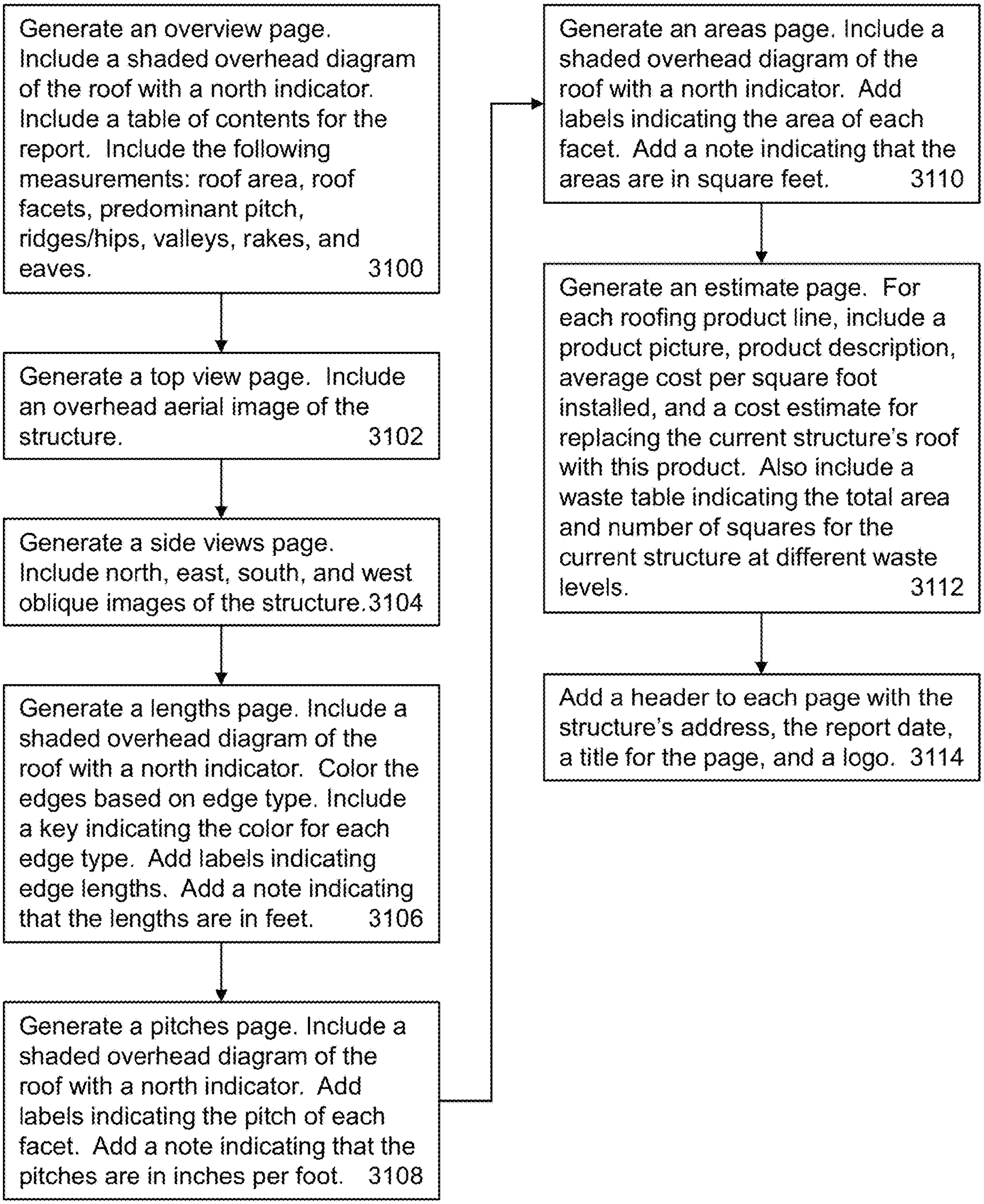
FIG. 31 is a flowchart for generating a roof report in an embodiment of the present disclosure.

Expanding on step 208 of the general overview in FIG. 2, FIG. 31 is a flowchart for a method of how the application may convert a roof model into a roof report suitable for sending to the corresponding requester. In it, the application may begin at step 3100 by generating an overview page. In one embodiment, the application may include a shaded overhead diagram of the roof, optionally with a north indicator or other suitable directional indicator. In one embodiment, the application may include a table of contents for the report. In one embodiment, the application may include one or more of the following measurements: roof area, number of roof facets, predominant pitch, length of ridges/hips, length of valleys, length of rakes, and length of eaves. In one embodiment, at step 3102, the application may generate a top view page. The application may include an overhead aerial image of the structure. In one embodiment, at step 3104, the application may additionally generate a side views page. The application may include one or more of north, east, south, and west oblique images of the structure. In one embodiment, at step 3106, the application may generate a lengths page. The application may include a shaded overhead diagram of the roof, optionally with a north indicator or other suitable directional indicator. In one embodiment, the application may color the edges based on edge type. The application may include a key indicating the color for each edge type. The application may add labels indicating edge lengths. The application may position these labels at the edge's midpoint. In one embodiment, the application may add a note indicating the unit of the lengths.

In one embodiment, at step 3108, the application may generate a pitches page. The application may include a shaded overhead diagram of the roof, optionally with a north indicator or other suitable directional indicator. The application may add labels indicating the pitch of each facet. The application may position these labels within the facets (see "A new algorithm for finding a visual center of a polygon" by Vladimir Agafonkin at see https://blog.mapbox.com/a-new-algorithm-for-finding-a-visual-center-of-a-polygon-7c77e6492fbc). The application may add a note indicating the unit of the pitches, such as inches per foot. In one embodiment, at step 3110, the application may generate an areas page. The application may include a shaded overhead diagram of the roof, optionally with a north indicator or other suitable directional indicator. The application may add labels indicating the area of each facet. The application may add a note indicating the unit of the areas. In one embodiment, at step 3112, the application may generate an estimate page. For each roofing product line, the application may include one or more of a product picture, product description, average cost per square foot installed, and a cost estimate for replacing the current structure's roof with this product. The application may include a waste table indicating the total area and number of squares for the current structure at different waste levels. Roofing contractors often order extra shingles for a job because some shingles are "wasted" by cutting them to fit along an edge, etc. The waste table helps them estimate the number of squares (shingle packages covering 100 square feet) that they will need to order based on standard waste percentages. At step 3114, the application may add a header to each page with one or more of the structure's address, the report date, a title for the page, and a logo.

Figure 32:
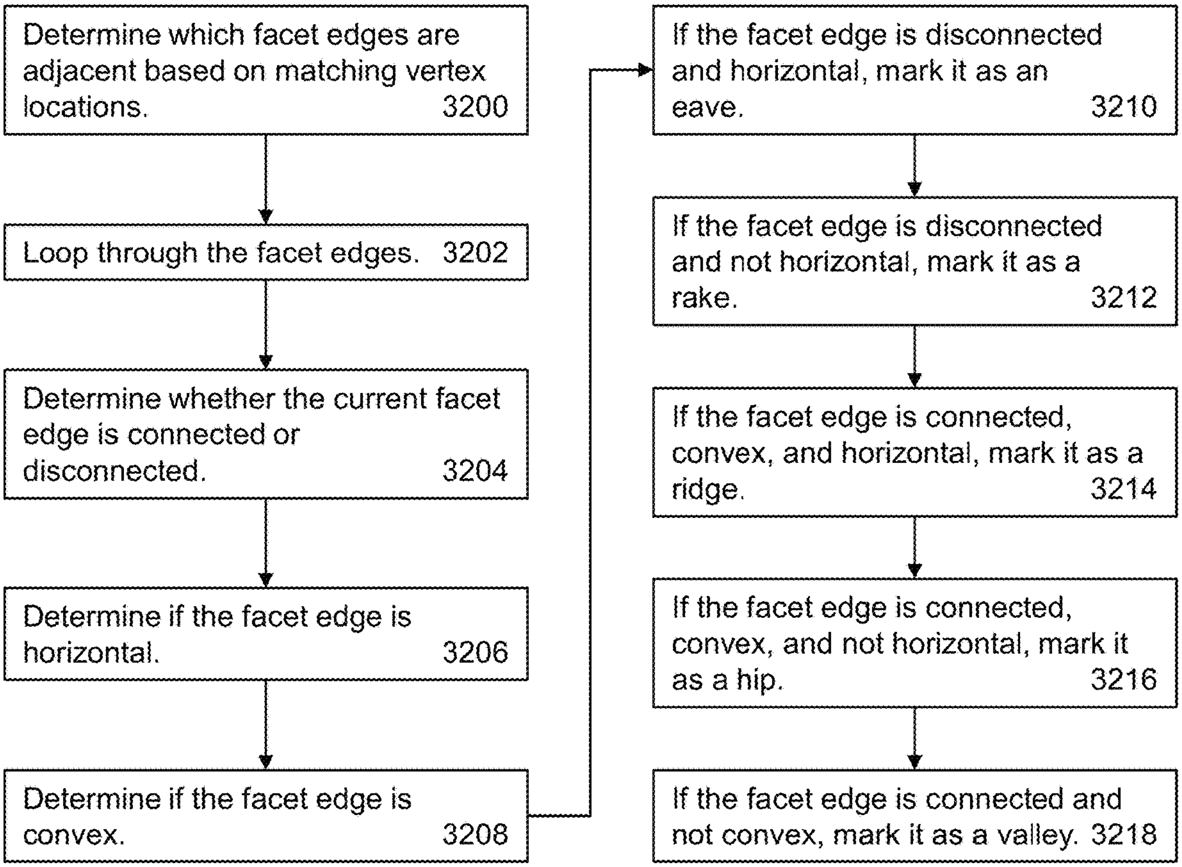
FIG. 32 is a flowchart for determining edge types in an embodiment of the present disclosure.

Expanding on step 3106 of FIG. 31, FIG. 32 is a flowchart for a method of how the application may determine facet edge types. In it, the application may begin at step 3200 by determining which facet edges are adjacent, or connected, based on matching vertex locations. At step 3202, the application may loop through the facet edges. At step 3204, the application may determine whether the current facet edge is connected or disconnected. At step 3206, the application may determine if the facet edge is horizontal relative to the ground (e.g., within a threshold of 3 degrees or other suitable threshold). At step 3208, the application may determine if the facet edge is convex. In one embodiment, at step 3210, if the facet edge is disconnected and horizontal, the application may mark it as an eave. At step 3212, if the facet edge is disconnected and not horizontal, the application may mark it as a rake. At step 3214, if the facet edge is connected, convex, and horizontal, the application may mark it as a ridge. At step 3216, if the facet edge is connected, convex, and not horizontal, the application may mark it as a hip. At step 3218, if the facet edge is connected and not convex, the application may mark it as a valley.

Figure 33:
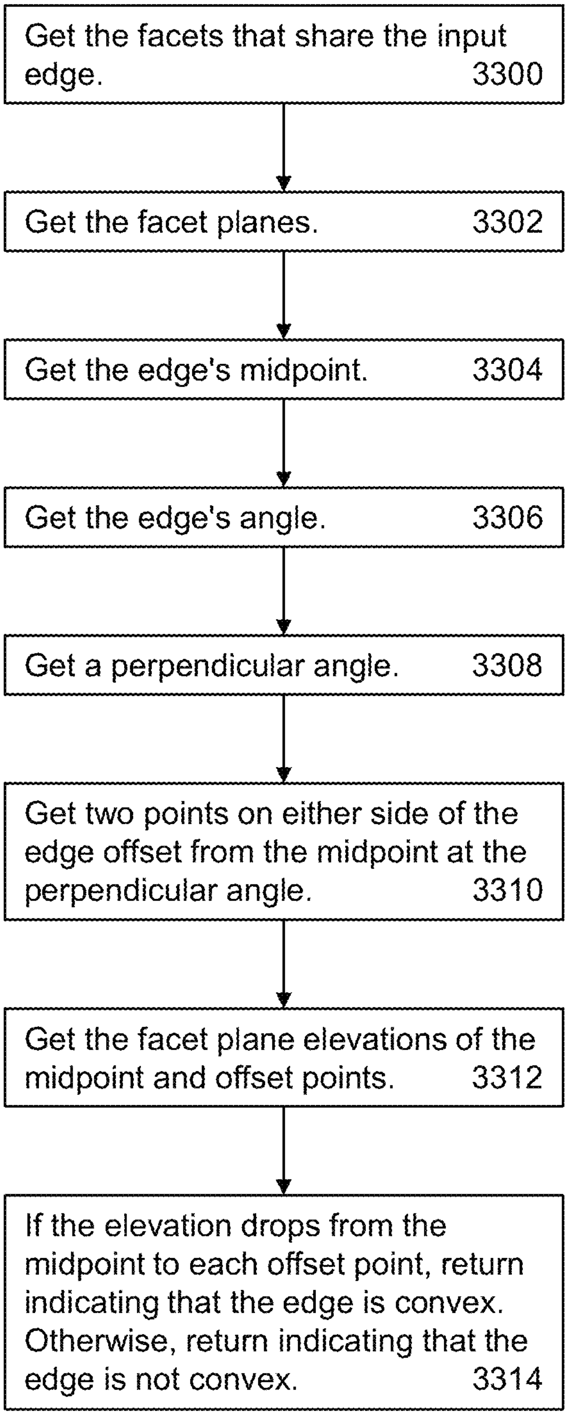
FIG. 33 is a flowchart for determining if an edge is convex in an embodiment of the present disclosure.

FIG. 33 is a flowchart for a method of how the application may determine if a facet edge is convex. In it, the application may start at step 3300 by getting the facets that share an input edge. At step 3302, the application may get the facet planes. At step 3304, the application may get the edge's midpoint. At step 3306, the application may get the edge's angle. At step 3308, the application may get a perpendicular angle (an angle that is perpendicular to the edge when viewed from above). At step 3310, the application may get two points on either side of the edge offset from the midpoint at the perpendicular angle. At step 3312, the application may get the facet plane elevations of the midpoint and offset points. At step 3314, if the elevation drops from the midpoint to each offset point, the application may return indicating that the edge is convex. Otherwise, the application may return indicating that the edge is not convex.

Figure 34:
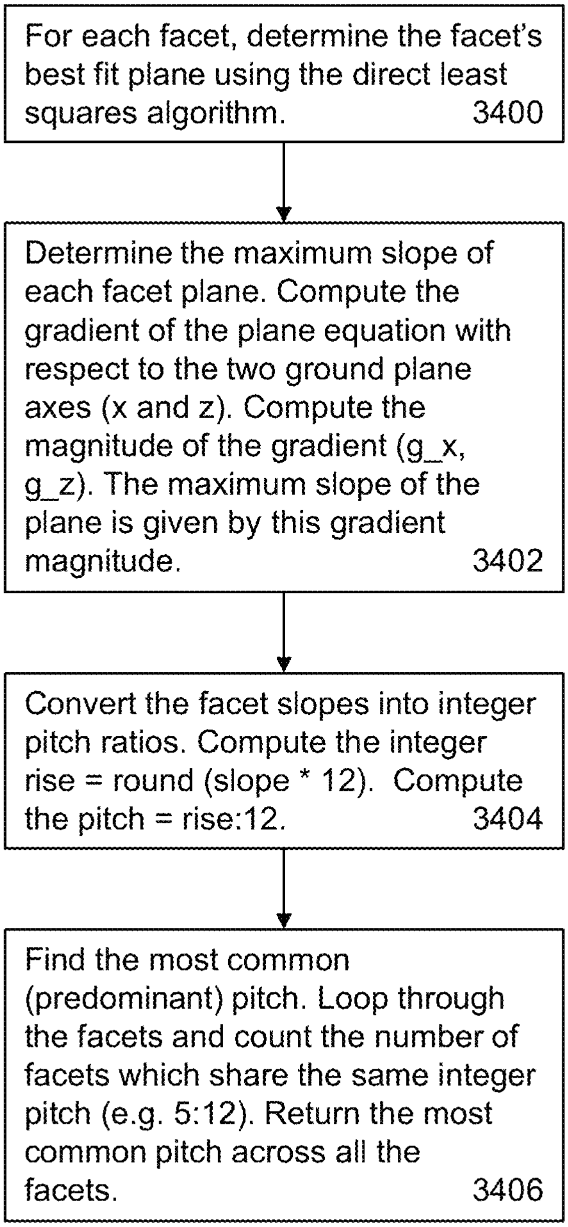
FIG. 34 is a flowchart for determining facet pitches in an embodiment of the present disclosure.

Expanding on step 3108 of FIG. 31, FIG. 34 is a flowchart for a method of how the application may determine facet pitches. In it, for each facet, the application may start at step 3400 by determining the facet's best fit plane using the direct least squares algorithm. As previously described, at step 3402, the application may determine the maximum slope of each facet plane. The application may compute the gradient of the plane equation with respect to the two ground plane axes (x and z). The application may then compute the magnitude of the gradient (g_x, g_z). The maximum slope of the plane is given by this gradient magnitude. At step 3404, the application may convert the facet slopes into integer pitch ratios. For example, the application may compute the integer rise using the equation rise=round (slope*12). The application may compute the pitch using the equation pitch=rise:12. At step 3406, the application may also find the most common (e.g., predominant) pitch. The application may loop through the facets and count the number of facets which share the same integer pitch (e.g., 5:12). The application may then return the most common pitch across all the facets.

Figure 35:
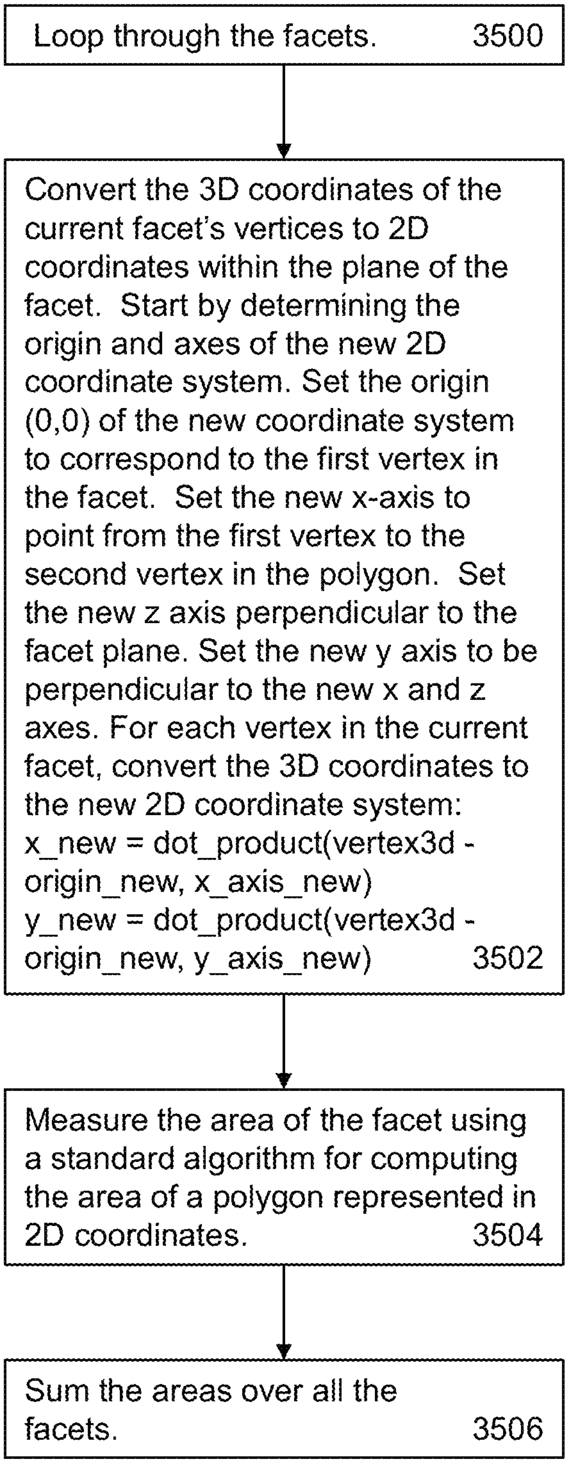
FIG. 35 is a flowchart for determining facet areas in an embodiment of the present disclosure.

Expanding on step 3110 of FIG. 31, FIG. 35 is a flowchart for a method of how the application may measure roof facet areas. In it, the application may begin at step 3500 by looping through the roof facets. At step 3502, the application may convert the 3D coordinates of the current facet's vertices to 2D coordinates within the plane of the facet. The application may start by determining the origin and axes of the new 2D coordinate system. In one embodiment, the application may set the origin (0,0) of the new coordinate system to correspond to the first vertex in the facet. The application may set the new x axis to point from the first vertex to the second vertex in the polygon. The application set the new z axis perpendicular to the facet plane. The application may set the new y axis to be perpendicular to the new x and z axes. For each vertex in the current facet, the application may convert the 3D coordinates to the new 2D coordinate system using the following equations:

$$x\_new=dot\_product(vertex3d-origin\_new,x\_axis\_new)$$

$$y\_new=dot\_product(vertex3d-origin\_new,y\_axis\_new)$$

At step 3504, the application may measure the area of the facet, using a standard algorithm for computing the area of a polygon represented in 2D coordinates (see "How do I calculate the area of a 2d polygon?" at https://stackoverflow.com/questions/451426/how-do-i-calculate-the-area-of-a-2d-polygon). At step 3506, the application may also sum the areas over all the facets.

Figure 36:
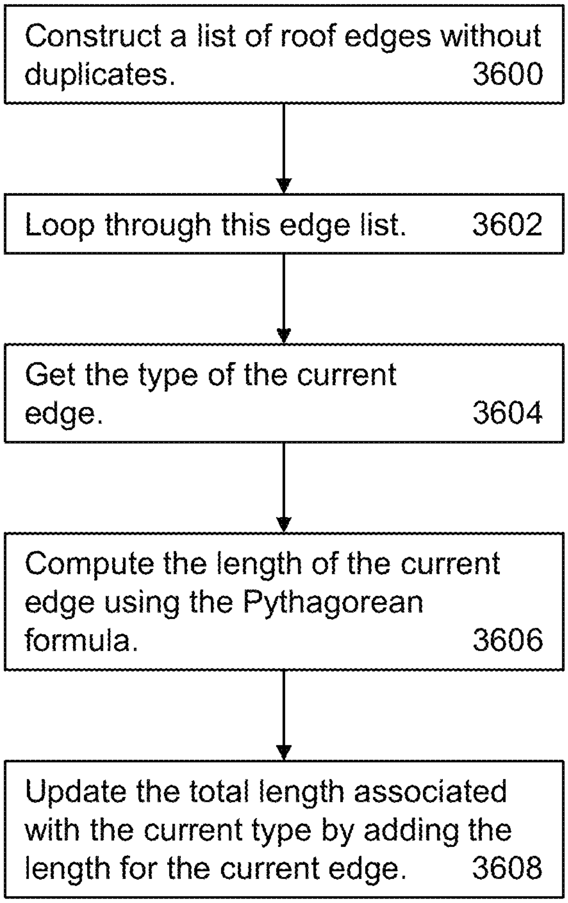
FIG. 36 is a flowchart for determining edge lengths in an embodiment of the present disclosure.

Also expanding on step 3106 of FIG. 31, FIG. 36 is a flowchart for a method of how the application may determine roof facet edge lengths. In it, the application may begin at step 3600 by constructing a list of roof edges, without duplicates. At step 3602, the application may begin looping through this edge list. At step 3604, the application may get the type of the current edge as described above. In one embodiment, at step 3606, the application may compute the length of the current edge using the Pythagorean formula. At step 3608, the application may also update the total length associated with the current type of edge by adding the length for the current edge.

Figure 37:
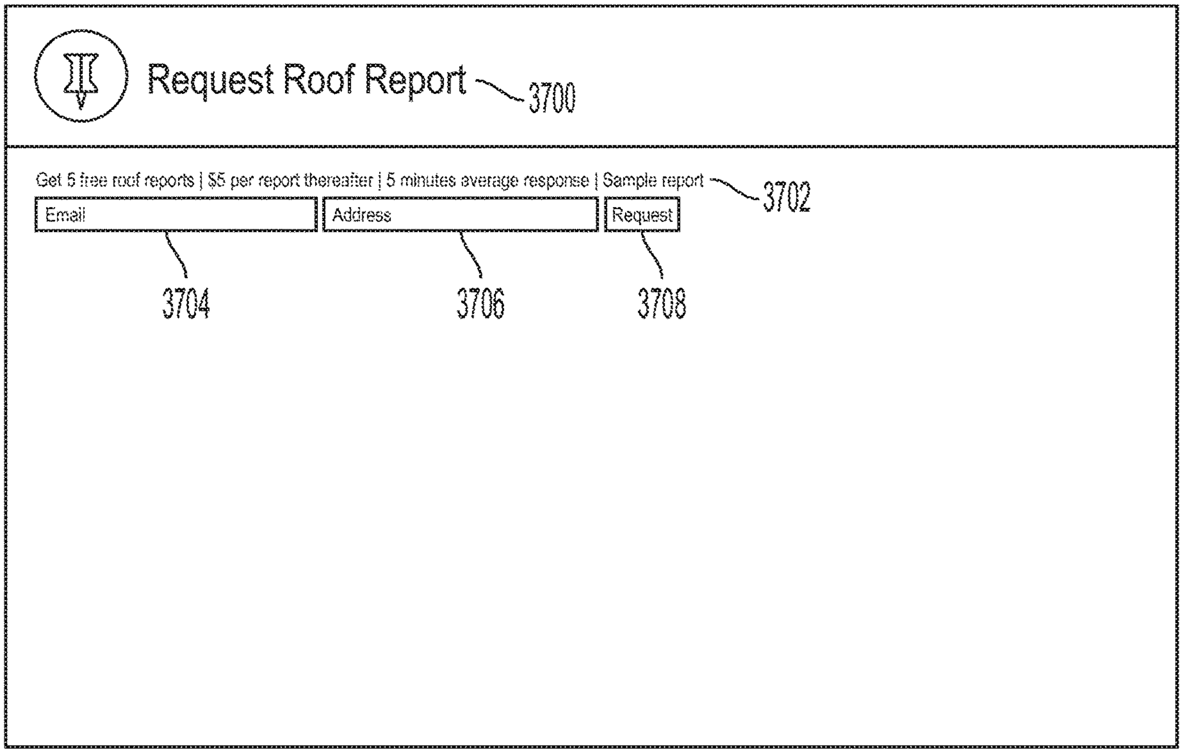
FIG. 37 is a screenshot of a page for requesting a roof report in an embodiment of the present disclosure.
Figure 38:
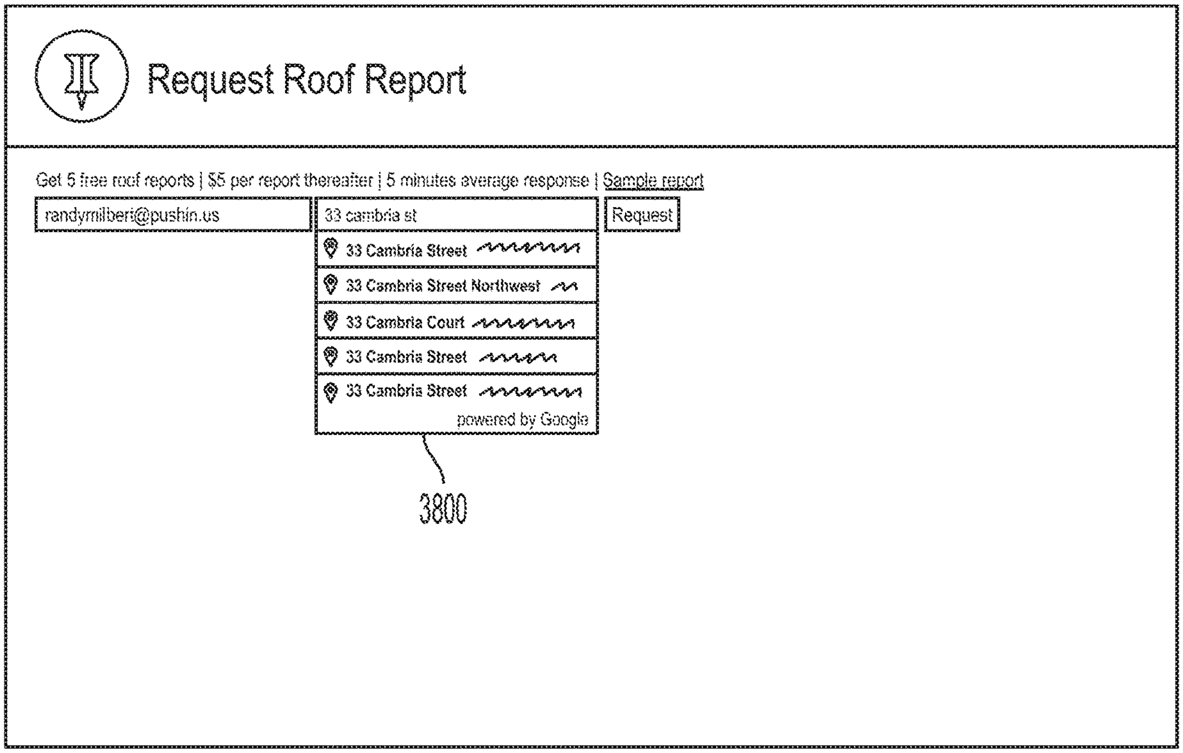
FIG. 38 is a screenshot of a dialog for selecting an address in an embodiment of the present disclosure.
Figure 39:
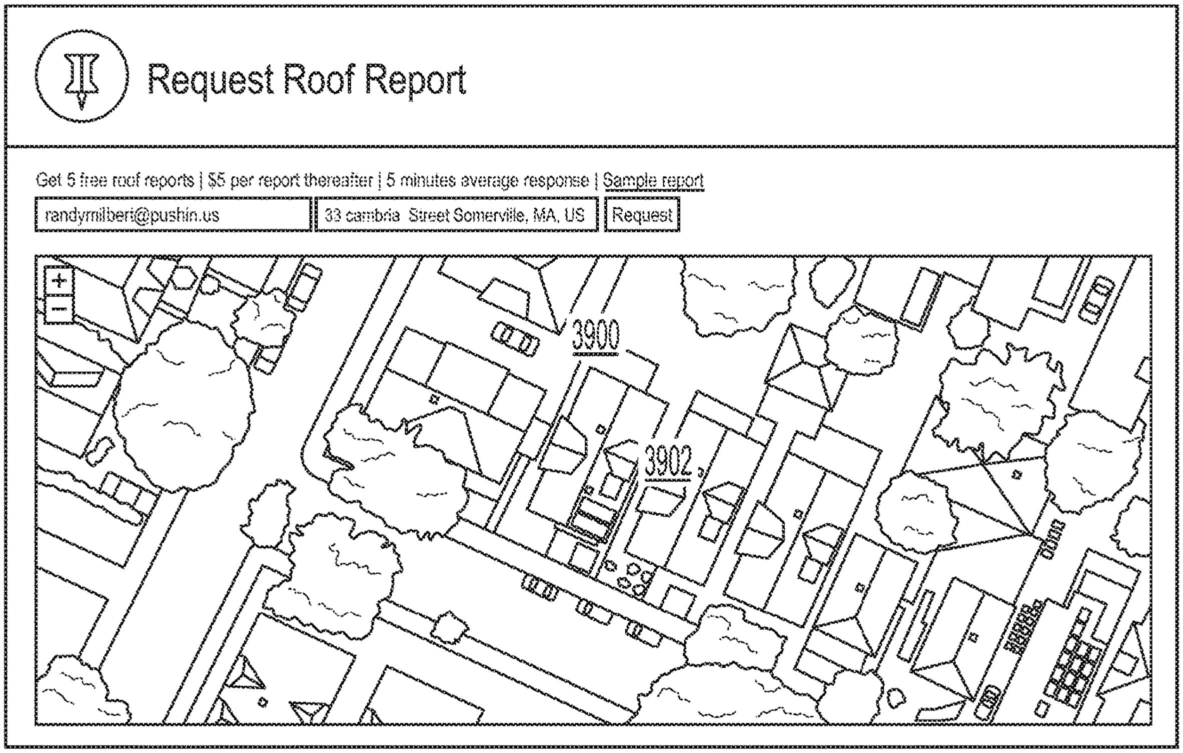
FIG. 39 is a screenshot of a page for confirming a location in an embodiment of the present disclosure.

FIG. 37 is a screenshot of an example interface for requesting a roof report. The interface may include a title 3700. The interface may include details 3702 including one or more of pricing, average response time, and a link to a sample report. FIG. 38 is a screenshot of an example interface for selecting an address. Once the user begins typing an address in the textbox 3706, the application may populate and provide a list of potentially matching addresses 3800. The user may click one of these addresses to select it. FIG. 39 is a screenshot of an example interface for confirming a location. After the user selects an address, the interface may display a map 3900, optionally with a marker 3902 at the selected location. The user may drag the marker 3902 to place it on the desired structure. The interface may include an email textbox 3704 and an address textbox 3706. The interface may include a request button 3708 for requesting a roof report based on the inputted data.

Figure 40:
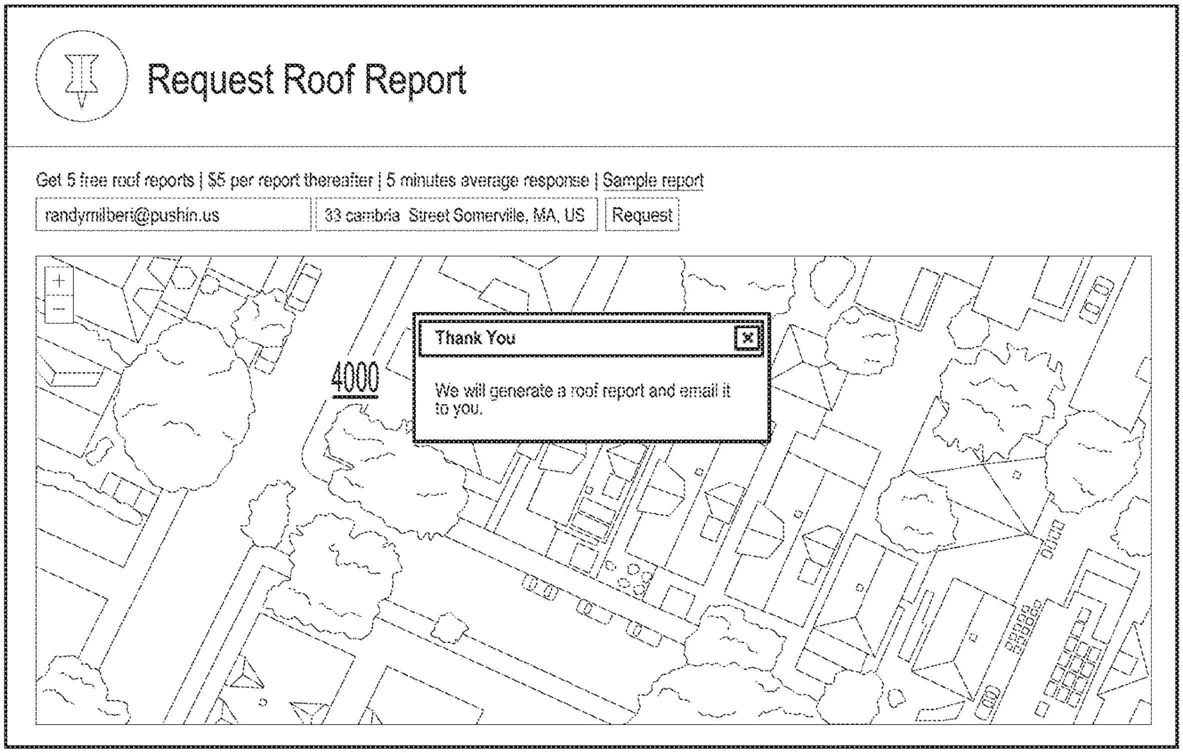
FIG. 40 is a screenshot of a dialog for confirming a roof report request in an embodiment of the present disclosure.

FIG. 40 is a screenshot of an example interface for confirming a request. After the user clicks the request button 3708, the interface may display a request confirmation 4000 indicating that the application will generate a roof report and email it or otherwise provide it to the user.

Figure 41:
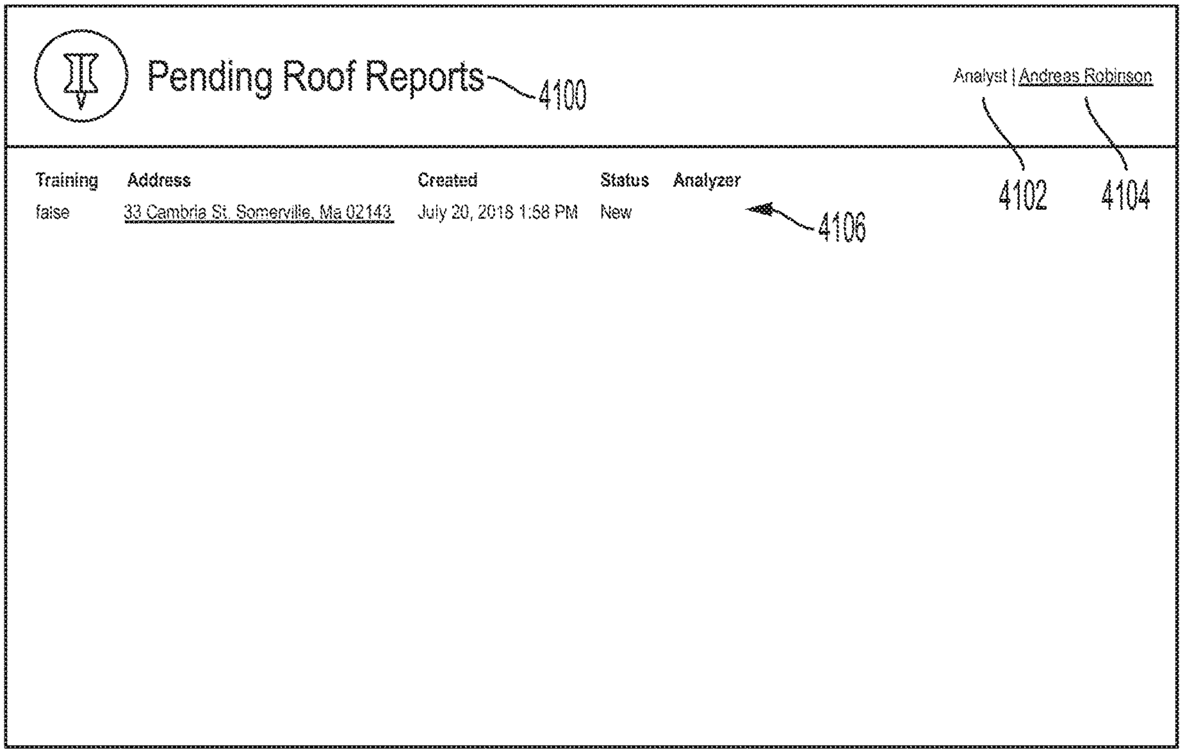
FIG. 41 is a screenshot of a page for listing pending reports for an analyst in an embodiment of the present disclosure.

FIG. 41 is a screenshot of an example interface for listing pending reports for an analyst. The interface may include a title 4100. The interface may indicate the user level 4102 and provide a logout link 4104. The interface may also include a pending report table 4106 with one or more of training, address, created, status, and analyst columns.

Figure 42:
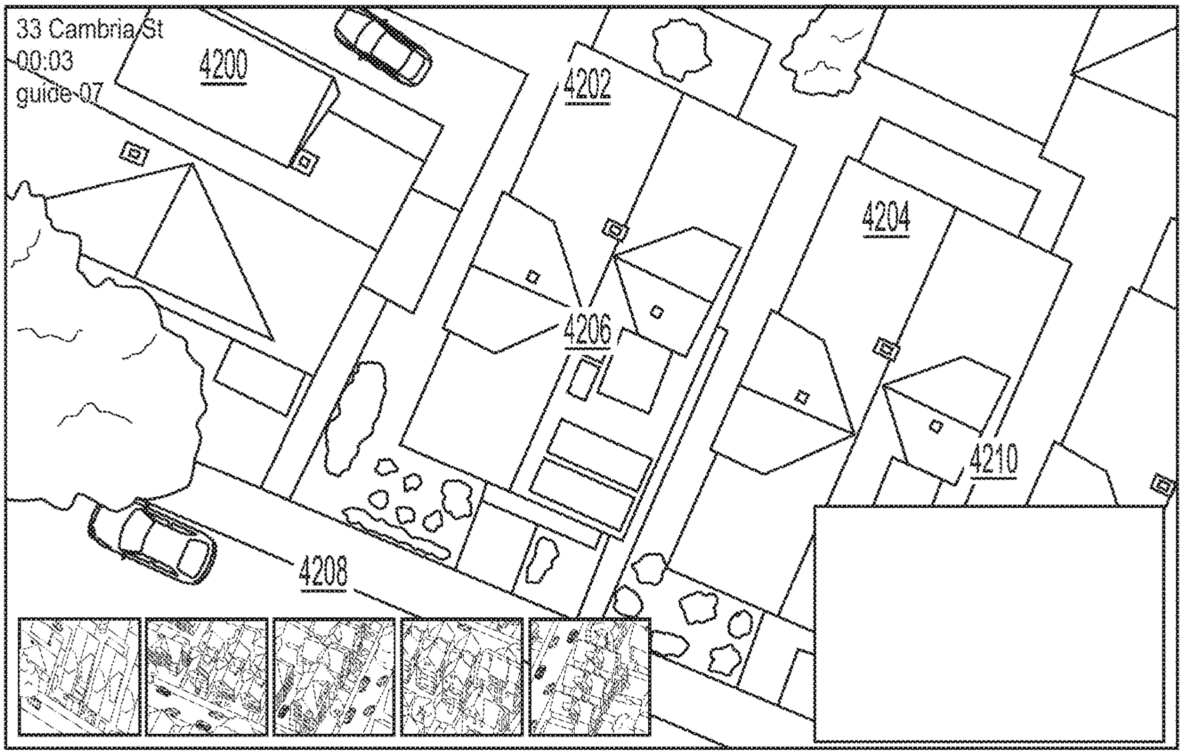
FIG. 42 is a screenshot of a page for generating a roof model in an embodiment of the present disclosure.

FIG. 42 is a screenshot of an example interface for generating a roof model. The interface may include one or more of details 4200 such as the structure's address, a timer, the active tool, and the guide angle. The interface may also display a 3D model 4202. The interface may also include a guide 4204. The interface may include a marker 4206 at the location specified by the requester. The interface may include thumbnails 4208 of additional related images, such as but not limited to, vertical and oblique images covering the structure. The interface may include an overhead view 4210 of the roof model (see FIG. 44).

Figure 43:
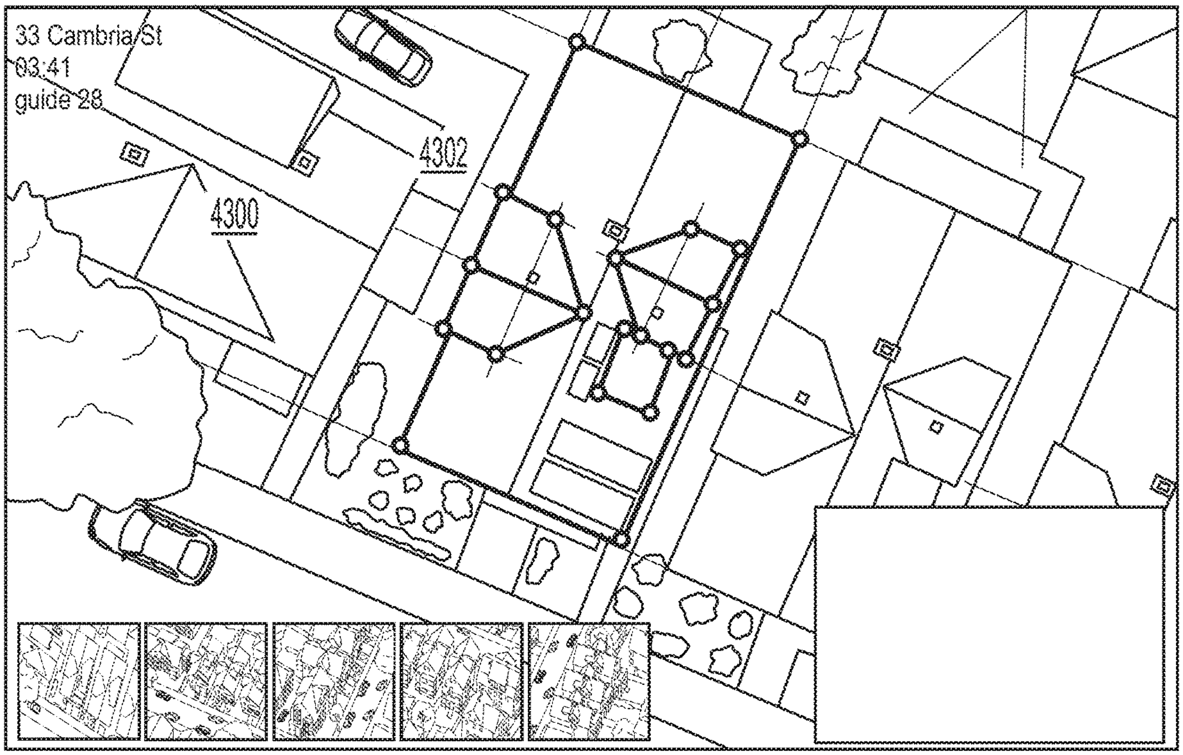
FIG. 43 is a screenshot of a page where is a user is drawing guides in an embodiment of the present disclosure.

FIG. 43 is a screenshot of an example roof model interface where an analyst is drawing guides. The interface may include multiple guide lines 4300 and guide intersections 4302.

Figure 44:
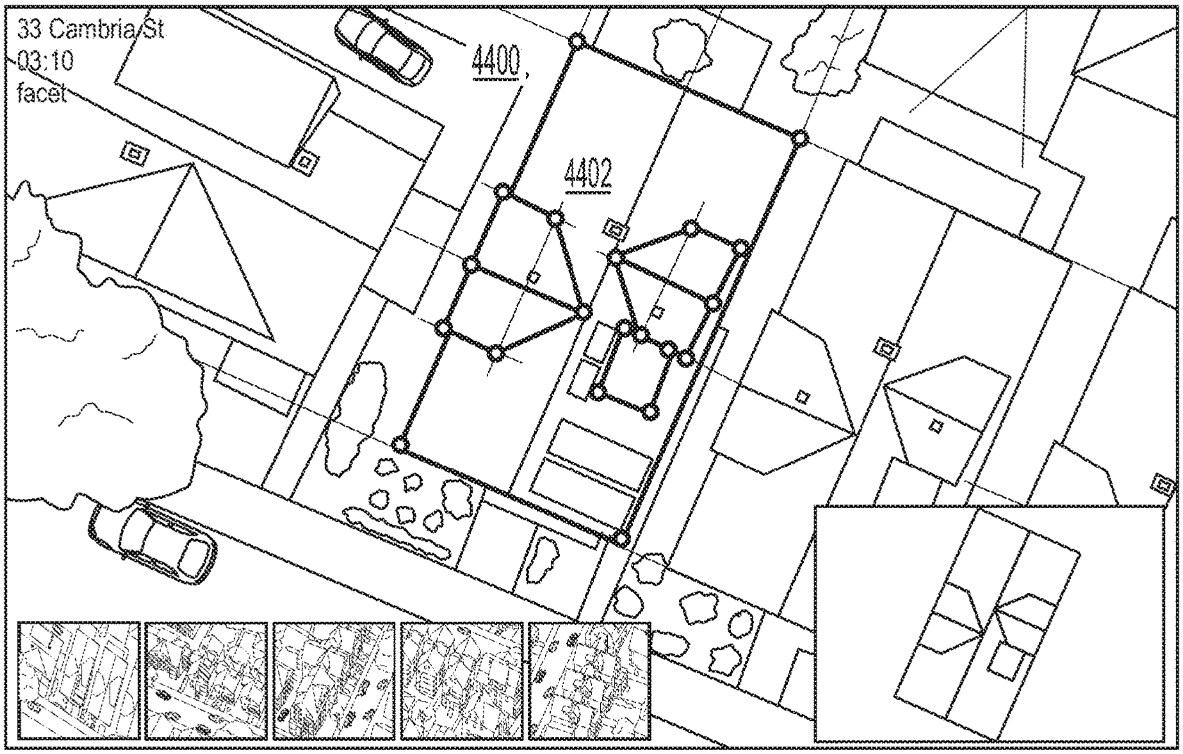
FIG. 44 is a screenshot of a page where a user is outlining facets in an embodiment of the present disclosure.

FIG. 44 is a screenshot of an example roof model interface where an analyst is outlining facets. The interface can include multiple roof facets with edges 4400 and vertices 4402. The interface may color vertices at right-angle corners (as viewed from above) green or other suitable color and color other vertices red or other suitable color.

Figure 45:
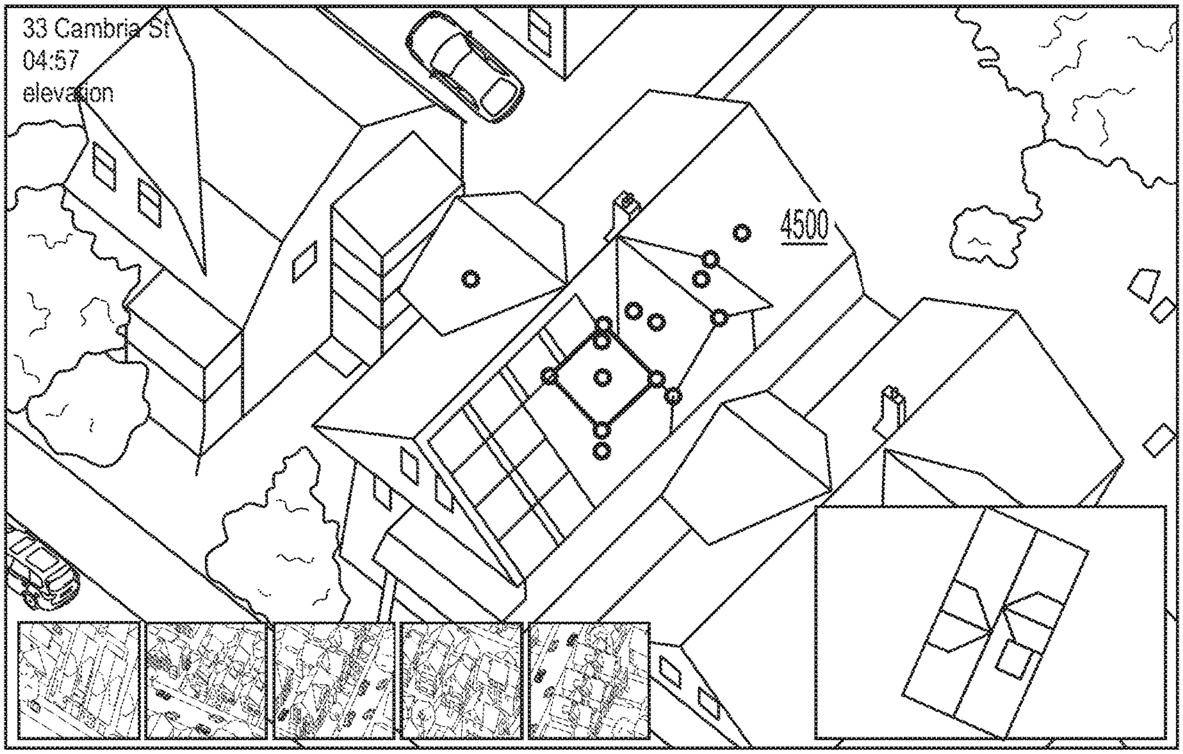
FIG. 45 is a screenshot of a page where a user is adjusting elevations in an embodiment of the present disclosure.

FIG. 45 is a screenshot of an example roof model interface where an analyst is adjusting facet vertex elevations. The interface may color edges based on edge type and display facet centroids 4500. The interface may color centroids green or other suitable color when the facet is close to planar and red or other suitable color when it is not.

Figure 46:
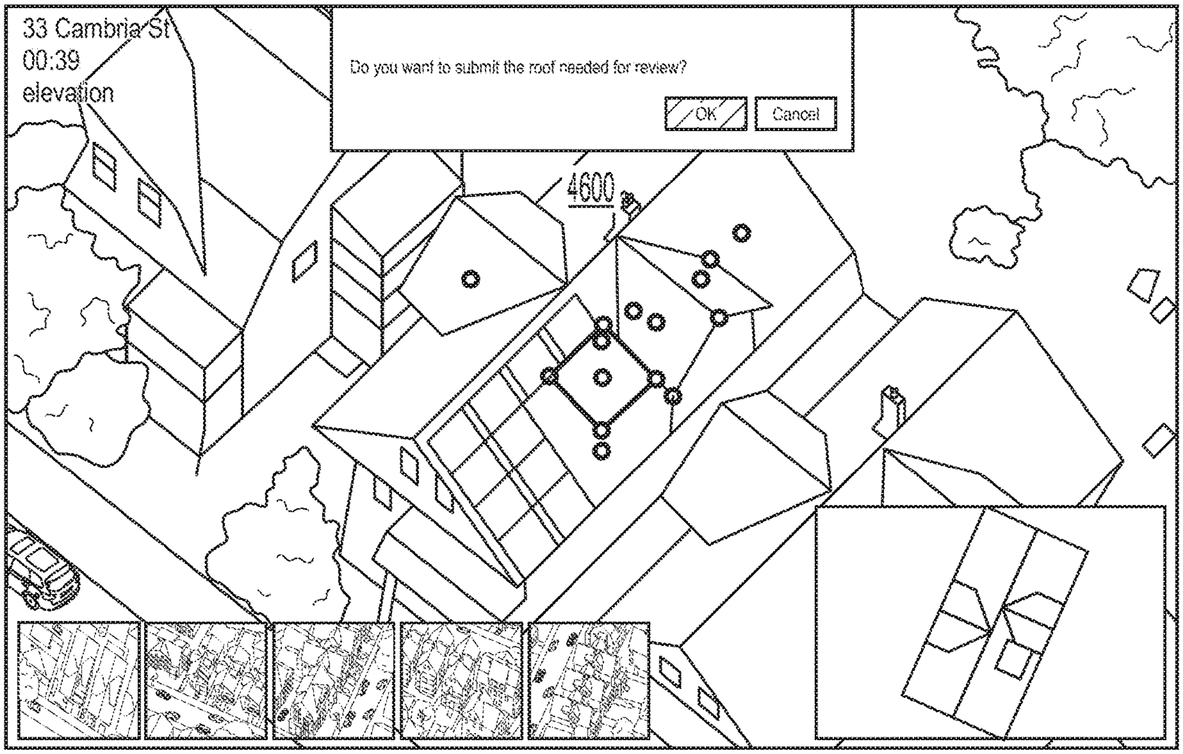
FIG. 46 is a screenshot of a page where a user is submitting a roof model for review in an embodiment of the present disclosure.

FIG. 46 is a screenshot of an example roof model interface where an analyst is submitting the roof model for review. The interface may present a confirmation dialog 4600 to verify the submission.

Figure 47:
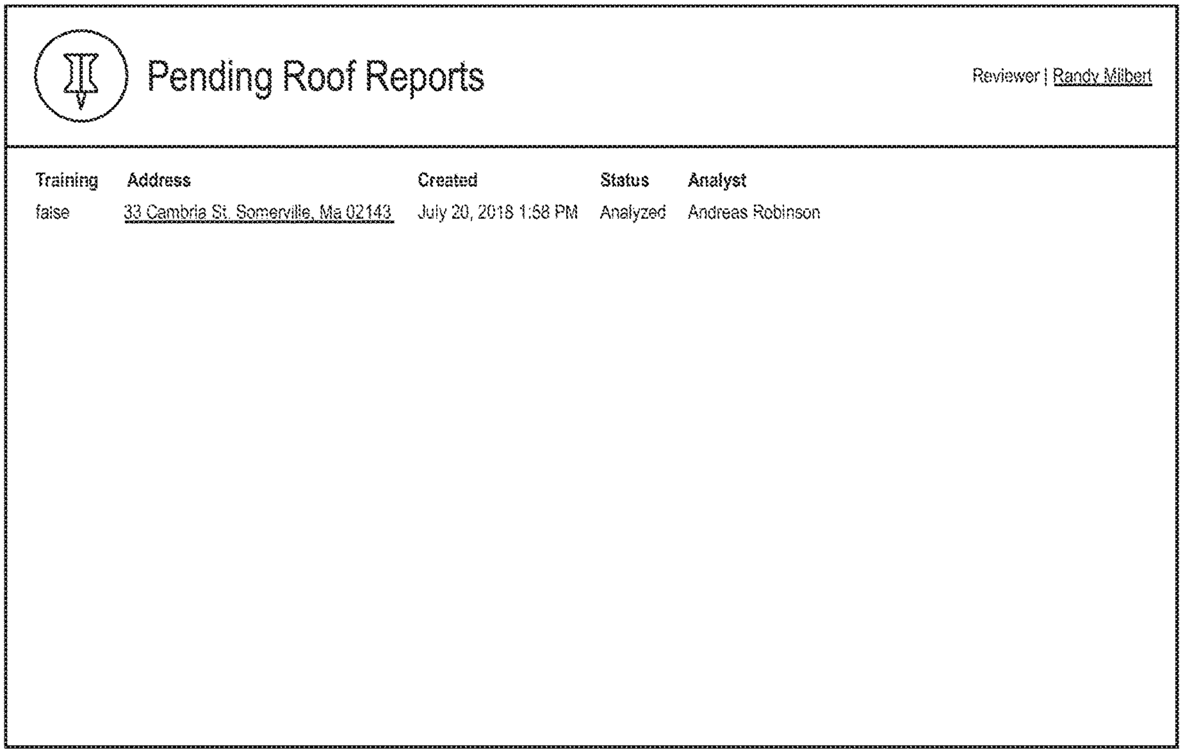
FIG. 47 is a screenshot of a page for listing pending reports for a reviewer in an embodiment of the present disclosure.

FIG. 47 is a screenshot of an example interface for listing pending reports for a reviewer. This interface may generally be identical to FIG. 41 except that the interface presents reports pending review because the user is a reviewer.

Figure 48:
FIG. 48 is a screenshot of a page for reviewing a roof model in an embodiment of the present disclosure.

FIG. 48 is a screenshot of an example roof model interface where a reviewer is inspecting a roof model. The interface may enable a reviewer to inspect one or more of the guides, facets, edge types, centroids, or any other part of the model and then press a button or use another form of submission to pass or fail the model.

Figure 49:
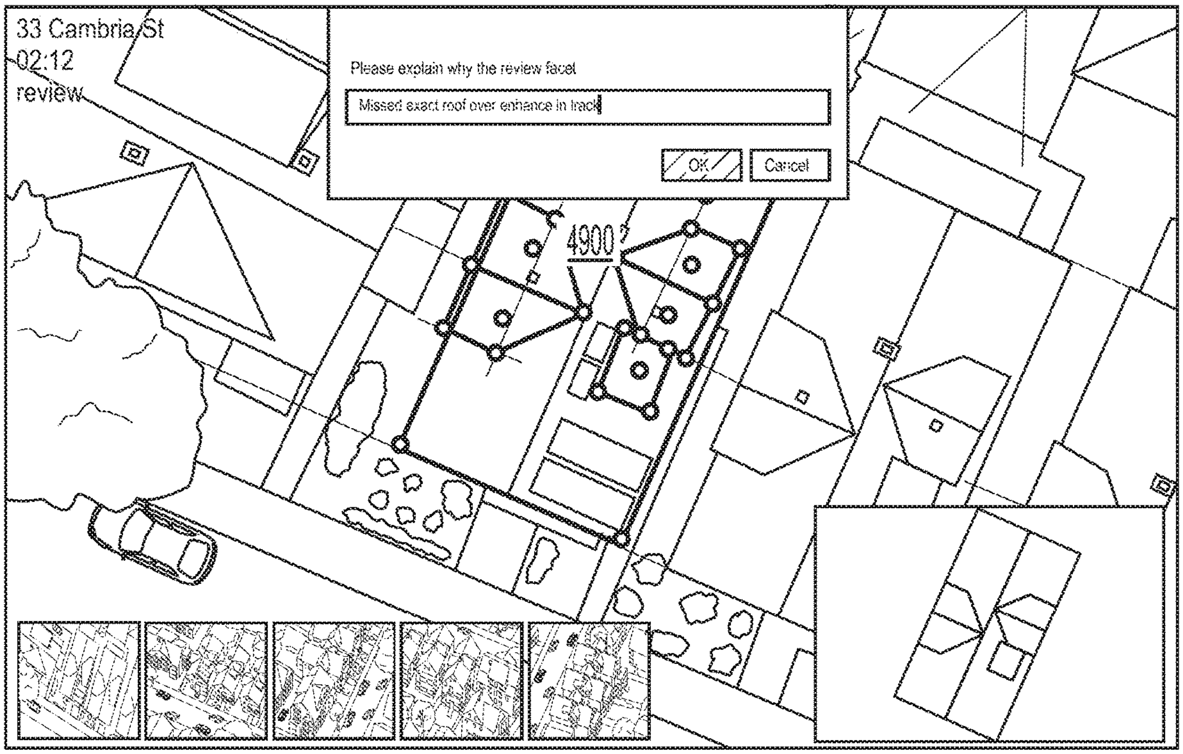
FIG. 49 is a screenshot of a dialog for entering a comment during a review in an embodiment of the present disclosure.

FIG. 49 is a screenshot of an example roof model interface where a reviewer has failed a roof model. The interface may present a comment dialog 4900 so the reviewer can input and provide feedback to the analyst.

Figure 50:
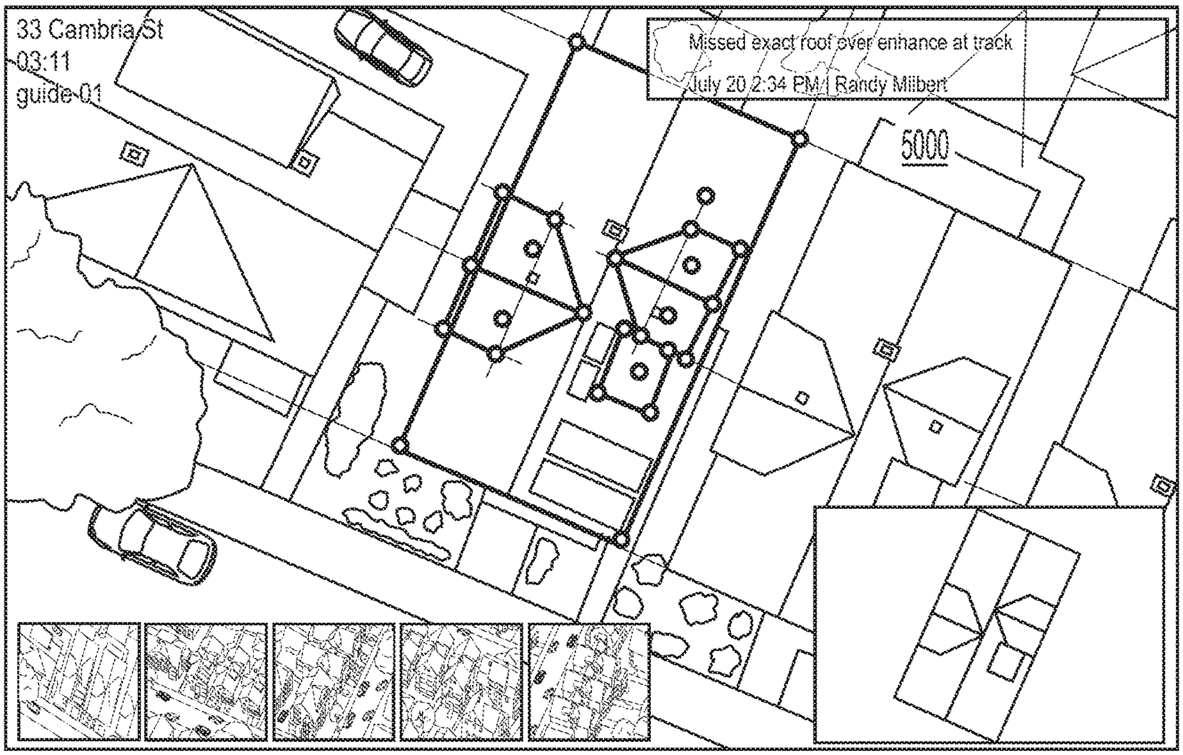
FIG. 50 is a screenshot of a page where a user is correcting a roof model based on a reviewer's comment in an embodiment of the present disclosure.

FIG. 50 is a screenshot of an example roof model interface when an analyst is updating a roof model based on a reviewer's comments. The interface may include a box 5000 showing reviewer comments.

Figure 51:
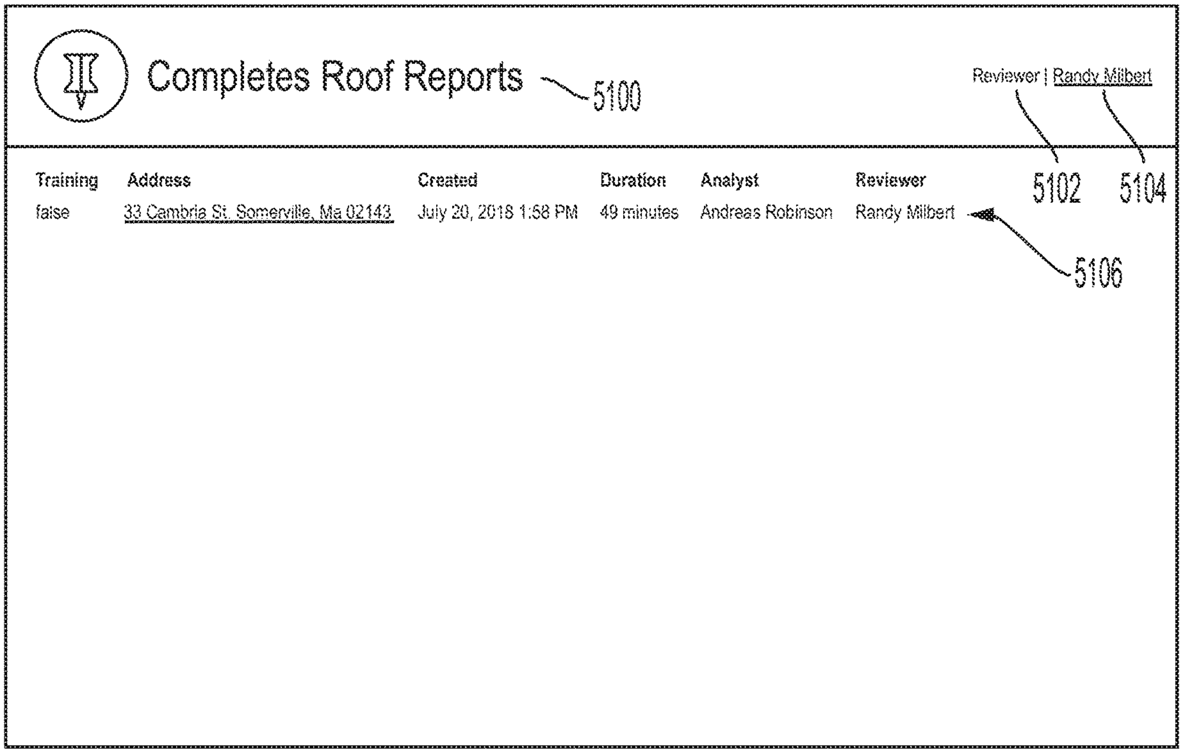
FIG. 51 is a screenshot of a page for listing completed reports in an embodiment of the present disclosure.

FIG. 51, is a screenshot of an example interface for listing completed reports. The interface may include a title 5100. The interface may indicate the user level 5102 and provide a logout link 5104. The interface may also include a completed report table 5106 with one or more of training, address, created, duration, analyst, and reviewer columns.

Figure 52:
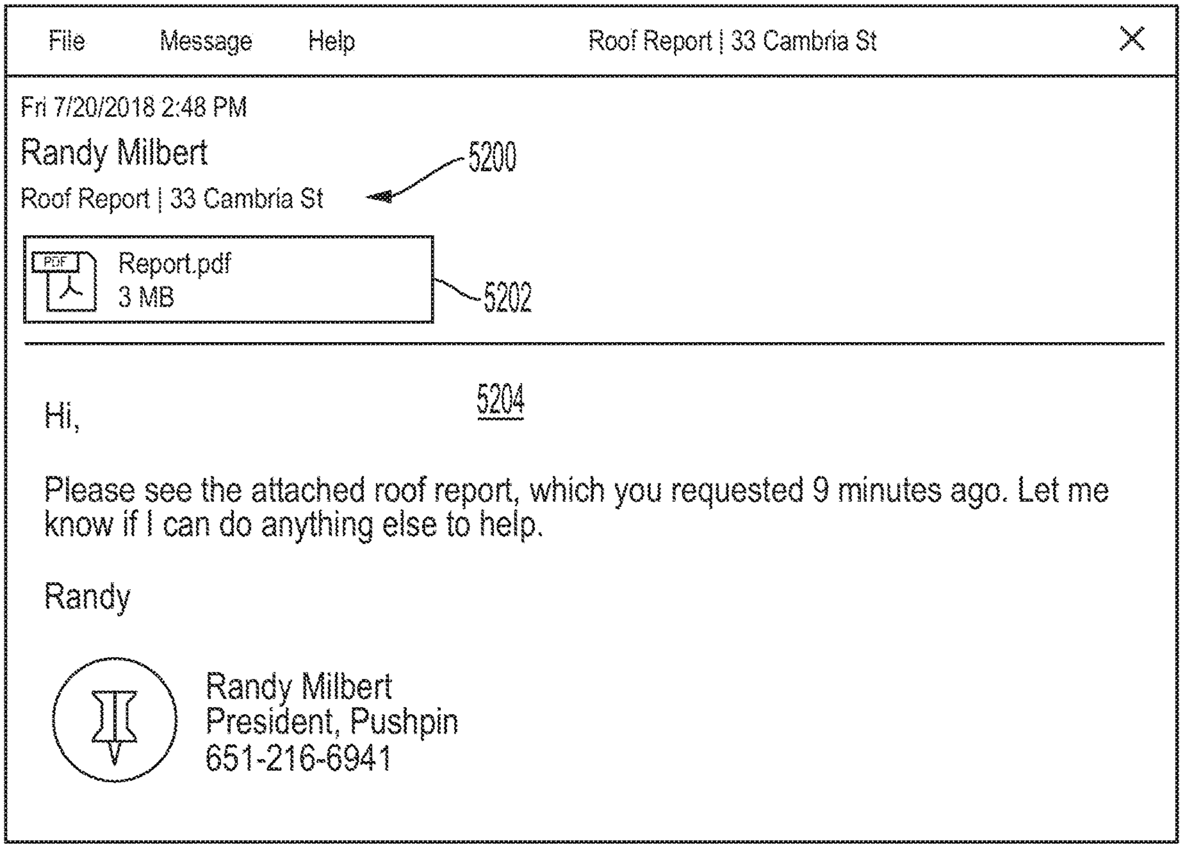
FIG. 52 is a screenshot of an email containing a roof report in an embodiment of the present disclosure.

FIG. 52 is a screenshot of an example email message, or more generally a communication, that the application may send after generating a roof report. The message may include one or more of a subject 5200, roof report attachment 5202, and a body 5204.

Figure 53:
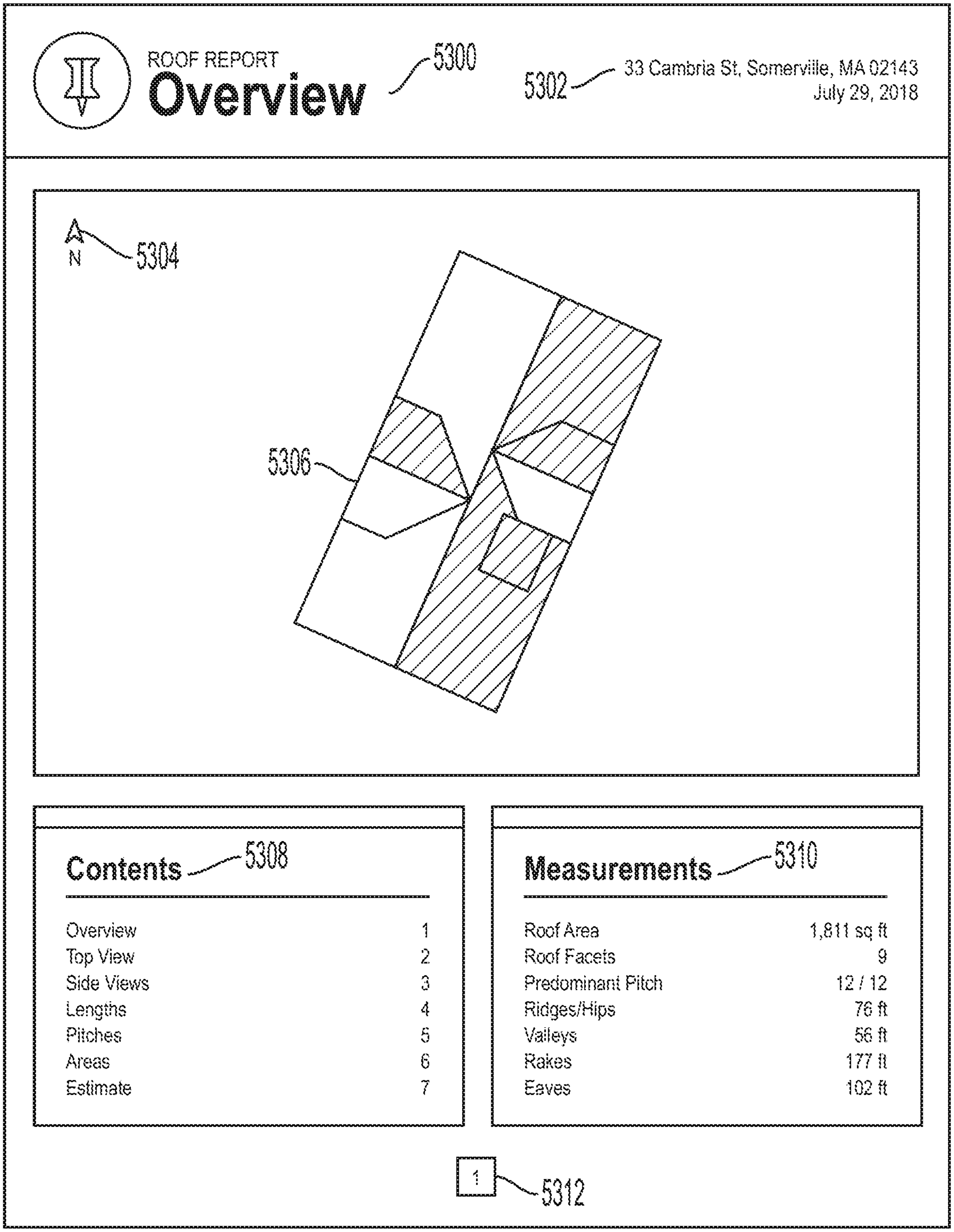
FIG. 53 is a screenshot of a roof report's overview page in an embodiment of the present disclosure.

FIG. 53 is a screenshot of an example roof report's overview page of a roof report. The page may include a title 5300 and an address and date 5302. The page may include a north indicator or other suitable directional indicator 5304. The page may include an overhead view 5306 of the extracted roof model. The page may include a table of contents 5308. The page may include measurements 5310. These measurements 5310 may include one or more of total roof area, number of roof facets, predominant pitch, length of ridges/hips, length of valleys, length of rakes, and length of eaves. The page may also include a page number 5312.

Figure 54:
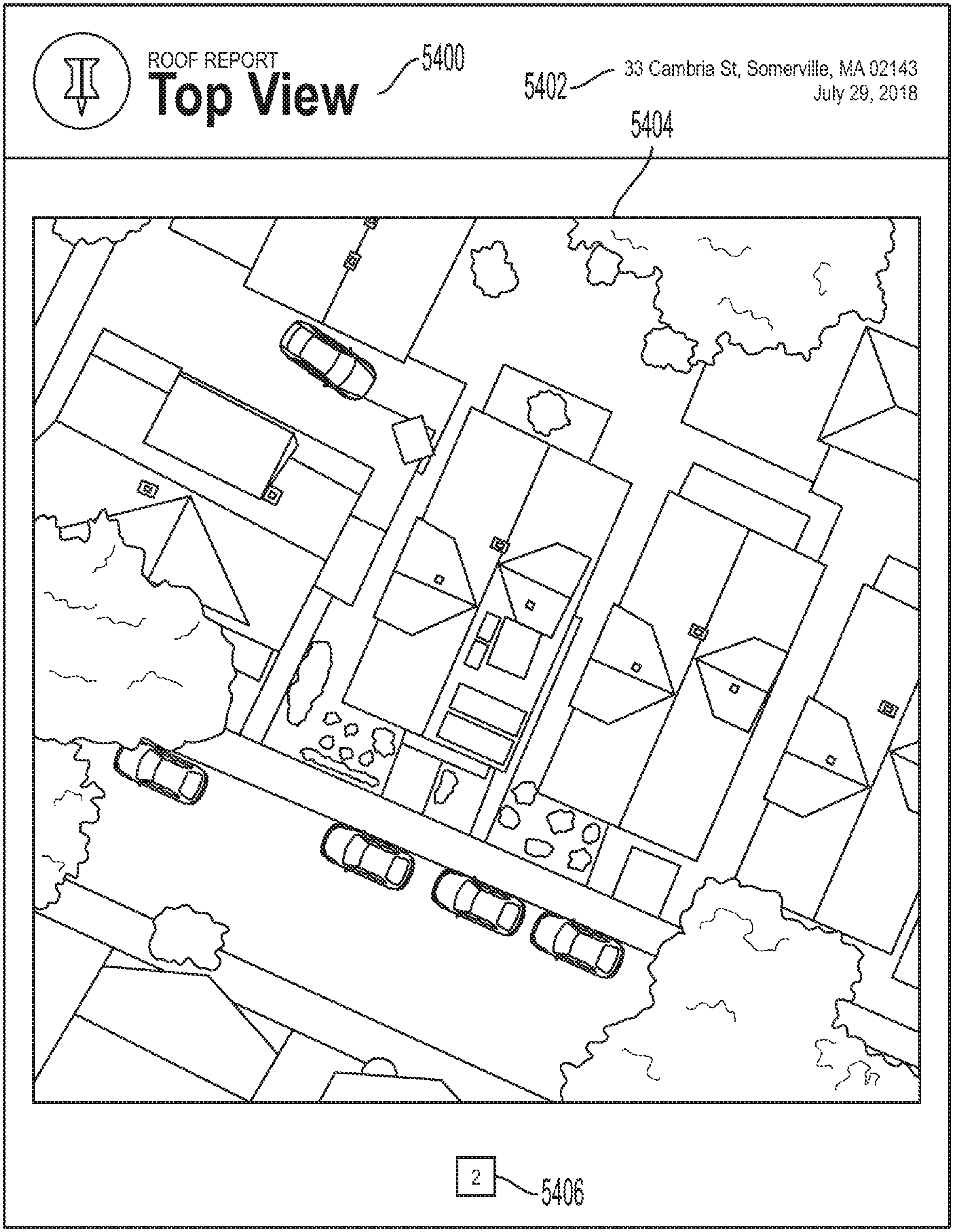
FIG. 54 is a screenshot of a roof report's top view page in an embodiment of the present disclosure.

FIG. 54 is a screenshot of an example roof report's top view page. The page may include a title 5400 and an address and date 5402. The page may include an overhead image 5404 of the structure. The page may also include a page number 5406.

Figure 55:
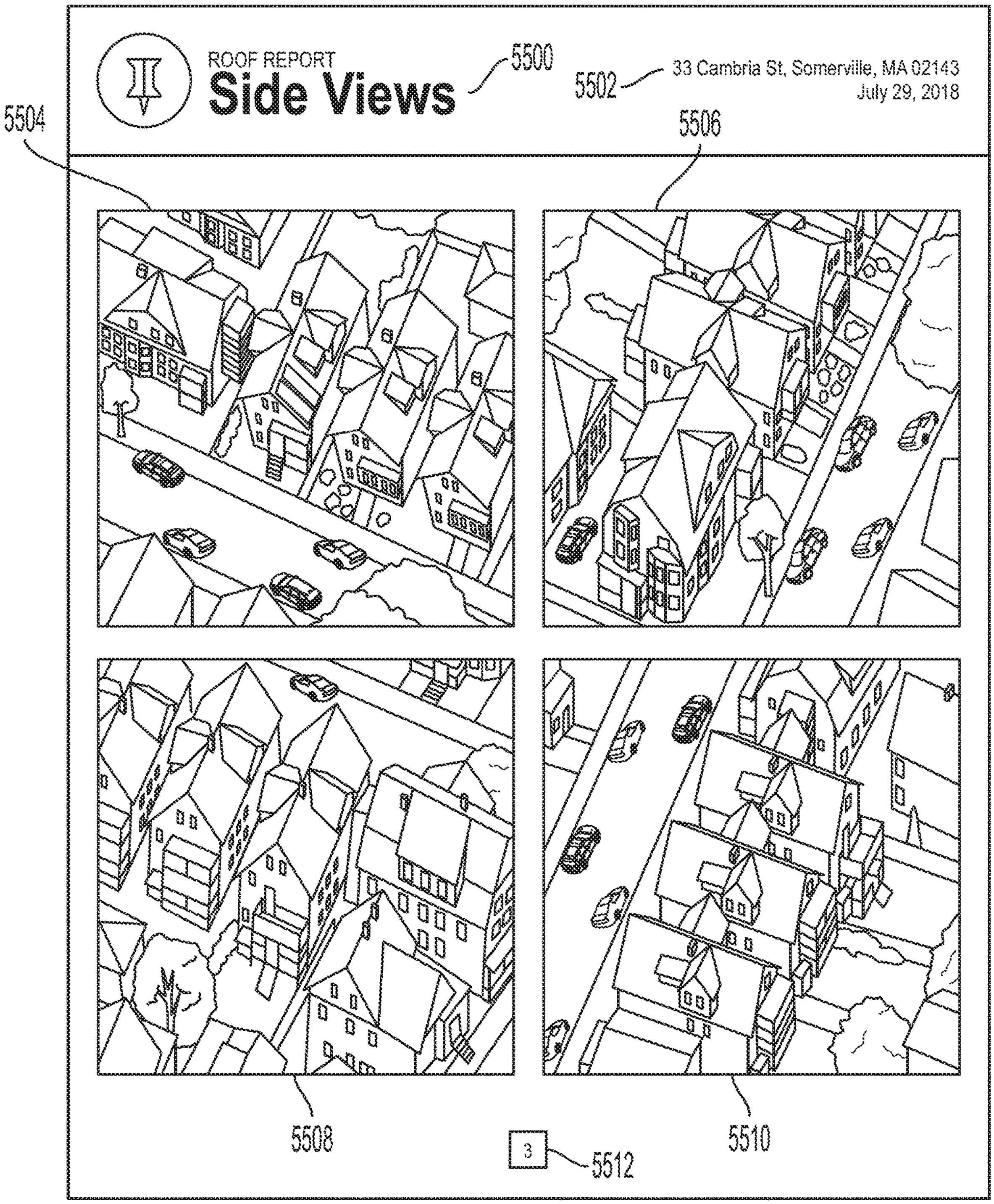
FIG. 55 is a screenshot of a roof report's side views page in an embodiment of the present disclosure.

FIG. 55 is a screenshot of an example roof report's side views page. The page may include a title 5500 and an address and date 5502. The page may include, for example, one or more of a north image 5504, east image 5506, south image 5508, and east image 5510. The page may also include a page number 5512.

Figure 56:
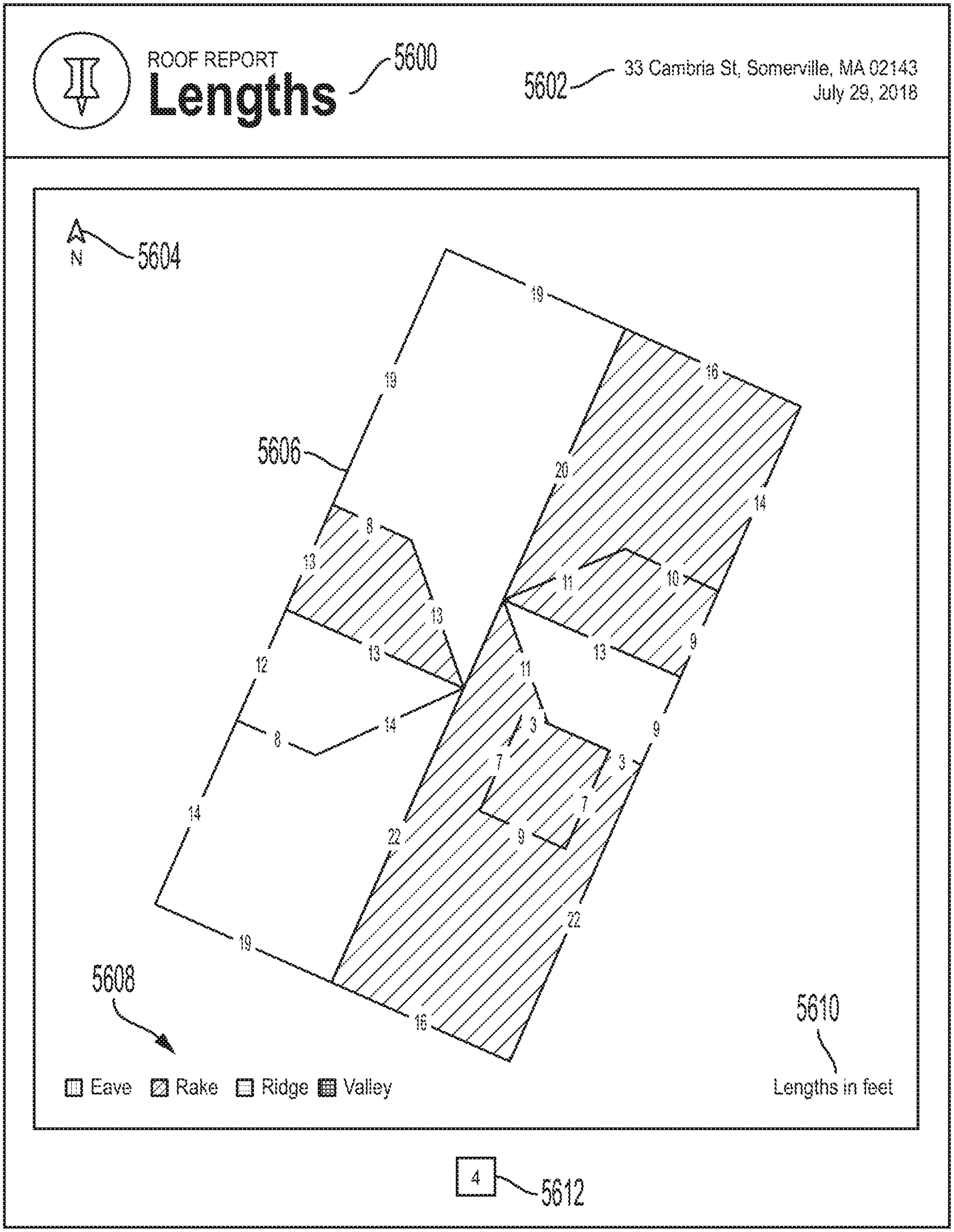
FIG. 56 is a screenshot of a roof report's lengths page in an embodiment of the present disclosure.

FIG. 56 is a screenshot of an example roof report's lengths page. The page may include a title 5600 and an address and date 5602. The page may include a north indicator or other suitable directional indicator 5604. The page may include an overhead view 5606 of the extracted roof model. This overhead view 5606 may be color coded to indicate the edge type. This overhead view 5606 may indicate the length of one or more edges. The page may include an edge type key 5608. The page may include a note 5610 indicating the unit of the lengths. The page may also include a page number 5612.

Figure 57:
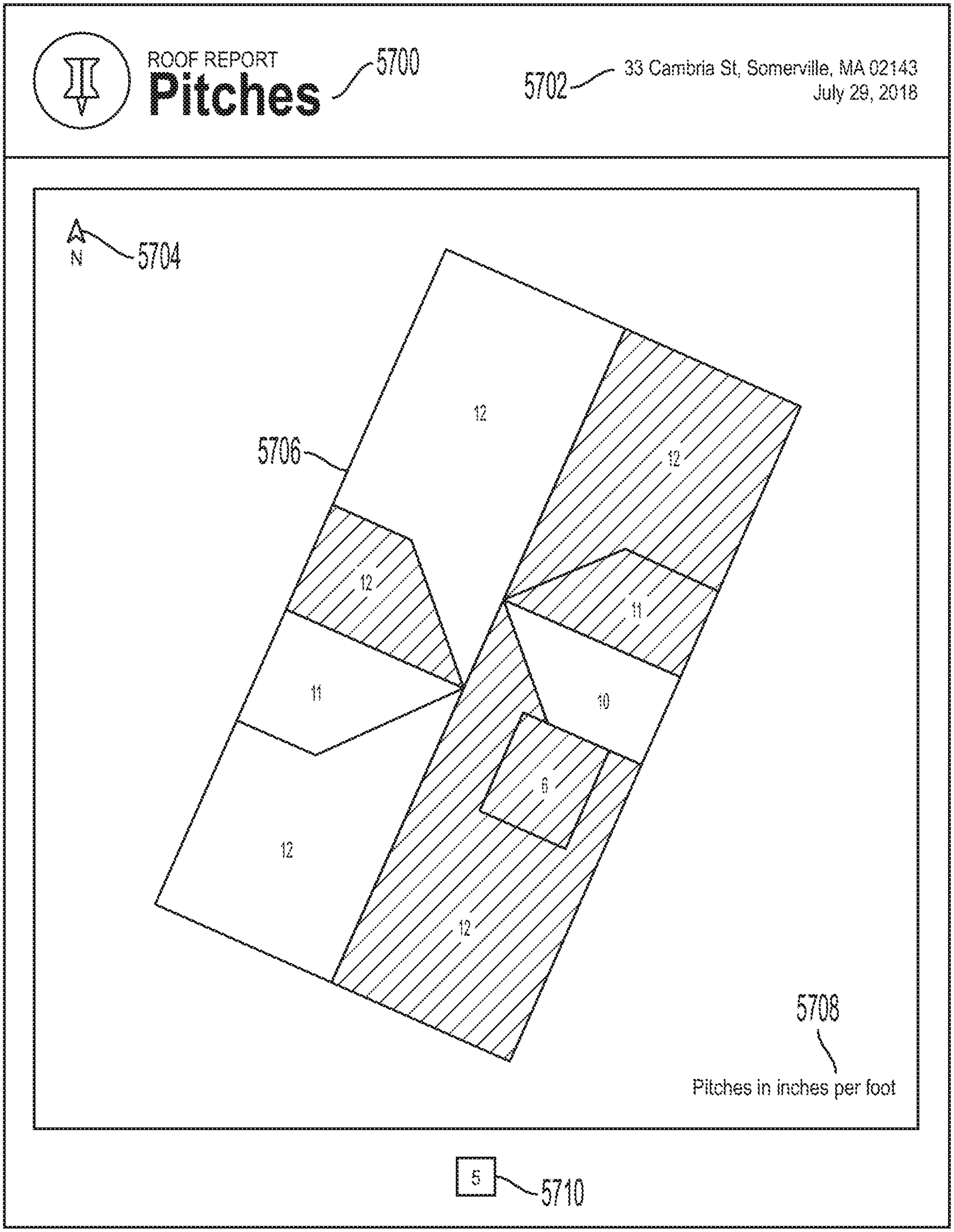
FIG. 57 is a screenshot of a roof report's pitches page in an embodiment of the present disclosure.

FIG. 57 is a screenshot of an example roof report's pitches page. The page may include a title 5700 and an address and date 5702. The page may include a north indicator or other suitable directional indicator 5704. The page may include an overhead view 5706 of the extracted roof model. This overhead view 5706 may indicate the pitch of one or more roof facets. The page may include a note 5708 indicating the unit of the pitches. The page may also include a page number 5710.

Figure 58:
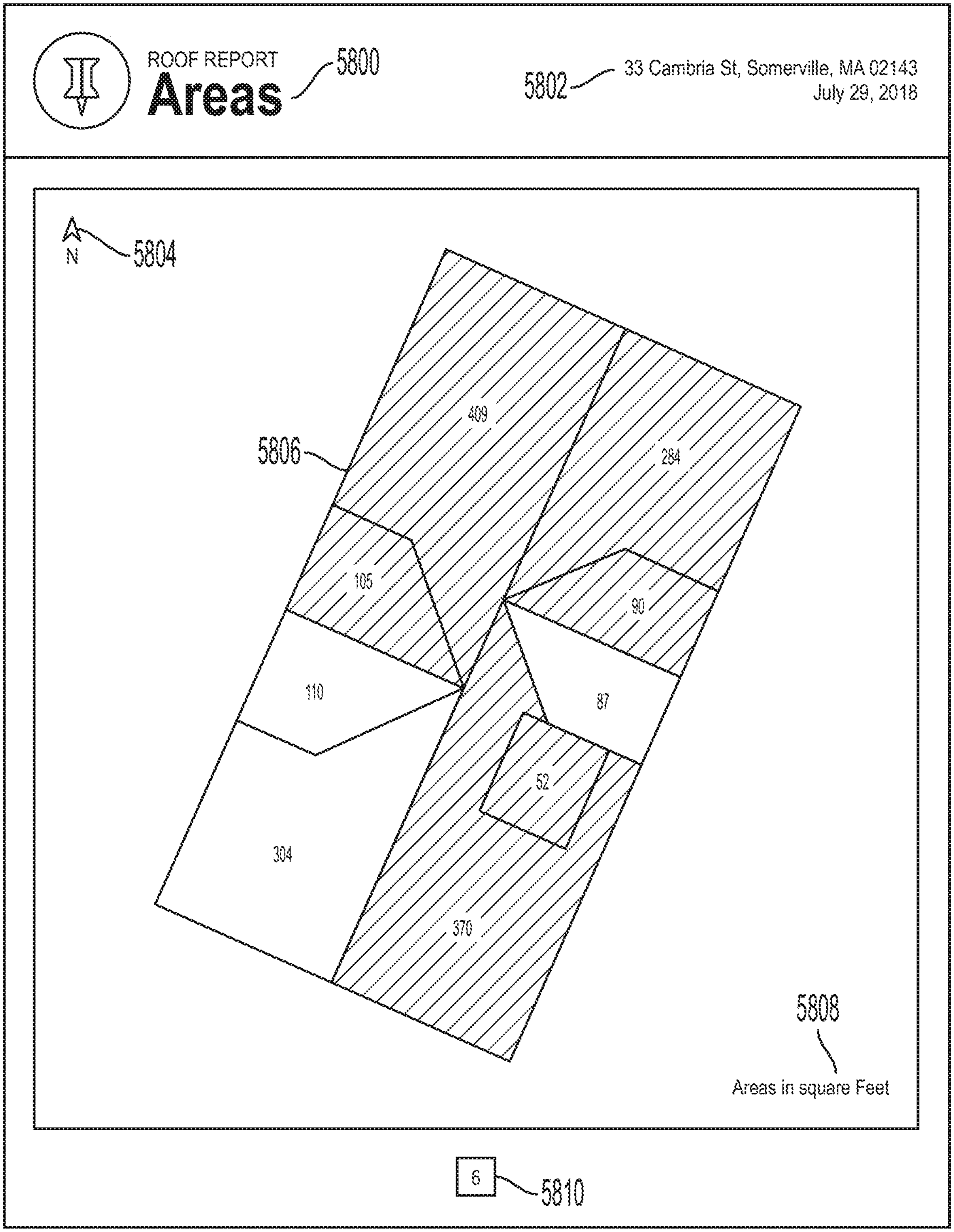
FIG. 58 is a screenshot of a roof report's areas page in an embodiment of the present disclosure.

FIG. 58 is a screenshot of an example roof report's areas page. The page may include a title 5800 and an address and date 5802. The page may include a north indicator or other suitable directional indicator 5804. The page may include an overhead view 5806 of the extracted roof model. This overhead view 5806 may indicate the area of one or more roof facets. The page may include a note 5808 indicating the unit of the areas. The page may also include a page number 5810.

Figure 59:
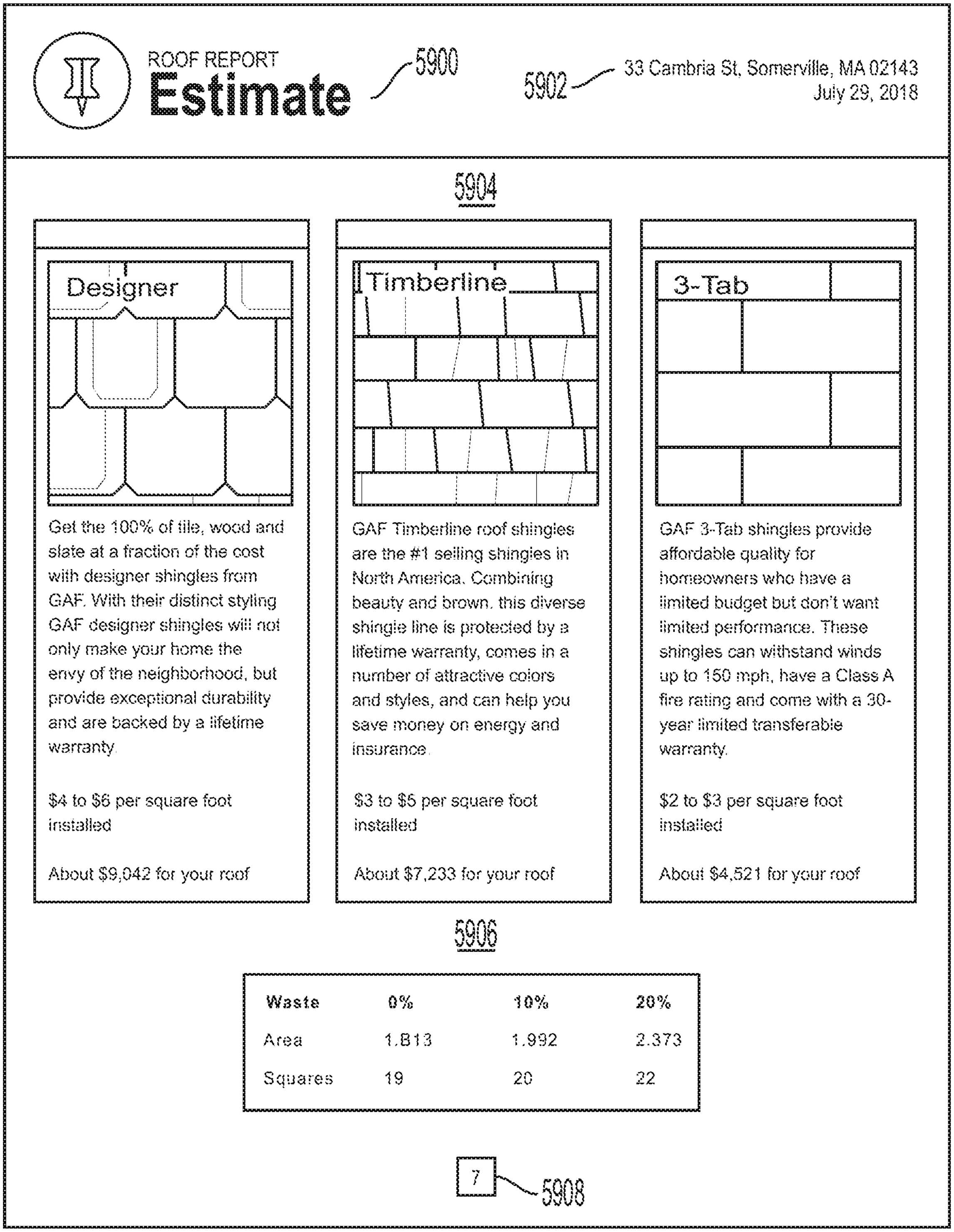
FIG. 59 is a screenshot of a roof report's estimate page in an embodiment of the present disclosure.

FIG. 59 is a screenshot of an example roof report's estimate page. The page may include a title 5900 and an address and date 5902. The page may include one or more product descriptions 5904. For each roofing product or product line, the page may include one or more of a product picture, product description, average cost per square foot or other metric installed, and a cost estimate for replacing the current structure's roof with this product. The page may include a waste table 5906. The waste table may indicate the total area and number of squares for the current structure at different waste levels. The page may also include a page number 5908.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment, or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this disclosure, a computer readable medium may be any medium that can contain, store, communicate, or transport the program for use by or in connection with the systems disclosed herein. The computer-executable program code may be transmitted using any appropriate medium, including but not limited to the internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a hard disk, a random access memory (RAM), a read-only memory (ROM), an erasable programmable read-only memory (EPROM or Flash memory), a compact disc read-only memory (CD-ROM), digital video disc (DVD), or the like, or other optical or magnetic storage device. Computer-readable media includes, but is not to be confused with, computer-readable storage medium, which is intended to cover all physical, non-transitory, or similar embodiments of computer-readable media.

Various embodiments of the present disclosure have been described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a machine having a particular function, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the disclosure.

Additionally, although flowcharts have been used herein to illustrate methods comprising sequential steps or processes having a particular order of operations, many of the steps or operations in the flowcharts illustrated herein can be performed in parallel or concurrently, and the flowcharts should be read in the context of the various embodiments of the present disclosure. In addition, the order of the method steps or process operations illustrated in any particular flowchart herein may be rearranged for some embodiments. Similarly, a method or process illustrated in any particular flow chart herein could have additional steps or operations not included therein or fewer steps or operations than those shown. Moreover, a method step may correspond to a method, a function, a procedure, a subroutine, a subprogram, etc.

Although specific amounts, distances, percentages, thresholds, or other values are provided as examples herein, other suitable amounts, distances, percentages, thresholds, or other values may be used and are contemplated by the present disclosure.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A computer-implemented method of identifying roof features and generating a roof report, the method comprising:

generating a digital 3D model of a structure from imagery of the structure;

generating, via an electronic interface that receives user input, a roof model from the digital 3D model of the structure;

displaying the digital 3D model of the structure and the roof model in the electronic interface; and generating, using computer processing elements an electronically viewable roof report based on the roof model.

2. The method of claim 1, further comprising outlining roof facets of a roof of the structure based on user input received via the electronic interface.

3. The method of claim 2, further comprising automatically adjusting facet vertex elevations based on the digital 3D model of the structure, or manually adjusting, based on the user input received via the electronic interface, the facet vertex elevations.

4. The method of claim 2, wherein facet vertices snap to at least one of a surface, other facet vertices, and facet edges of the digital 3D model of the structure.

5. The method of claim 2, further comprising indicating, via the electronic interface, whether a facet is substantially planar.

6. The method of claim 2, further comprising identifying, via the electronic interface, one or more right-angle corners of the roof model.

7. The method of claim 2, further comprising drawing guidelines based on user input receives by the electronic interface.

8. The method of claim 7, wherein facet vertices snap to at least one of the guidelines and guide line intersections.

9. The method of claim 1, wherein the roof report comprises at least one of a roof model rendering, data regarding one or more edge lengths, data regarding one or more edge types, data regarding one or more facet areas, data regarding one or more facet pitches, data regarding roof area, data regarding a predominant pitch, overhead imagery, oblique imagery, and an estimate for replacing a roof of the structure.

10. The method of claim 1, further comprising displaying the roof model in the electronic interface for user review.

11. The method of claim 1, wherein the roof model is displayed as overlaid on the digital 3D model of the structure in the electronic interface.

12. A computer-implemented method of identifying roof features and generating a roof report, the method comprising:

generating a digital 3D model of a structure from imagery of the structure;

using computer processing components to automatically extract roof features from the 3D model of the structure to create a roof model;

displaying the 3D model of the structure and the roof model in an electronic interface; and using computer processing components to generate an electronically viewable roof report based on the roof model.

13. The method of claim 12, further comprising automatically generating the roof model; and manually editing the roof model via the electronic interface.

14. The method of claim 13, further comprising adding, removing, or modifying, facets, edges, and vertices of the roof model based on user input via the electronic interface.

15. The method of claim 12, wherein the roof report comprises at least one of a roof model rendering, data regarding one or more edge lengths, data regarding one or more edge types, data regarding one or more facet areas, data regarding one or more facet pitches, data regarding roof area, data regarding a predominant pitch, overhead imagery, oblique imagery, and an estimate for replacing a roof of the structure.

16. The method of claim 12, wherein using computer processing components to automatically extract the roof features from the 3D model of the structure to create the roof model comprises applying a convolutional neural network to the 3D model of the structure.

17. The method of claim 16, wherein a training set of the neural network is automatically augmented by randomizing at least one of the translation, scale, and rotation of training models.

18. The method of claim 16, further comprising training the neural network using stochastic gradient descent with cross-entropy loss to optimize network weights.

19. The method of claim 12, wherein the roof model is displayed as overlaid on the digital 3D model of the structure in the electronic interface.

20. The method of claim 12, further comprising displaying inset images of the structure in the electronic interface.

* * * * *